United States Patent
Zhang et al.

(10) Patent No.: US 9,692,826 B2
(45) Date of Patent: Jun. 27, 2017

(54) COLLECTION FOLDER FOR COLLECTING FILE SUBMISSIONS VIA A CUSTOMIZABLE FILE REQUEST

(71) Applicant: Dropbox, Inc., San Francisco, CA (US)

(72) Inventors: Mindy Zhang, San Francisco, CA (US); Pranav Piyush, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 0 days.

(21) Appl. No.: 14/960,984

(22) Filed: Dec. 7, 2015

(65) Prior Publication Data

US 2016/0308967 A1    Oct. 20, 2016

Related U.S. Application Data

(60) Provisional application No. 62/149,338, filed on Apr. 17, 2015.

(51) Int. Cl.
  G06F 15/16    (2006.01)
  H04L 29/08    (2006.01)
  G06Q 10/00    (2012.01)
  G06Q 10/10    (2012.01)

(52) U.S. Cl.
  CPC ......... *H04L 67/1097* (2013.01); *G06Q 10/00* (2013.01); *G06Q 10/101* (2013.01); *H04L 67/06* (2013.01)

(58) Field of Classification Search
  USPC .................. 709/202, 204, 217, 223, 226
  See application file for complete search history.

(56) References Cited

U.S. PATENT DOCUMENTS

| 7,197,493 | B2 | 3/2007 | Ashby et al. |
| 7,302,706 | B1 | 11/2007 | Hicks et al. |
| 8,515,902 | B2 | 8/2013 | Savage |
| 8,640,251 | B1 | 1/2014 | Lee et al. |

(Continued)

FOREIGN PATENT DOCUMENTS

| CN | 103491143 A | 1/2014 |
| WO | WO 2009/116054 A2 | 9/2009 |

(Continued)

OTHER PUBLICATIONS

Amit Agarwal, "How to Let Others Upload Files to your Dropbox Account", Digital Inspiration, Jun. 22, 2015. (Available online at http://www.labnol.org/internet/dropbox-upload-folder/18898/, downloaded Sep. 21, 2015).

(Continued)

*Primary Examiner* — Liangche A Wang
(74) *Attorney, Agent, or Firm* — Arent Fox LLP

(57) ABSTRACT

A content management system for collecting files from one or more submitters in a collection folder. A collector, who generates the collection folder, can invite one or more submitters to submit one or more files to the collection folder via a customizable file request. The one or more submitters have limited rights to the collection folder. The limited rights can include uploading rights and prohibiting a submitter from viewing files that other submitters associated with the collection folder submitted. Thus, the collection folder is able to store files from the one or more submitters, but prevent them from viewing other's submissions.

21 Claims, 72 Drawing Sheets

(56) References Cited

U.S. PATENT DOCUMENTS

| | | |
|---|---|---|
| 8,707,459 B2 | 4/2014 | Brock et al. |
| 8,799,322 B2 | 8/2014 | deMilo et al. |
| 8,880,528 B2 | 11/2014 | Houston et al. |
| 8,903,838 B2 | 12/2014 | Hunter et al. |
| 8,925,106 B1 | 12/2014 | Steiner et al. |
| 8,955,137 B2 | 2/2015 | Mousty et al. |
| 8,997,180 B2 | 3/2015 | Cairns et al. |
| 9,008,433 B2 | 4/2015 | Fork et al. |
| 9,063,956 B2 | 6/2015 | Johnson et al. |
| 9,075,954 B2 | 7/2015 | Kirigin et al. |
| 9,081,798 B1 | 7/2015 | Wong |
| 9,122,887 B2 | 9/2015 | Drewry et al. |
| 9,223,554 B1 | 12/2015 | Lawson |
| 2002/0120757 A1 | 8/2002 | Sutherland et al. |
| 2002/0182578 A1 | 12/2002 | Rachman et al. |
| 2004/0153509 A1 | 8/2004 | Alcorn et al. |
| 2006/0185019 A1* | 8/2006 | Wong .............. G06Q 30/02 726/26 |
| 2007/0094702 A1* | 4/2007 | Khare .............. H04N 21/2747 725/134 |
| 2007/0271344 A1 | 11/2007 | Danasekaran et al. |
| 2009/0037520 A1 | 2/2009 | Loffredo |
| 2009/0287738 A1 | 11/2009 | Colbran |
| 2010/0082713 A1 | 4/2010 | Frid-Nielsen et al. |
| 2012/0041834 A1 | 2/2012 | McRae, II |
| 2012/0076367 A1 | 3/2012 | Tseng |
| 2012/0284357 A1 | 11/2012 | Meisels et al. |
| 2012/0331108 A1 | 12/2012 | Ferdowsi et al. |
| 2013/0132444 A1 | 5/2013 | Chen et al. |
| 2013/0179194 A1 | 7/2013 | Lorsch |
| 2013/0318589 A1 | 11/2013 | Ford et al. |
| 2014/0067929 A1* | 3/2014 | Kirigin .............. H04L 67/06 709/204 |
| 2014/0082071 A1 | 3/2014 | Rexer |
| 2014/0101434 A1 | 4/2014 | Senthurpandi et al. |
| 2014/0122471 A1 | 5/2014 | Houston et al. |
| 2014/0142984 A1 | 5/2014 | Wright et al. |
| 2014/0165176 A1 | 6/2014 | Ow |
| 2014/0215568 A1 | 7/2014 | Kirigin et al. |
| 2014/0222917 A1 | 8/2014 | Poirier |
| 2014/0223355 A1* | 8/2014 | Raccah .............. G06Q 10/10 715/776 |
| 2014/0229578 A1 | 8/2014 | Chu |
| 2014/0281856 A1 | 9/2014 | Byrne et al. |
| 2014/0304618 A1 | 10/2014 | Carriero et al. |
| 2014/0317031 A1 | 10/2014 | Babenko et al. |
| 2014/0351541 A1 | 11/2014 | Angelo et al. |
| 2014/0351606 A1 | 11/2014 | Demilo et al. |
| 2014/0373147 A1 | 12/2014 | Seinfeld et al. |
| 2015/0006474 A1 | 1/2015 | Halder |
| 2015/0052613 A1 | 2/2015 | Maman |
| 2015/0082196 A1 | 3/2015 | Berger et al. |
| 2015/0134751 A1 | 5/2015 | Meyers, Jr. et al. |
| 2015/0135097 A1 | 5/2015 | Carriero et al. |
| 2015/0189032 A1 | 7/2015 | Duquene et al. |
| 2015/0213236 A1 | 7/2015 | Gorodyansky et al. |
| 2015/0242643 A1* | 8/2015 | Hankins, Jr. ............ H04L 63/04 726/26 |
| 2015/0242956 A1* | 8/2015 | Schultz .............. G06Q 40/08 705/4 |
| 2015/0244798 A1 | 8/2015 | Bolotin et al. |
| 2016/0180733 A1 | 6/2016 | Foley, Jr. |

FOREIGN PATENT DOCUMENTS

| | | |
|---|---|---|
| WO | WO 2011/150280 A1 | 12/2011 |
| WO | 2015/077894 A1 | 6/2015 |

OTHER PUBLICATIONS

Kent Chen, "Allow Anyone Upload Files Directly to Your Dropbox with DBInbox", Next of Windows, Nov. 18, 2014. (Available online at http://www.nextofwindows.com/allow-anyone-upload-files-directly-to-your-dropbox-with-dbinbox, downloaded Sep. 22, 2015).

Lalit Lakshmanan, "Box Sharing Guide", University of California San Francisco, San Francisco, CA, Apr. 14, 2014 (Available online at https://it.ucsf.edu/services/ucsf-box/box-sharing-guide, downloaded Sep. 22, 2015).

SmugMug, "Can guests upload photos to my site?", SmugMug, Inc., Mountain View, CA, Aug. 27, 2015. (Available online at http://help.smugmug.com/customer/portal/articles/526320-can-guests-upload-photos-to-my-site-page1-2:, downloaded Sep. 21, 2015).

Drive Help, "Change your sharing settings", Google Inc., Mountain View, CA, 2015. (Available online at https://support.google.com/drive/answer/2494886?hl=en, downloaded Sep. 22, 2015).

Plone, "Collaboration through Sharing", Plone Foundation, Fishers, IN, 2010. (Available online at https://plone.org/documentation/manual/plone-4-user-manual/collaboration-and-workflow/collaboration-through-sharing, downloaded on Sep. 22, 2015).

"Core Document Management Features", Mangoapps, Bellevue, WA, 2015. (Available online at http://www.mangoapps.com/core-document-features, downloaded Sep. 22, 2015).

"File uploads to your Cloud with CloudWok: Tour", CloudWok, 2015. (Available online at https://www.cloudwok.com/tour, downloaded on Sep. 22, 2015).

"IBM Aspera Faspex User Guide 3.9.1: All Platforms", Aspera, Inc., an IBM Company, Emeryville, CA, May 29, 2015. (Available online at http://download.asperasoft.com/download/docs/faspex/3.9.1/user/pdf2/Faspex_User_3.9.1.pdf, downloaded Sep. 22, 2015).

"iThenticate User Manual" Version: 2.0.8, iParadigms, LLC, Feb. 4, 2014. (Available online at http://www.ithenticate.com/hs-fs/hub/92785/file-1384442395-pdf/iTh__documentation/iThenticate_Manual.pdf, downloaded Sep. 23, 2015).

Lexis Nexis, "SafeAssign", LexisNexis, Dayton, Ohio, 2009. (Available online at http://www.lexisnexis.com/documents/LawSchoolTutorials/20091102103551_small.pdf, downloaded Sep. 23, 2015.

Sakai @ Rutgers Help Documents, "Assignments", Rutgers University, New Brunswick, New Jersey, 2015. (Available online at https://sakai.rutgers.edu/helpdocs/assignments.html, downloaded Sep. 23, 2015).

"ShareFile for the enterprise: Share, store, sync, and secure data on any device, anywhere", Citrix Systems, Inc., Santa Clara, CA, 2015. (Available online at https://www.citrix.com/content/dam/citrix/en_us/documents/products-solutions/citrix-sharefile-en, downloaded on Sep. 23, 2015).

Google Support, "Upload Files to Google Drive", Google Inc., Mountain View, CA, 2015. (Available online at https://support.google.com/a/answer/172541?hl=en, downloaded Sep. 16, 2015).

"WD My Cloud: Personal Cloud Storage User Manual", Western Digital Technologies, Inc., Irvine, CA, 2013. (Available online at http://www.wdc.com/wdproducts/library/UM/ENG/4779-705103.pdf, downloaded Sep. 23, 2015).

Brad, Box Community, "What are the Different Access Levels for Collaborators?", Box, Inc., Los Altos, CA, Feb. 5, 2015. (Available online at http://community.box.com/t5/Collaboration-and-Sharing/What-Are-The-Different-Access-Levels-For-Collaborators/ta-p/144, downloaded Sep. 22, 2015).

International Search Report mailed Jul. 7, 2016 in International Application No. PCT/US2016/027950.

International Search Report mailed Jul. 7, 2016 in International Application No. PCT/US2016/027961.

Oprisa, C., et. al. "From Plagiarism to Malware Detection," 2013 15th International Symposium on Symbolic and Numeric Algorithms for Scientific Computing, Timisoara, pp. 227-234, 2013.

Rutgers, "Sakai Help: Dropbox", www.Rutgers.edu, <http://rci.rutgers.edu/~orit/sakai/helpdocs2/assignments.php>, accessed Apr. 15, 2017, pp. 1-18, Jun. 27, 2012.

Rutgers, "Sakai Help: Dropbox,"www.Rutgers.edu, http://rci.rutgers.edu/~orit/sakai/helpdocs2/dropbox.php, accessed Apr. 15, 2017, pp. 1-7, Jul. 11, 2012.

(56) References Cited

OTHER PUBLICATIONS

Skinner, P., "Professors use plagiarism detection site to check students,", DailtoReador.com, <http://www.dailytoreadorcom/lavida/professors-use-plagiarism-detection-site-to-check-students/article_2c128776-61cf-llel001a4bcf6878.html>, accessed Apr. 15, 2017, pp. 1-4, Feb. 27, 2012.

Oprisa, C., et al. "From Plagiarism to Malware Detection," 2013 15th International Symposium on Symbolic and Numeric Algorithms for Scientific Computing, Timisoara, pp. 227-234, 2013.

Rutgers. "Sakai Help: Assignments", www.Rutgers.edu, http://rci.rutgers.eduhorti/sakai/helpdocs2/assignments.php, accessed Apr. 15, 2017, pp. 1-18, Jun. 27, 2012.

Skinner, P., "Professors use plagiarism detection site to check students,", DailytoReador.com, <http://www.dailytoreadorcom/lavida/professors-use-plagiarism-detection-site-to-check-students/article_2c128776-61cf-llel001a4bcf6878.html>, accessed Apr. 15, 2017, pp. 1-4, Feb. 27, 2012.

\* cited by examiner

| | | |
|---|---|---|
| Dropbox | ⌕ Search | ⊙ Gordon Shields▾ |

| Name △ | Kind | Modified |
|---|---|---|
| ☐ Big Files"-$%&¥米 | folder | -- |
| ☐ Code Snippets"-$%&¥米 | folder | -- |
| ☐ My Photos"-$%&¥米 | folder | -- |
| ☐ Old and Deleted Files"-$%&¥米 | folder | -- |
| ☐ Papers"-$%&¥米 | folder | 1/1/2015 12:00AM |
| ☐ Problem Files"-$%&¥米 | folder | 1/1/2015 12:00AM |
| ☐ README"-$%&¥米.md | file | 1/1/2015 12:00AM |
| ☐ sample"-$%&¥米.docx | document | 1/1/2015 12:00AM |
| ☐ sample"-$%&¥米.pdf | document | 1/1/2015 12:00AM |
| ☐ sample"-$%&¥米.py | code | 1/1/2015 12:00AM |
| ☐ sample"-$%&¥米.txt | document | 1/1/2015 12:00AM |
| ☐ unknown-type"-$%&¥米.txt | file | 1/1/2015 12:00AM |
| ☐ Homework Assignment #1 | folder | 10/5/2015 9:00AM |
| ☐ Homework Assignment #2 | folder | 10/10/2015 9:00AM |
| ☐ Homework Assignment #3 | folder | 10/19/2015 9:00AM |

- Files
- Photos
- Sharing
- Links
- Events
- File Requests
- Get Started

410

Help Privacy ...

[ Dropbox - Submit files  x ] [ ]

https://www.dropbox.com/requests/4ooD8QgdMhqLRjxH8VRt ☆ ⓘ ▷ ≡

⌐900

1264
1352

Sign in ▽

ABC Corp.
⌐920

Gordon Shields is requesting
Final papers

Submitted files will be securely uploaded into Gordon
Shields's Dropbox.

| First name | | ⌐902 |
| Last name | | ⌐904 |
| Email address | | ⌐906 |
| Choose files.... | | ⌐908 |
| Comments | | ⌐910 |
| Number of Submission | 1 | ⌐912 |
| Types of Files | Any | ⌐914 |
| Override | Yes | ⌐916 |
| Deadline | None | ⌐918 |

Upload ⌐922

Run a Token ⌐924

○ ○ ○ | File requests - Dropbox × |
▼ ▲ | https://www.dropbox.com/requests/Homework/Assignment #3 | ☆ Search ⬢
▭ Files
▣ Photos
⌘ Sharing
⊙ Events
▣ File Requests
⊕ Get Started ▣

— 1260
— 1262

Homework Assignment # 3
Revolutionary War

By: _____

1. During the first two year of the war, America was victorious at all of the following battles except the battle of:
   ___ A. Trenton
   ___ B. Saratoga
   _X_ C. Long Island
   ___ D. Princeton
   ___ E. Ft. Ticonderoga 2. Which of the following was an ally of the British during the American War for Independence?
   A. France Jane Doe Homework Assignment # 3 — 1270
Sent 2 days ago by John Doe
Uploaded today by Jane Doe — 1264
▲

Jane
I did not do well on this assigment and would like to meet with you to discuss — 1268

John
How about Wednesday after class?

▭ Post your comment — 1266

| Location | Who | Activity | Timestamp | |
|---|---|---|---|---|
| /File Requests/White Paper | Gordon Shields | Created CF | 10/30/2015 | 1:00:00 PM |
| /File Requests/Family Wedding | Bob Jones | Created CF | 10/30/2015 | 1:01:03 PM |
| /File Requests/White Paper | Amy Brown | Submission | 10/30/2015 | 1:02:00 PM |
| /File Requests/White Paper | Amy Brown | Malicious Content | 10/30/2015 | 1:02:30 PM |
| /File Requests/White Paper | Amy Brown | Quarantine | 10/30/2015 | 1:02:35 PM |
| /File Requests/White Paper | Gordon Shields | Q Email Notification | 10/30/2015 | 1:02:45 PM |
| /File Requests/Family Wedding | Bob Jones | Recognition Run | 10/30/2015 | 1:03:00 PM |
| /File Requests/Family Wedding | Bob Jones | Metadata Tags | 10/30/2015 | 1:03:55 PM |
| /File Requests/Family Wedding | Bob Jones | Metadata Tags | 10/30/2015 | 1:04:05 PM |
| /File Requests/Family Wedding | Bob Jones | Metadata Tags | 10/30/2015 | 1:04:35 PM |

FIG. 20B

○ ○ ○ / ⌢File requests - Dropbox × ☐
◂ ▸ × ⌂ https://www.dropbox.com/requests ☆ ▸ ≡

Dropbox — 1752
⎡ Publish ⎤ — 1754 — 1250 1756 — 2152 ▵ ⌕ Search ⊙ Gordon Shields▾

| Name ▵ | Kind | Modified |
|---|---|---|
| Homework Assignment #1 - Jane Doe | Document | 10/6/2015 6:46PM — 1758 |
| Homework Assignment #1 - Bob Brown | Document | 10/6/2015 7:01PM — 1760 |
| Homework Assignment #1 - Courtney Cox | Document | 10/6/2015 7:15PM — 1762 |
| Homework Assignment #1 - David Dolye | Document | 10/6/2015 7:20PM — 1764 |
| Homework Assignment #1 - Eric Enders | Document | 10/6/2015 7:35PM — 1766 |
| Homework Assignment #1 - Frank Fara | | — 2158 |
| Homework Assignment #1 - George Geizer | | — 2160 |

▤ Files
▦ Photos
⌘ Sharing
⚲ Links
⊙ Events
◎ File Requests
⇪ Get Started

Help  Privacy ⋯

FIG. 21C

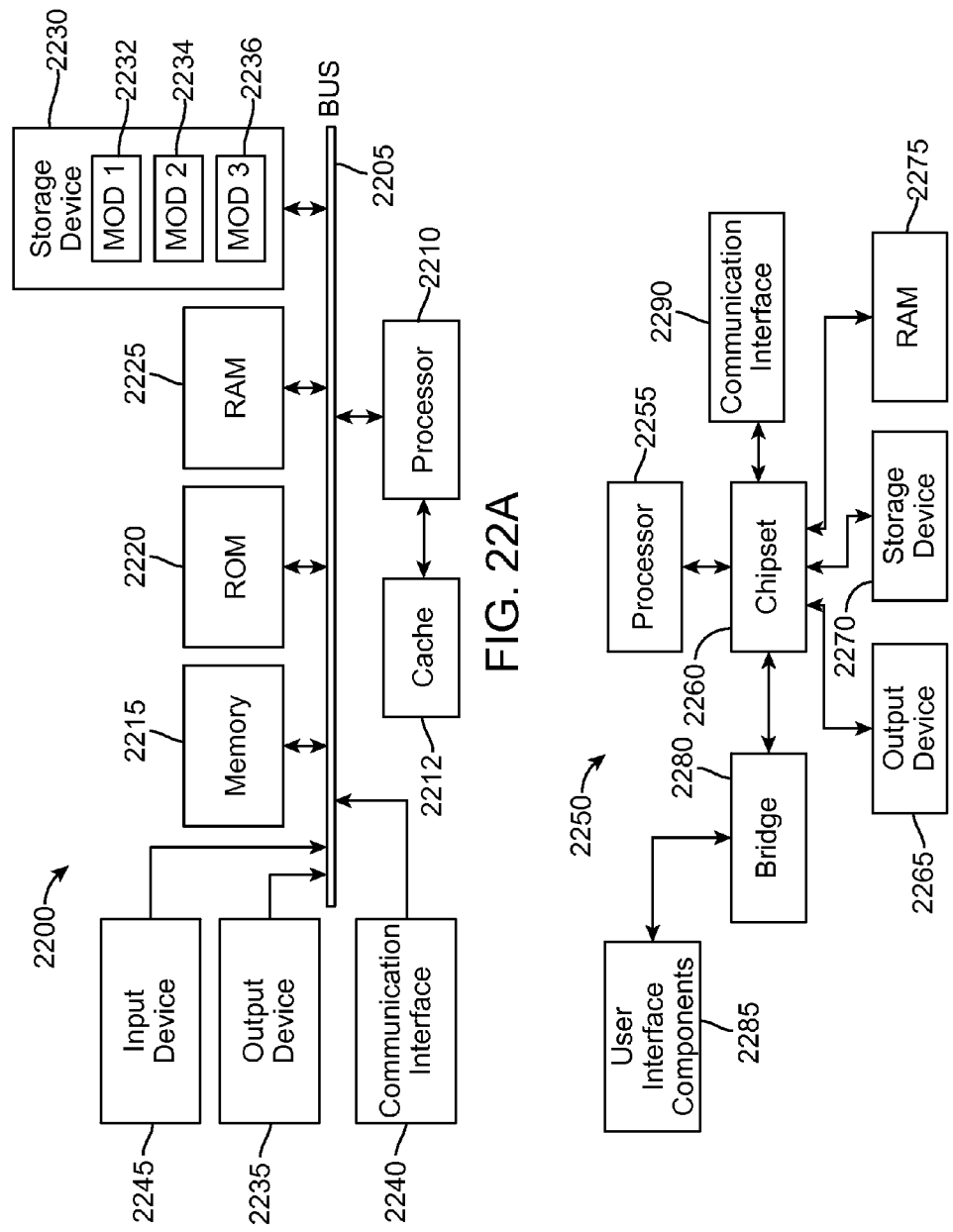

COLLECTION FOLDER FOR COLLECTING FILE SUBMISSIONS VIA A CUSTOMIZABLE FILE REQUEST

CROSS-REFERENCE TO RELATED APPLICATIONS

This application claims the benefit of U.S. Provisional Application 62/149,338, filed Apr. 17, 2015, which is hereby incorporated in its entirety.

TECHNICAL FIELD

The present technology pertains to collecting files over a network, and more specifically pertains to a collection folder for collecting file submissions in which a submitter can only view his or her submission.

BACKGROUND

Conventional online storage systems provide online storage folders that can collect files from users. In such systems, a user who is invited and receives access to an online storage folder has access to all of the files in the online storage folder. For example, a teacher can provide students access to an online storage folder with each student having access to all of the files in the online storage folder. Thus, if the students submit homework to the online storage folder, each student has access to homework previously submitted by other students. To avoid, such a problem, the teacher can provide a single folder for each student. Such a scenario can create additional overhead and requires the teacher to access each folder to review each student's homework.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for collecting files in a collection folder in a user account in a content management system. The disclosed technology addresses the need in the art for a collector to collect files in one location from one or more submitters with less overhead and without requiring the collector to access individual folders to review each submitter's files. The solution allows for the collection of files in one collection folder. In addition, the submitter has limited rights which unlike conventional collection systems, prohibits the submitter from accessing and viewing files from other submitters.

Disclosed are systems, methods and non-transitory computer-readable storage media for allowing a collector to customize a file request. When creating a file request a user interface (UI) can allow a collector to set parameters for controlling what and/or how a submission can be submitted. The disclosed technology addresses the need in the art for a collector to dictate or customize their file request in order to receive submissions that conform with the customized file request.

Disclosed are systems, methods and non-transitory computer-readable storage media for providing a commenting interface enabling a submitter and/or collector to add a comment associated with a submitted file. The commenting interface allows a submitter and/or collector to share one or more comments with the other. The disclosed technology addresses the need in the art for allowing a submitter and/or collector to comment on a submission that was submitted in response to a file request.

Disclosed are systems, methods and non-transitory computer-readable storage media for allowing a collector to use a public file request, such as a file request posted on a social network. The disclosed technology addresses the need in the art for allowing a collector to reach a larger audience rather than only the one or more submitters that receive an email message with a file request link.

Disclosed are systems, methods and non-transitory computer-readable storage media for allowing a collector to have a submissions scanned for malicious content. By using a malicious content detection feature, each submission can be scanned for malicious content prior to the collector having access to the submission. The disclosed technology addresses the need in the art for preventing malicious content to be introduced to the content management system or a user's account and potentially causing problems.

Disclosed are systems, methods and non-transitory computer-readable storage media for allowing a collector to have submission scanned for plagiarism. By using a plagiarism detection feature, each submission can be scanned for plagiarized content and if detected, can inform the collector of the potential plagiarism. The disclosed technology addresses the need in the art for trying to ensure that a submission is the submitter's own work.

Disclosed are systems, methods and non-transitory computer-readable storage media for allowing a collector to train a facial and/or object recognition feature to tag people or objects within photographs that are submitted. By training the facial and/or object recognition module, the collector can send a token, containing the one or more tagged people and/or objects, to one or more submitters who can use the token to submit additional photographs based on the token. The disclosed technology addresses the need in the art for a collector to be able to collect additional photographs from one or more submitters.

Disclosed are systems, methods and non-transitory computer-readable storage media for allowing a collector to request photos in one folder. By using a photo file request, submitters are able to submit photos in response to the photo file request. The disclosed technology addresses the need in the art for a collector to be able to collect photos from one or more submitters and have all of the photos stored in one collection folder.

Disclosed are systems, methods and non-transitory computer-readable storage media for allowing an administrator to monitor, view and control file requests/collection folders associated with an enterprise. By using administrator controls and dashboards, an administrator can monitor, view and control file submissions and control the privileges of collectors and submitters with respect to the file requests. The disclosed technology addresses the need in the art for an administrator to control, view and monitor people in their enterprise and their use of the file request feature.

Disclosed are systems, methods and non-transitory computer-readable storage media for allowing a collector to use email to collect submissions in response to a file request. By using email rather than a file request link, one or more submitters can reply to an email request for a file request rather than having to access a website to upload one or more files. The disclosed technology addresses the need in the art for a collector to provide an alternate manner to obtain file submissions other than via a file request link.

Disclosed are systems, methods and non-transitory computer-readable storage media for allowing a collector to share submissions with the one or more submitters and/or others in response to a file request. By using a close and publish feature, the collector is able to share submissions with the one or more submitters and/or others once the submissions are deemed to be complete. The disclosed technology addresses the need in the art for a collector to collect submissions and once collected, to share the submissions with the one or more submitters and/or others.

Disclosed are systems, methods and non-transitory computer-readable storage media for allowing additional roles other than a collector and submitter role. By allowing a viewer access to the collection folder, a viewer is able to monitor a submitter's submission or submissions to ensure that the submitter responded to a file request. The disclosed technology addresses the need in the art for supervision of a submitter in responding to a file request, such as a parent or other-members of a team when the submitter is acting on behalf of the team.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4B is a homepage UI for a non-empty user's account in accordance with an exemplary embodiment;

FIG. 5A is an initial homepage UI for creating a collection folder in accordance with an exemplary embodiment;

FIG. 9A is a file upload UI in accordance with an exemplary embodiment;

FIG. 12E is a UI rendering a comment in the expanded comment section in accordance with an exemplary embodiment;

FIG. 12F is a UI rendering a plurality of comments in the expanded comment section in accordance with an exemplary embodiment;

FIG. 14C is a file upload UI for uploading photos in accordance with an exemplary embodiment;

FIG. 14D is a UI rendering a list of photo folders in accordance with an exemplary embodiment;

FIG. 20B is a UI rendering an activity log in accordance with an exemplary embodiment;

FIG. 21C is a rendered status file in accordance with an exemplary embodiment;

FIG. 22A is a block diagram of a system for implementing various embodiments of the present technology in accordance with an exemplary embodiment; and FIG. 22B is a block diagram of a system for implementing various embodiments of the present technology in accordance with an alternative exemplary embodiment.

DESCRIPTION

Figure 1:
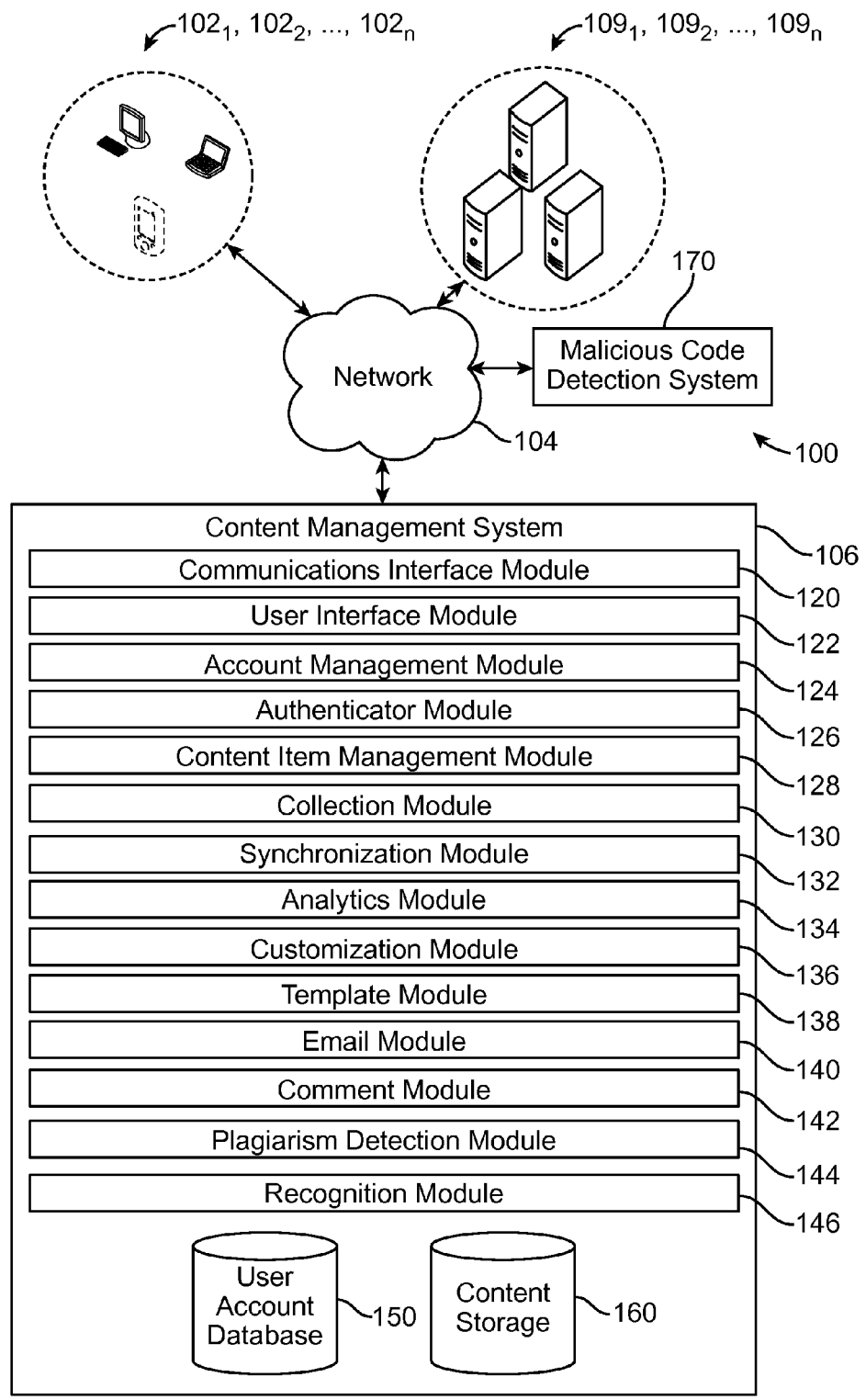
FIG. 1 is a block diagram of a configuration of devices and a network in accordance with an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The terms "comprising," "including" and "having" are used interchangeably in this disclosure. The terms "comprising," "including" and "having" mean to include, but not necessarily be limited to the things so described. The terms "content," "content item," "content items," "file" and "files" are used interchangeably in this disclosure. The terms "content," "content item," "content items," "file" and "files" mean something that a user submits to the content management system for storage in a collection folder.

In one or more embodiments, a content management system receives a request to generate a link to use in collecting one or more files from one or more submitters. The request can come from a user having an account with the content management system. Such a user can be referred to as a collector. The one or more submitters can have an account with the content management system, not have an account with the content management system or any combination thereof. In response to the file request, the content management system can prompt the collector by requesting a name for the file request, a name for a designated collection folder to store the collected files from the one or more submitters and an email address for each submitter. In response to receiving the information, the content management system can generate a link to the collection folder. The content management system can then distribute the generated link to the one or more submitters via email. Alternatively, the collector can distribute the generated link to the one or more submitters via email, instant message, text message, or by posting the link to a website, or any other means of distributing the link. For example, the collector can type the link or paste the link to a social media website. The one or more submitters can upload one or more files to the collection folder. The one or more submitters can have limited rights to the collection folder. The limited rights can include uploading rights, but prohibit a submitter from viewing files that other submitters associated with the collection folder submitted. Thus, the collection folder is able to store files from the one or more submitters, but prevent them from viewing submissions from others. The uploaded files can be scanned for malicious code and/or plagiarized content. In addition, the collector can activate and deactivate one or more collection folders. An activated collection folder allows submitters to submit files to the activated collection folder and a deactivated folder prohibits submitters from accessing the deactivated collection folder. A collector can access activated collection folders and deactivated collection folders.

Referring to FIG. 1, a block diagram of a configuration of devices and a network in accordance with an exemplary embodiment is illustrated. In system 100, electronic devices communicate via a network for purposes of exchanging content and other data. System 100 can be configured for use on a wide area network, such as the Internet. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102" and individually "$102_i$") connected to network 104 by direct and/or indirect communication. The network 104 can be one or more communication networks such as a local area network (LAN) or other suitable communication networks (e.g., the Internet, a metropolitan area network (MAN), a wide area network (WAN) a mobile, a wire or wireless network, a private network, a virtual private network, etc.). Content management system 106 can support connections from a variety of different client devices 102, such as desktop computers; mobile computers; mobile communications devices, e.g., mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system 106 specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with content management system 106 via a client-side application integrated with the file system or via a webpage displayed using a web browser application.

Content management system 106 can make it possible for a user to store files, as well as perform a variety of content management tasks, such as retrieve, modify, browse, and/or share the content depending on who the user is and/or depending on parameters associated with a folder as explained below in further detail. Furthermore, content management system 106 can make it possible for a user to access the files from multiple client devices 102. For example, a submitter can use a client device $102_i$ to upload files to content management system 106 via a network 104. The files can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information. Content management system 106 can store non-account user, e.g., submitters, information in a user account database 150, where the non-account users are associated with a user account, e.g., a collector's user account.

User account database 150 can also include account management information, such as account type, e.g., free or paid; usage information, e.g., file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as files, digital data, documents, text files, audio files, video files, etc., from one or more client devices 102 authorized on the account. The content can also include folders or other mechanisms of grouping content items together with different behaviors, such as playlists, albums, etc. For example, an account can include a public folder that is accessible to any user. In another example, an account can include a private folder that is only accessible to a specific user and/or any the specific user authorizes. In yet another example, an account can include a collection folder that is only accessible by the account user, e.g., a collector, and anyone the account user authorizes, e.g., a submitter. Each folder can be assigned a web-accessible address. A link to the web-accessible address can be used to access the contents of the public folder, a private folder or a collection folder. In another example, an account can include a photos folder that is intended for photos and that provides specific attributes and actions tailored for photos; an audio folder that provides the ability to play back audio files and perform other audio related actions; or other special purpose folders. The photos folder can be a public folder, a private folder or a collection folder. An account can also include shared folders, collection folders or group folders that are linked with and available to multiple user accounts. The permissions for multiple users may be different for each folder.

The content can be stored in content storage 160. Content storage 160 can be a storage device, multiple storage devices, a server or multiple servers. The storage device, multiple storage devices, server or multiple servers can be configured to perform the methods described herein. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata can include metadata tags for a content item and can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface (UI) module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface module 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an application (or app) on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Content management system 106 can include content item management module 128, which stores the content items in content storage 160. Content item management module 128 can include a content directory for identifying the location of each content item stored in content storage 160. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include collection module 130 for managing the collection and storage of content in one or more collection folders. The content in a collection folder can include one or more files uploaded by one or more users (a "submitter") and/or content uploaded by a user (a "collector") whose account includes the one or more collection folders. The one or more submitters can include a submitter who has an account with content management system 106, a submitter who does not have an account with content management system 106 or any combination thereof. A submitter can have limited rights to the content in the one or more collection folders. The limited rights allow a submitter to view only the content that the submitter uploaded and prohibits access to content uploaded by other submitters. In one or more embodiments, the limited rights can only allow a submitter to upload content, but the submitter cannot access the uploaded content. In one or more embodiments, a submitter can have access to content that is uploaded by the collector. The collector can control the access to the content by setting one or more parameters associated with the content. The access can include read-only access, copy-only access and/or replace access. Read-only access allows a submitter to view the content but cannot edit the content. Copy-only access allows a submitter to copy a content item, edit the content item and upload the content item as a new content item. Replace access allows a submitter to replace a previously uploaded file.

In some embodiments, content management system 106 can be configured to maintain a content directory identifying the location of each content item in content storage 160. The content directory can include a unique content entry for each content item stored in the content storage. A content entry can include a content path that can be used to identify the location of the content item in content management system 106. For example, the content path can include the name of the content item and a folder hierarchy associated with the content item. For example, the content path can include a collection folder or path of collection folders in which the content item is placed as well as the name of the content item. Content management system 106 can use the content path to present the content items in the appropriate folder hierarchy. A content entry can also include a content pointer that identifies the location of the content item in content storage 160. For example, the content pointer can include the exact storage address of the content item in memory. In some embodiments, the content pointer can point to multiple locations, each of which contains a portion of the content item. In addition to a content path and content pointer, a content entry can also include a user identifier that identifies the user, e.g., a submitter or a collector, who has access to the content item.

Collection module 130 can be configured to generate a custom network address, such as a uniform resource locator (URL), which allows any web browser to access the collection folder in content management system 106 without any authentication. To accomplish this, collection module 130 can be configured to include content identification data in the generated URL, which can later be used to properly identify the user, e.g., a collector or a submitter, and provide access to the collection folder. For example, collection module 130 can be configured to include the user account identifier and the content path in the generated URL. Upon selection of the URL, the content identification data included in the URL can be transmitted to content management system 106, which can use the received content identification data to identify the appropriate collection folder and provide access to the collection folder.

In addition to generating the URL, collection module 130 can also be configured to record that a URL to the collection folder has been created. In some embodiments, the collection folder can include a URL flag indicating whether a URL to the collection folder has been created. For example, the URL flag can be a Boolean value initially set to 0 or false to indicate that a URL to the collection folder has not been created. Collection module 130 can be configured to change the value of the flag to 1 or true after generating a URL to the collection folder.

In some embodiments, collection module 130 can also be configured to deactivate a generated URL. For example, each collection folder can also include a URL active flag indicating whether the collection folder should be returned in response to a request from the generated URL. For example, collection module 130 can be configured to only return a collection folder requested by a generated link if the URL active flag is set to 1 or true. Thus, access to a collection folder for which a URL has been generated can be easily restricted by changing the value of the URL active flag. This allows a collector to restrict access to the collection folder without having to move the collection folder or delete the generated URL. Likewise, collection module 130 can reactivate the URL by again changing the value of the URL active flag to 1 or true. A collector can thus easily restore access to the collection folder without the need to generate a new URL. A collector has access to active collection folders and deactivated collection folders. A submitter only has access to active collection folders with limited access rights as described herein.

In one or more embodiments, content management system 106 can include one or more modules. For example, content management system 106 can include customization module 136, template module 138, email module 140, comment module 142, plagiarism detection module 144 and/or recognition module 146. Customization module 136 can allow a collector to customize settings/parameters for a file request by providing submitters with guidance and/or structure for the submissions. Template module 138 can allow a collector to provide a copy of a template file to each submitter, thereby allowing each submitter to modify the submitter's copy of the template file. Email module 140 can allow a submitter to respond to a file request via email and/or can allow a collector to request a file request in response to entering one or more trigger words in an email message. Comment module 142 can allow a user, e.g., collector and/or submitter, to comment on a file request and/or a submission. Plagiarism detection module 144 can allow one or more submissions to be scanned for plagiarism. Recognition module 146 can allow a collector and/or a submitter to tag people and/or objects in a photograph.

While content management system 106 is presented with specific components, it should be understood by one skilled in the art, that the architectural configuration of system 106 is simply one possible configuration and that other configurations with more or less components are also possible.

Figure 2A:
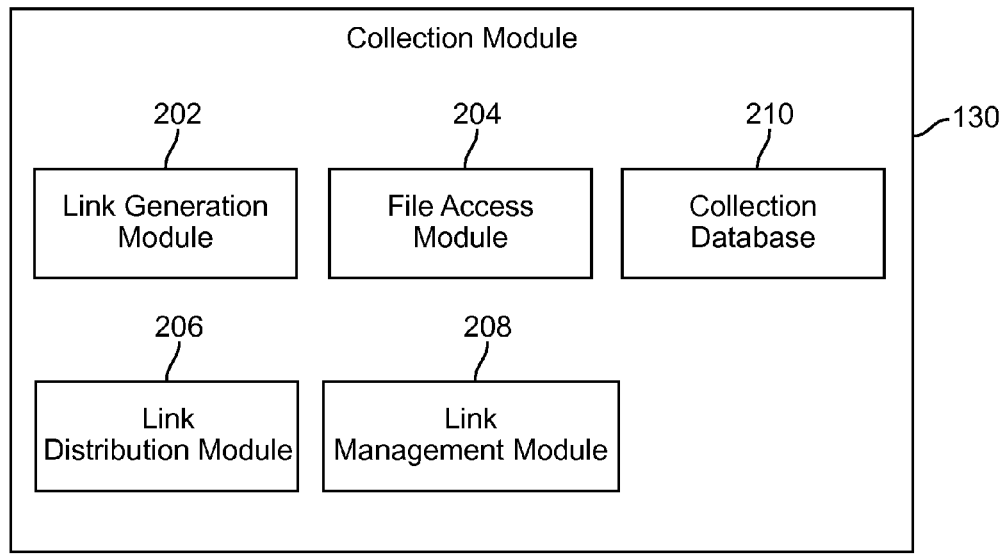
FIG. 2A is a block diagram of the components of a link based collection module in accordance with an exemplary embodiment.

Referring to FIG. 2A, a block diagram of the components of a link based collection module 130 in accordance with an exemplary embodiment is illustrated. Collection module 130 enables a collector to provide others, e.g., submitters, access to a collection folder, associated with the collector, through a link, e.g., a collection link. As shown, collection module 130 can include link generation module 202, file access module 204, link distribution module 206, link management module 208 and collection database 210. Link generation module 202 can generate a link to the collection folder. File access module 204 can allow a submitter to upload content. Alternatively, file access module 204 can allow a submitter to upload content and/or access content that the submitter has permission to access via the generated links. Link distribution module 206 can distribute one or more links to one or more submitters. Link management module 308 allows a collector to view generated links. Collection database 210 can maintain information about the content in a collection folder and related information such as whether a collection folder is activated or deactivated.

Link generation module 202 is configured to generate a link corresponding to a collection folder or collection folders specified by the collector. In one embodiment, upon receiving a file request, link generation module 202 generates a unique folder descriptor of the collection folder and a unique file location path or URL that serves as the link. Sharing module 206 saves an association of the collection folder descriptor and the file location path or URL to sharing database 210. In some embodiments, the generated file collection link is independent of the collection folder descriptor so that the collection folder descriptor cannot be inferred from the collection folder link, and vice versa. An independent collection folder descriptor and file location path or URL prevents malfeasance by making it essentially impossible to guess or reverse engineer a collection folder link if it is not already known. As an example, when a collection folder "Reunion" with a file ID of 3D8B99, link generation module 202 might generate a unique (e.g., one-way pad, or a pseudo-random value) URL such as https://www.service.com/s/28rtiz608u2mnco/BBQ.pdf, where the URL component 28rtiz608u2mnco cannot be reverse-engineered, and accordingly create an entry <3D8B99, https://www.service.com/s/28rtiz608u2mnco/BBQ.pdf> in collection database 210. In one embodiment, the generated link can further be shortened. In some embodiments, the generated URL https://www.service.com/s/28rtiz608u2mnco/BBQ.pdf can further be shortened using a link-shortening service to a shorter URL (e.g., http://db.tt/xOFounw), and an additional association between the original link and the shortened link can be added to sharing database 210. In another embodiment, the collection folder can be directly associated with the shortened link rather than with an intermediate, longer generated link.

In other embodiments, a collector can generate multiple different links to the same collection folder or collection folders. Thus, the collector can more selectively control access to the collection folder or collection folders by distributing different selections from among the multiple different links to different submitters. This may, for example, allow a collector to revoke certain submitters' access to the collection folder or collection folders while continuing to permit other submitters to access the file set (e.g., by deactivating certain submitters' links to the collection folder or collection folders while maintaining other submitters' links in active status). In other embodiments, a collector can deactivate a collection folder or collection folders. By deactivating a collection folder or collection folders, submitters can no longer upload content to the collection folder or collection folders. In addition, submitters are prohibited access to the collection folder or collection folders that are designated as deactivated.

Moreover, since a collection folder link is versatile, in some embodiments, the system may include reference to a particular relevant application, or applications, in a link by embedding an application identifier in the generated link. As an example, the generated link for a given collection folder could be the URL https://www.service.com?app=1ps3q/s/28rtiz608u2mnco/BBQ.pdf, which specifies (via the portion "app=1ps3q") that some application uniquely associated with the identifier "1ps3q" (e.g., Microsoft Word or Microsoft Visio) should be used to view a file in the collection folder. Alternatively, the association between the link and the application or application plug-in can be made as an entry in collection database 210, rather than by including an application identifier in the link. For example, in various embodiments, a user may generate a first link to a collection folder that specifies use of a first application for viewing a file in the collection folder, and a second link that specifies use of a second application for viewing a file in the collection folder. In this example, collection database 210 would in turn contain two corresponding entries: i.e., <collection file identifier, first link identifier, first application identifier> and <collection file identifier, second link identifier, second application identifier>. In another embodiment, link-based sharing module 26 may be configured to select the proper applications or application plug-ins to use in the file browser, e.g., based on the types of files in the collection folder. Link-based collection module 130 may also allow collectors to specify which application should open a particular file or set of files when the files are accessed via a particular link.

Malicious Code Detection

In one or more embodiments, communications interface module 120 can interface with a malicious content detection system 170 via an API. Communications interface module 120 can receive a submission by a submitter using client device 102$_i$ via network 104. In response to receiving the submission, communications interface module 120 can provide the submission to malicious content detection system 170. Communication interface module 120 can provide a submission to malicious content detection system 170 via network 104 and/or via one or more different networks. The one or more different networks can be a local area network (LAN) and/or other suitable communication networks (e.g., the Internet, a metropolitan area network (MAN), a wide area network (WAN) a mobile, a wire or wireless network, a private network, a virtual private network, etc.). Malicious content detection system 170 can scan the submission for malicious code, such as viruses, trojans, malware, etc.

Figure 2B:
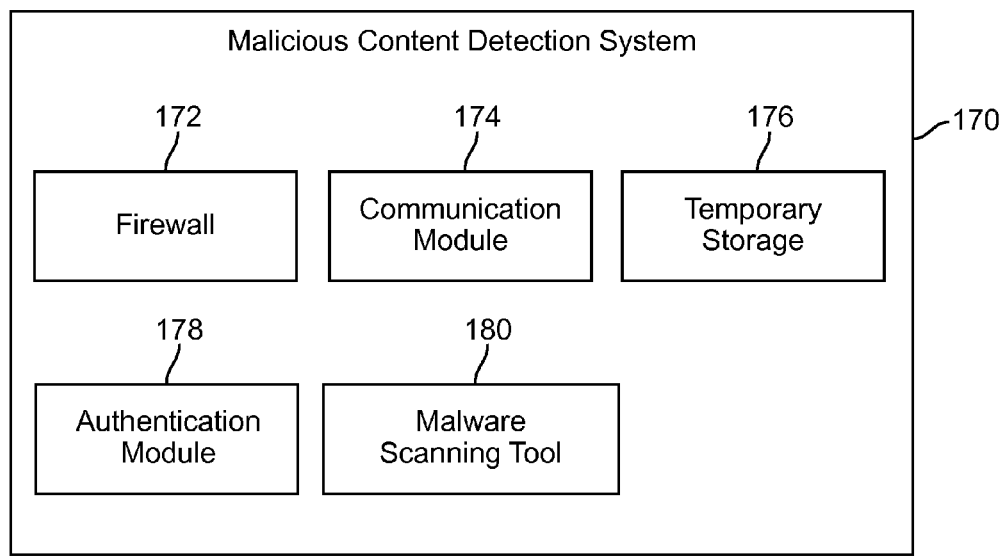
FIG. 2B is a block diagram of the components of a malicious content detection system in accordance with an exemplary embodiment.

Referring to FIG. 2B, a block diagram of the components of a malicious content detection system in accordance with an exemplary embodiment is illustrated. Malicious content detection system 170 can include firewall 172, communication module 174, temporary storage 176, authentication module 178 and malware scanning tool 180. Firewall 172 can be one or more firewalls with each being software and/or hardware. Firewall 172 can assist in preventing any malicious code from infecting content management system 106. Communication module 174 can receive and transmit submissions to and from content management system 106. Temporary storage module 176 can store the received submissions. Authentication module 178 can verify user credentials, security tokens, API calls, specific client devices, and so forth, to ensure only authorized clients submit files to content management system 106. Alternatively, authentication module 178 can communicate with authenticator module 126 of content management system 106 to ensure that the submitter is authorized. Malware scanning tool 180 can scan the submission for malicious code. If malicious code is detected, malware scanning tool 180 can attempt to remove the malicious code from the submission. If the removal is successful or if the submission does not contain malicious code, the submission can be provided to content management system 106 for additional processing. If the removal is unsuccessful, the submission can be quarantined from content management system 106 or deleted. Malware scanning tool 180 can be custom software or an off-the-shelf malicious code scanning software, such as, McAfee AVERT Virus Identification System (MAVIS) or McAfree AntiVirus Plus, both available from McAfee of Santa Clara, Calif., or Kaspersky AntiVirus software available from Kaspersky of Moscow, Russia. Malicious content detection system 170 can be part of content management system 106 or can be a third party service that provides malicious content detection for content management system 106.

Customization

Referring to FIG. 1, content management system 106 can include customization module 136, which can allow a collector to customize settings/parameters for a file request by providing submitters with guidance and/or structure for the submissions. The customization settings can allow the collector to specify the number of submissions that a submitter can submit in response to a file request, specify the type of files to be submitted in response to a file request, allow a submitter to override a previous submission, allow white labeling on an upload user interface (UI), allow for the use of a template file for submissions, specify a deadline for a file request and allow for a previous file request to be used again. In one or more embodiments, the customization settings can be default settings.

A number of submissions setting can control the number of submissions each submitter can submit. For example, the collector can limit each submitter to upload only one submission. In another example, the collector can allow users to submit multiple submissions in response to the same file request. The collector can choose a number setting or an unlimited setting to control the number of submissions. A file type setting can control the type of files that a submitter can submit. For example, the file type setting can allow a collector to choose one or more file types. The file types can include, but are not limited to, .doc, .docx, .xls, .pdf, .zip, .mov, .jpg or any other file types. The override setting allows a collector to permit a submitter to replace or override a previous submission. By allowing a submitter to replace a previous submission, the override setting can reduce the number of submissions that are received in the collection folder. The override setting can be a yes or no setting with yes permitting overrides and no prohibiting overrides. The white labeling setting can allow a collector to have a logo or text displayed on the upload page. The white labeling setting can be a yes or no setting with yes permitting white labeling and no prohibiting white labeling. The template setting can allow a collector to use a template file. As discussed below, template module 138 generates a copy of the template file for each submitter. As a result, each submitter can modify the template file and save the modified template file to the collection folder. For example, a teacher can generate a template file for a homework assignment and have each student modify the student's template file. As a result, each submitter can modify the template file and save the modified template file to the collection folder. U.S. patent application Ser. No. 14/961,094 entitled "Sharing A Template File" filed on the same day as this application is hereby incorporated in its entirety. The deadline setting can allow a collector to set a deadline for permitting uploads to the collection folder. The previous file request setting allows a collector to reuse a previous file request. The previous file request setting allows a collector to select a previous file request. The previous file request setting allows a collector to select a previous file request from a rendered list of previous file requests. Once selected, the collector can select one or more of the customization settings to customize the settings of the previous file request. For example, the collector can update the deadline for the new file request.

Example User Experience

Figure 3:
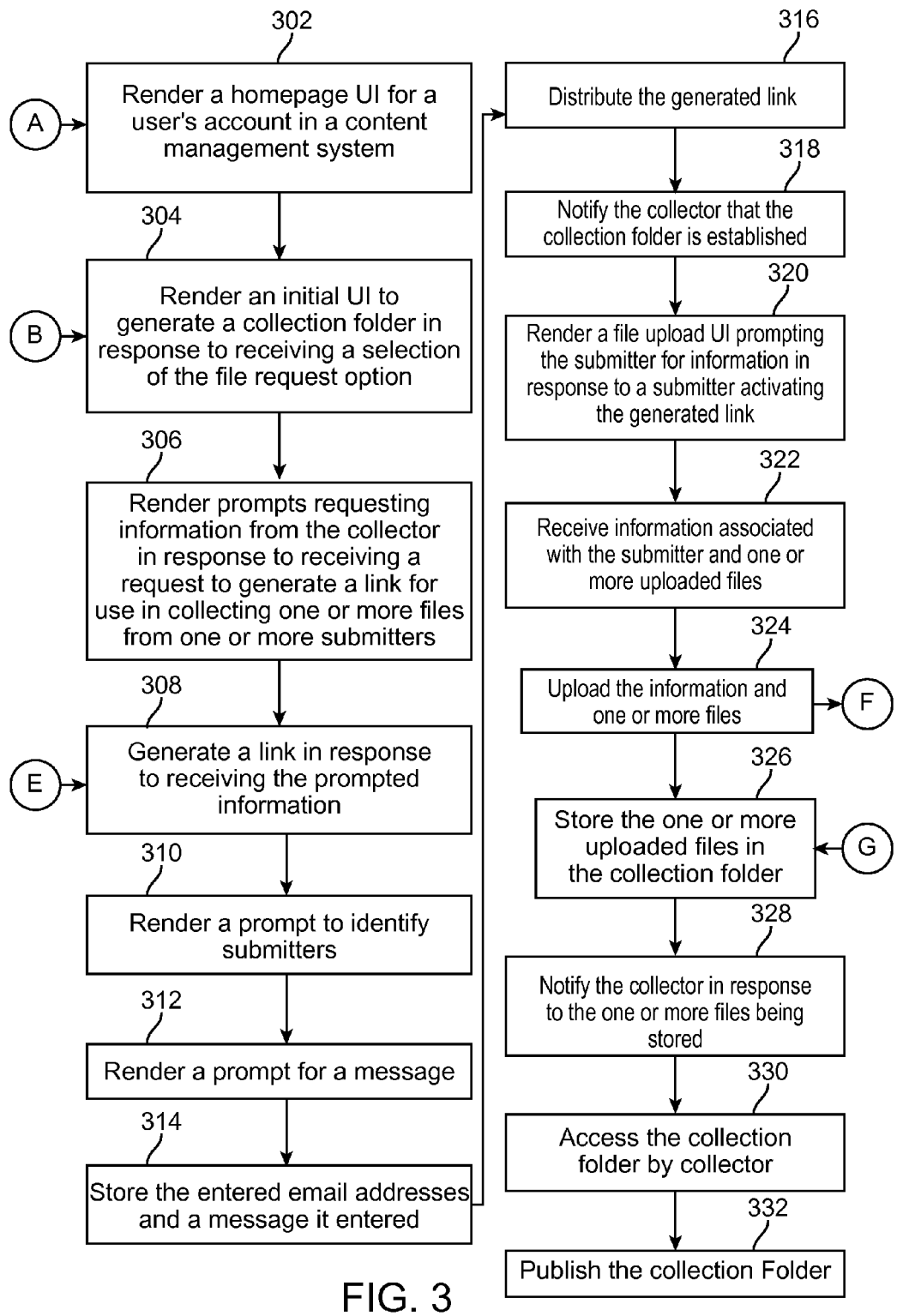
FIG. 3 is a flowchart for a method for generating a collection folder in accordance with an exemplary embodiment.

Referring to FIG. 3, a flowchart for a method for generating a collection folder in accordance with an exemplary embodiment is illustrated. Exemplary method 300 is provided by way of example, as there are a variety of ways to carry out the method. Method 300 described below can be carried out using the configurations illustrated in FIGS. 1 and 2A by way of example, and various elements of these figures are referenced in explaining exemplary method 300. Each block shown in FIG. 3 represents one or more processes, methods or subroutines, carried out in exemplary method 300. Exemplary method 300 can begin at block 302.

Figure 4A:
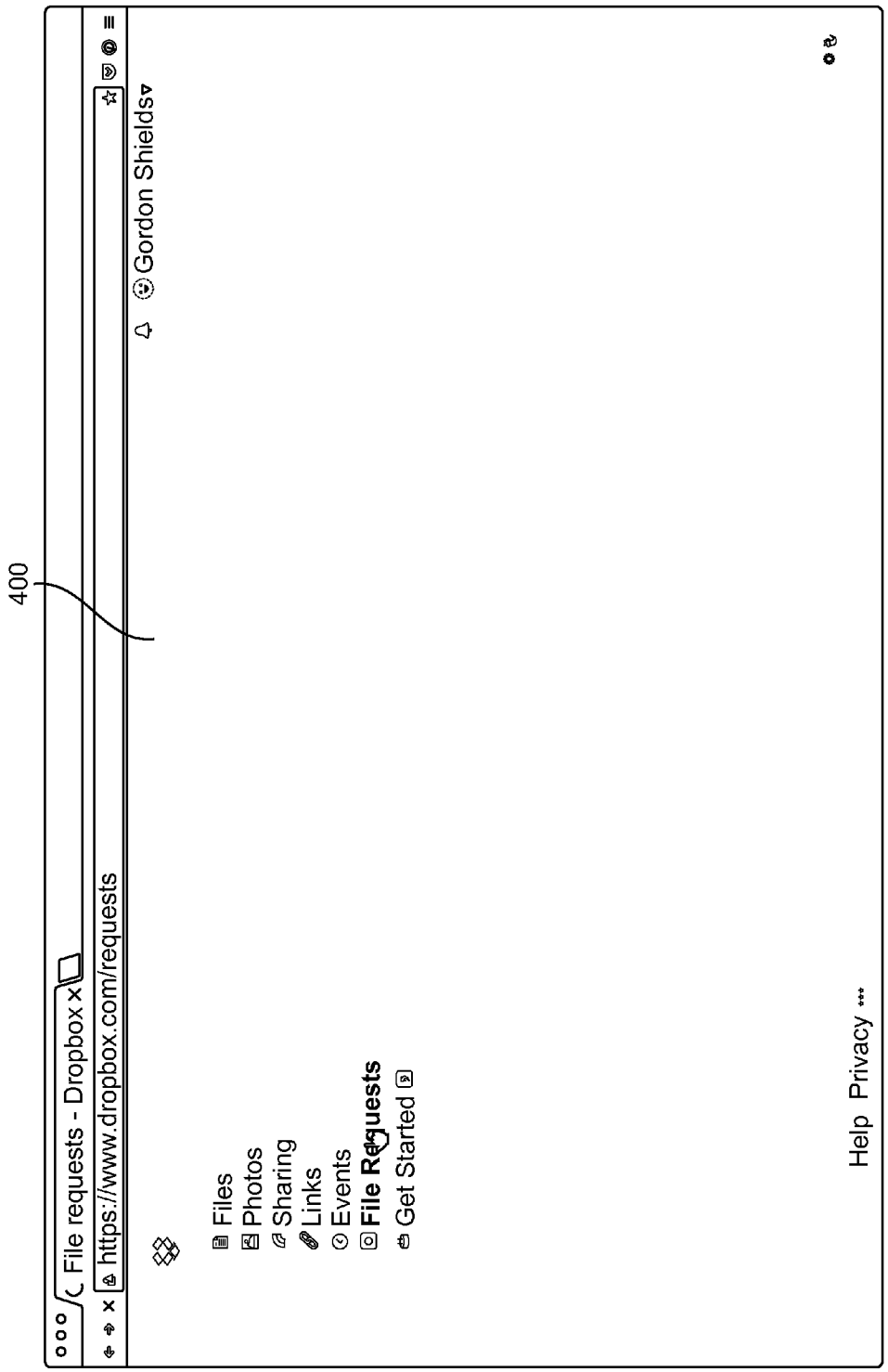
FIG. 4A is a homepage UI for an empty user's account in accordance with an exemplary embodiment.

At block 302, render a homepage UI for a user's account in content management system 106. For example, UI module 122 causes the rendering of a homepage UI for a user's account in content management system 106 to be rendered on collector's client device $102_i$. The rendering can be in response to a collector accessing the user's account via a web browser. To access the collector's account, the collector can click on an icon displayed on the collector's client device $102_i$ or by entering the domain name in a web browser on the collector's client device $102_j$. FIG. 4A shows rendered homepage UI 400 on a user's client device $102_i$ rendered homepage UI 400 is for an empty user's account along with a menu on the left with the "file request" menu option. FIG. 4B shows rendered homepage UI 410 on a user's client device $102_i$ rendered homepage 410 is for a non-empty user's account with a list of folders and files in a user's account along with a menu on the left with the "file request" menu option. After rendering the homepage UI for a user's account, method 300 can proceed to block 304 or to block 306.

Figure 5A:
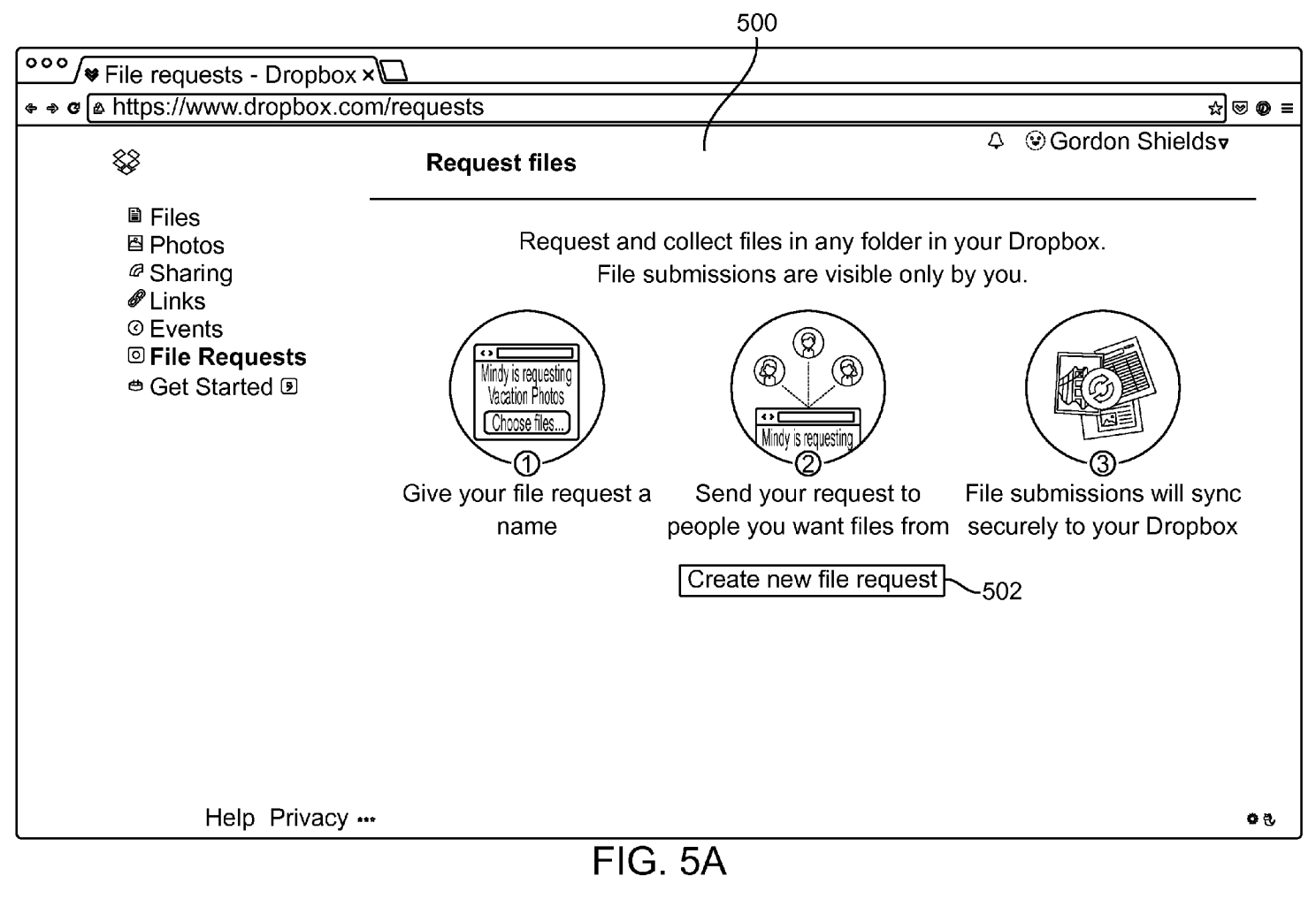
Figure 5B:
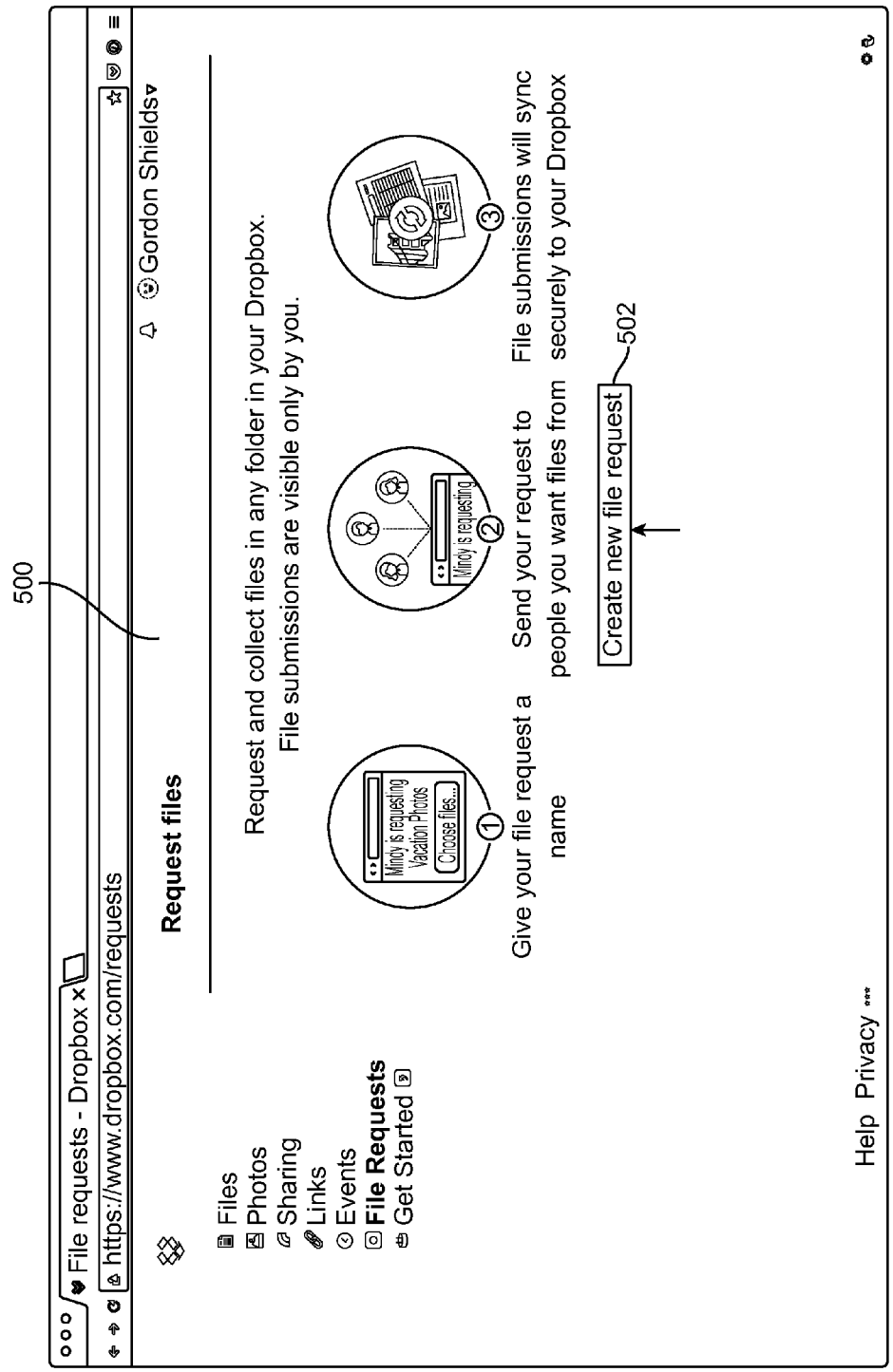
FIG. 5B is an initial homepage UI for creating a collection folder with a "create new file request" button being selected in accordance with an exemplary embodiment.

At block 304, render an initial homepage UI to generate a collection folder in response to receiving a selection of the file request menu option. For example, UI module 122 receives a selection of the file requests menu option and in response, causes the initial homepage to generate a collection folder to be rendered on the collector's client device 102. FIG. 5A shows an initial homepage UI 500 for creating a collection folder. In addition, information associated with collection folders can be rendered as shown. For example, the additional information can be "Give your file request a name," "Send your request to people you want files from" and "File submissions will sync securely to your Dropbox." FIG. 5B shows an initial homepage UI 500 for creating a collection folder with "create new file request" button 502 being selected. Rendering initial homepage UI 500 for creating a collection folder can be optional. After rendering initial homepage UI 500 to generate a collection folder, method 300 can proceed to block 306.

At block 306, render prompts requesting information from the collector in response to receiving a request to generate a link for use in collecting one or more files from one or more submitters. The request to generate a link can be from the collector selecting the file request menu option or from the collector selecting the create new file request. For example, UI module 122 receives a request to generate a link and causes the rendering of prompts requesting information from the collector to be rendered on the collector's client device $102_i$. The prompts can be rendered in various forms. For example, an initial UI prompting the collector for information can be rendered on the collector's client device $102_i$.

Figure 6:
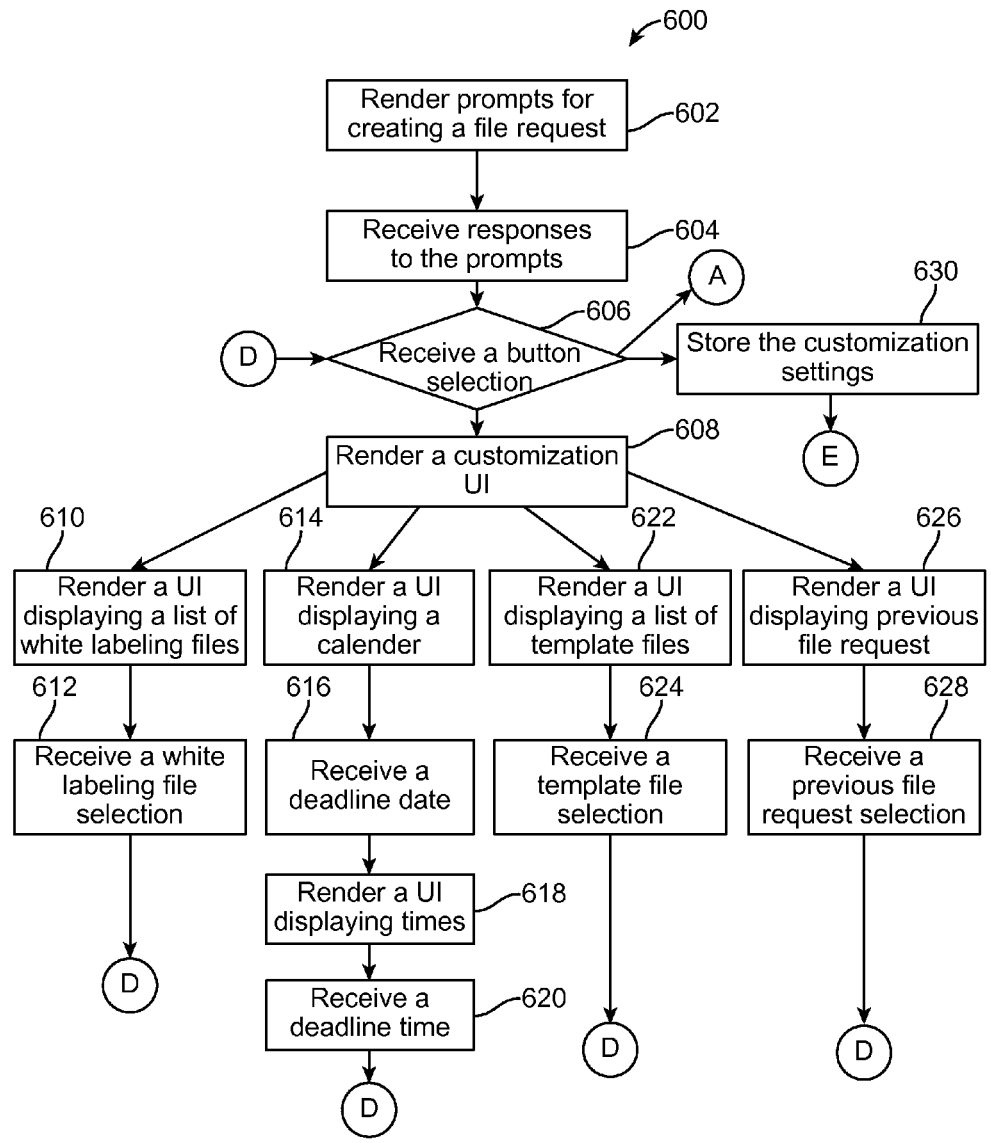
FIG. 6 is a flowchart for a method for rendering prompts requesting information from the collector in accordance with an exemplary embodiment.

Referring to FIG. 6, a flowchart for a method for rendering prompts requesting information from the collector in accordance with an exemplary embodiment is illustrated. Exemplary method 600 is provided by way of example, as there are a variety of ways to carry out the method. Method 600 described below can be carried out using the configurations illustrated in FIGS. 1 and 2A by way of example, and various elements of these figures are referenced in explaining exemplary method 600. Each block shown in FIG. 6 represents one or more processes, methods or subroutines, carried out in exemplary method 600. Exemplary method 600 can begin at block 602.

Figure 7A:
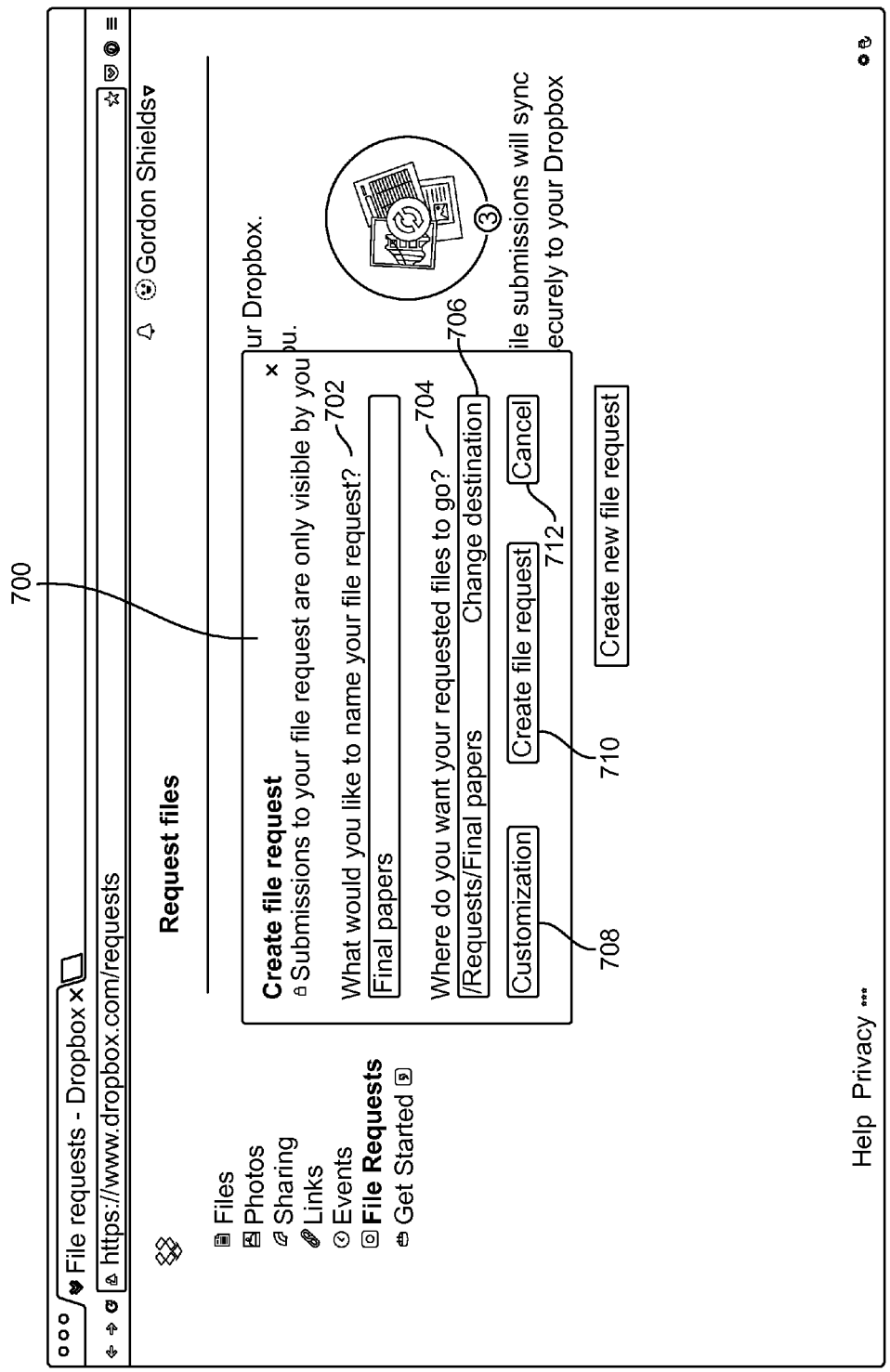
FIG. 7A is an initial UI rendering prompts in accordance with an exemplary embodiment.

At block 602, render prompts for creating a file request. For example, UI module 122 causes an initial UI to be rendered on the collector's client device $102_i$ prompting the collector to enter a name for the file request and a location where the requested files should be stored. For example, FIG. 7A shows exemplary initial UI 700 rendering prompts "What would you like to name your file request?" 702 and "Where do you want your requested files to go?" 704. After rendering the prompts for creating a file request, method 600 can proceed to block 604.

At block 604, receive responses to the prompts. For example, UI module 122 receives responses to the rendered prompts. Based on the submission to the name of the file request, UI module 122 can autofill the destination response. The destination response can be based on the name of the file request. Referring to FIG. 7A, the requested files will be called "Final papers" and the collected files will be stored in a "Final papers" collection folder under the Requests folder in the collector's user account, e.g., "/Requests/Final papers." The collector can change the destination by selecting change destination button 706. After receiving responses to the prompts, method 600 can proceed to block 606.

At block 606, receive a button selection. For example, UI module 122 receives a button selection. Referring to FIG. 7A, the collector can customize the file request by selecting customization button 708, can create the file request by selecting a create file request button 710 and/or can cancel the file request by selecting the cancel button 712. If the customization button 708 is selected, method 600 can proceed to block 608. If the create file request button is selected, method 600 can proceed to block 308 of FIG. 3. If the cancel button is selected, method 600 can proceed to block 302 of FIG. 3.

Figure 7B:
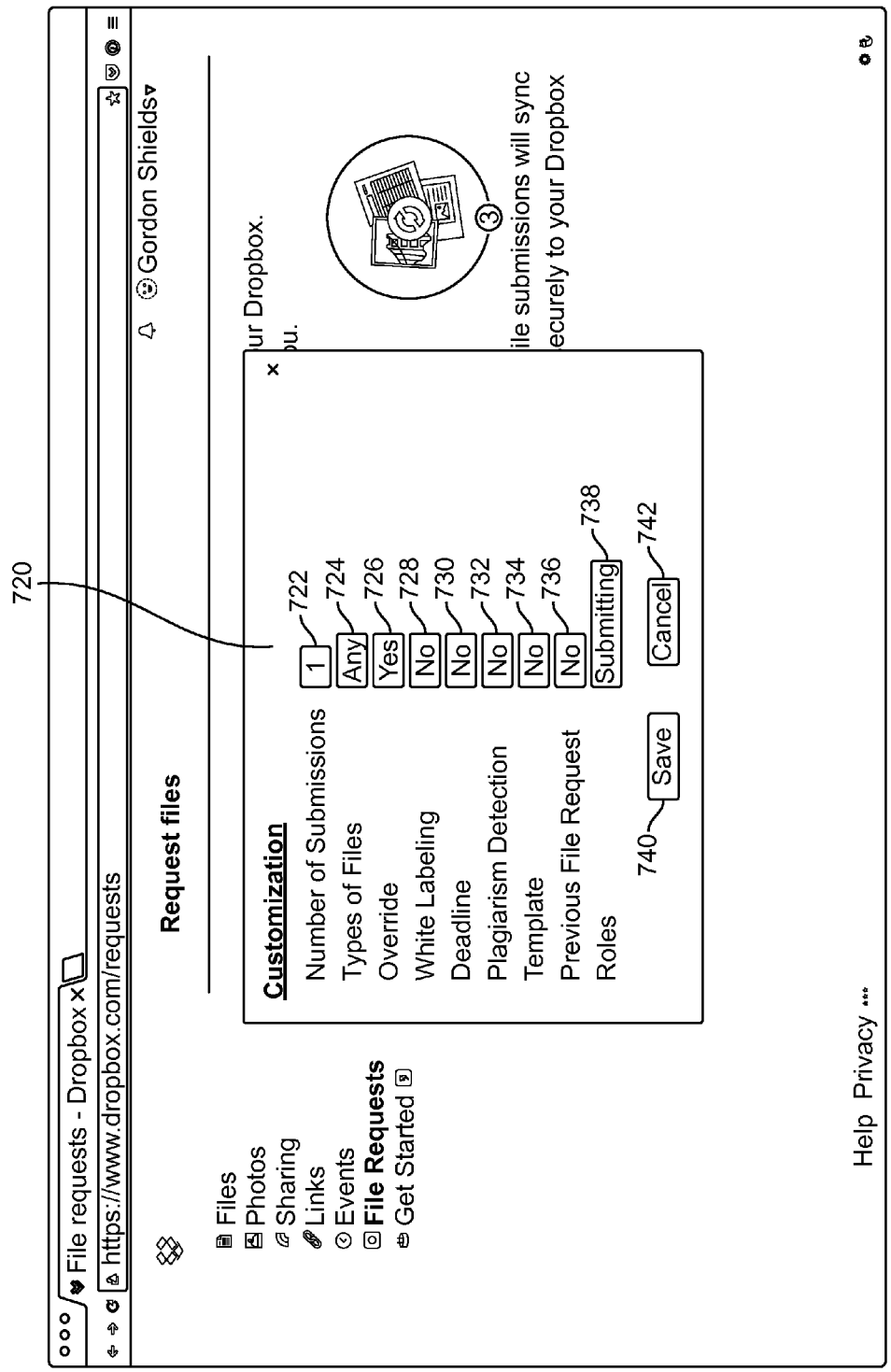
FIG. 7B is a customization UI in accordance with an exemplary embodiment.

At block 608, render a customization UI. For example, UI module 122 and/or the customization module 136 causes a customization UI to be rendered on the collector's client device 102$_i$. Referring to FIG. 7B, a customization UI is rendered on the collector's client device 102$_i$ and shows the customization settings. As shown, the collector can customize the file request by specifying one or more settings, such as the number of submissions 722, types of files that can be submitted 724, override 726, white labeling 728, deadline 730, plagiarism detection 732, template 734, previous file request 736 and roles 738.

The customization settings can be set using various methodologies. The following is one methodology that can be used. By selecting "Number of Submissions" setting 722, customization module 136 causes a drop down menu to be rendered on the collector's client device 102$_i$ with different numbers being displayed for the maximum number of submissions a submitter can submit. The default number of submissions setting 722 can be one. If a submitter attempts to submit more than the maximum permitted, UI module 122 can cause a message to be rendered on the submitter's client device 102$_i$ informing the submitter that the submitter has reached the maximum submissions. By selecting the "Types of Files" setting 724, customization module 136 causes a drop down menu to be rendered on the collector's client device 102$_i$ with different file types being displayed. The collector can select one or more of the drop down menu selections for the different types of files that are permitted. The default types of files setting 724 can be any. If a submitter attempts to load a file type that is not permitted, user interface module 122 can cause a message to be rendered on the submitter's client device 102$_i$ informing the submitter that the file type is not permitted. By selecting the "Override" setting 726, the collector can choose yes (permit) or no (prohibit) to allow or deny a submitter from replacing a submission. The default override setting 726 can be permitted. By selecting the "White Labeling" setting 728, the collector can choose yes to have white labeling or no to not have white labeling. If yes is selected, the collector can be prompted to upload a file containing the white labeling image. The default white labeling setting 728 can be no. By selecting the "Deadline" setting 730, the collector can choose yes to have a deadline or choose no not to have a deadline. If yes is selected a calendar can be rendered in which the collector can choose a date for a deadline. In addition, a dropdown menu can be displayed prompting the collector to select a time for the deadline. The default deadline setting 730 can be no. By selecting the "Plagiarism" setting, the collector can elect to have the submissions scanned for plagiarism by selecting yes or not to have the submissions scanned for plagiarism by selecting no. The default plagiarism detection setting 732 can be no. By selecting the "Template" setting 734, the collector can choose yes to use a template or no not to use a template. If yes is selected, the collector can be prompted to upload a template file. The default template setting 734 can be no. By selecting the "Previous File Request" setting, the collector can choose yes to use a previous file request or no not to use a previous file request 736. If yes is selected, the collector can be prompted to select a previous file request. The default previous file request setting 736 can be no. By selecting the "Roles" setting 738, a dropdown menu can be rendered allowing the collector to choose between submitter and submitter/viewer. The submitter setting allows a user to submit files. The submitter/viewer setting allows for a submitter/user to submit files and a viewer can access the collection folder to see if a corresponding submitter submitted a file. The viewer can be a parent or guardian and has limited rights, such as viewing only rights. The viewer, like the submitter, can only view files that the corresponding submitter has submitted. In one or more embodiments, the collector can be prompted to enter a corresponding email address for a viewer when the collector is prompted to enter the submitter's email addresses. For example, the collector can enter an "&" between a submitter's email address and the viewer's email address or there can be separable fields for the submitter's and the viewer's email addresses. In one or more embodiments, the submitter can be prompted to enter a viewer's email address when uploading a file. If the collector selected the white labeling setting 728, method 600 can proceed to block 610. If the collector selected the deadline setting, method 600 can proceed to block 614. If the collector selected the template setting, method 600 can proceed to block 622. If the collector selected the previous file request setting, method 600 can proceed to block 626. If the collector selected the save button 740, method 600 can proceed to block 630. If the collector selected the cancel button 742, method 600 can proceed to block 308 of FIG. 3.

Figure 7C:
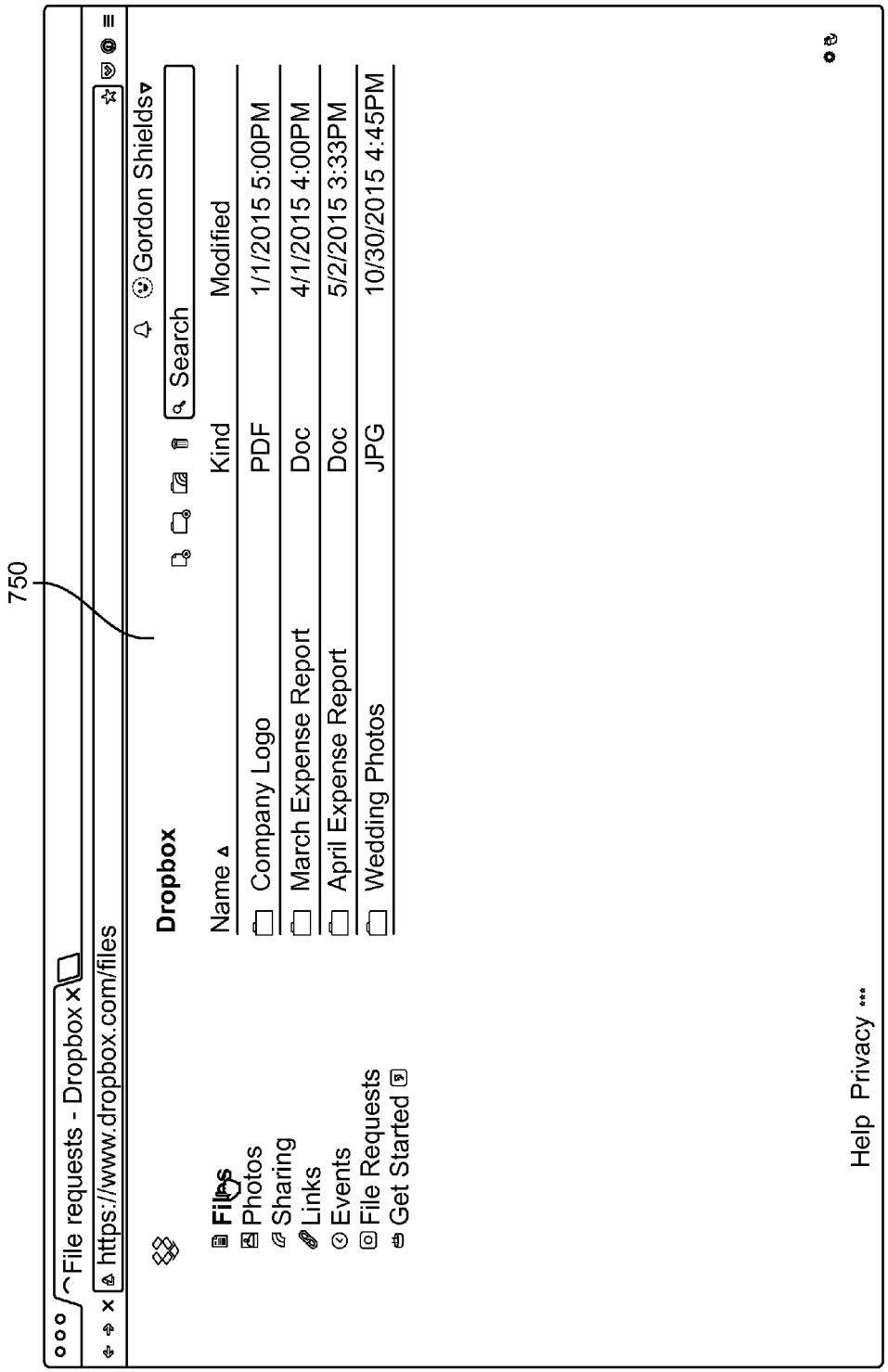
FIG. 7C is a file listing UI displaying files that the collector can choose for white labeling in accordance with an exemplary embodiment.

At block 610, render a file listing UI displaying a list of white labeling files. For example, UI module 122 and/or customization module 136 can render a file listing UI on the collector's client device 102$_i$ displaying white labeling files for the collector to select a file for the white labeling. FIG. 7C shows file listing UI 750 displaying files that the collector can choose for the white labeling. After rendering the file listing UI displaying a list of files, method 600 can proceed to block 612. At block 612, receive a white file labeling selection. For example, UI module 122 and/or customization module 136 receives a selection of a rendered file to be used for white labeling. After receiving the selection, method 600 can proceed to block 606.

At block 614, render a UI displaying a calendar. For example, UI module 122 and/or customization module 136 renders a UI on the collector's client device 102$_i$ displaying a calendar for the collector to select a deadline. After rendering the UI displaying a calendar, method 600 can proceed to block 616. At block 616, receive a deadline date. For example, UI module 122 and/or customization module 136 receives a deadline date. After receiving the deadline date, method 600 can proceed to block 618. At block 618, render a UI displaying times. For example, UI module 122 and/or customization module 136 renders a UI on the collector's client device 102$_i$ displaying times for the collector to select a deadline. After rendering the UI displaying times, method 600 can proceed to block 620. At block 620, receive a deadline time. For example, UI module 122 and/or customization module 136 receives a deadline time. After receiving the deadline time, method 600 can proceed to block 606.

Figure 7D:
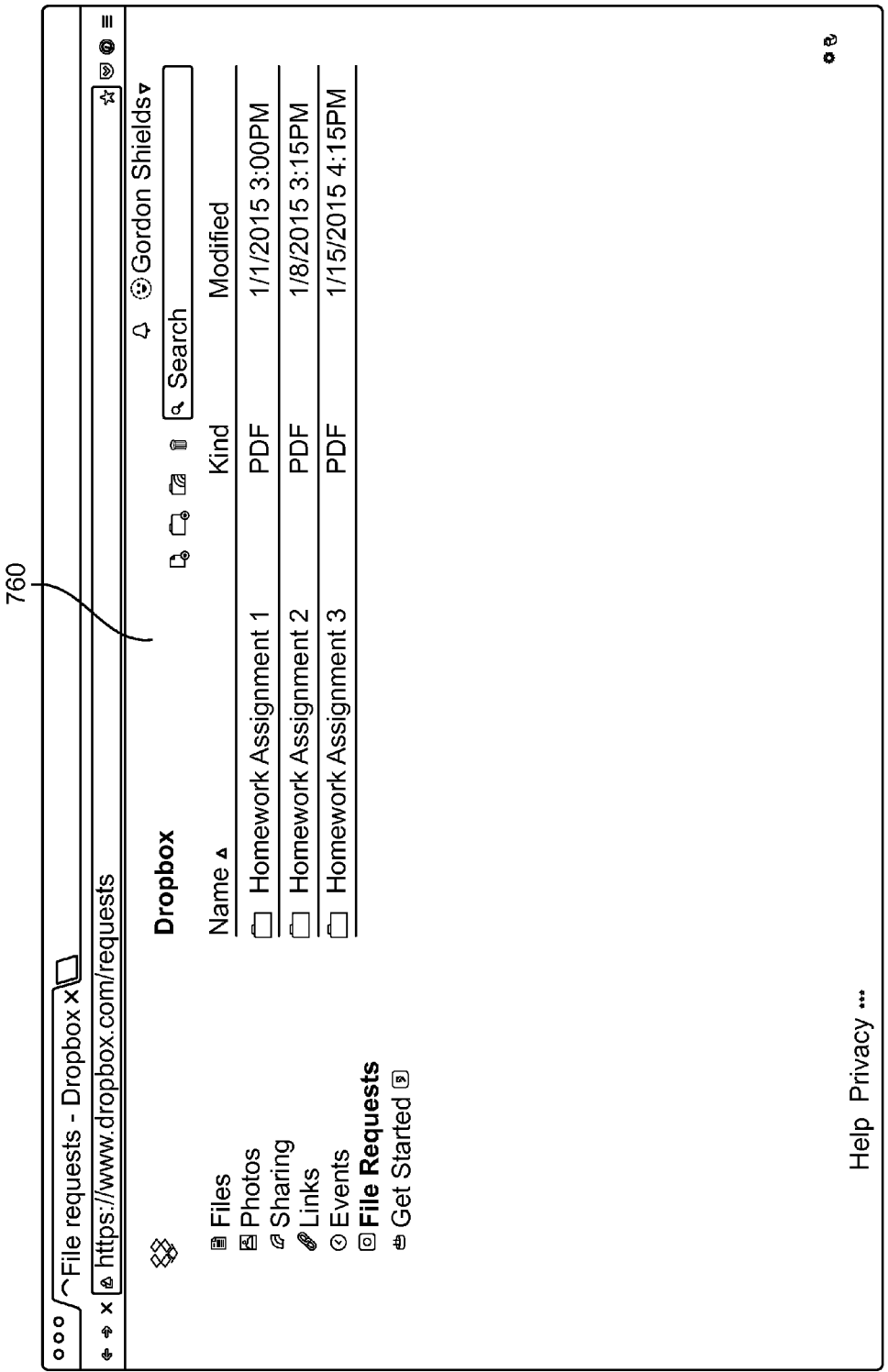
FIG. 7D is a UI displaying template files in accordance with an exemplary embodiment.

At block 622, render a UI displaying a list of template files. For example, UI module 122 and/or customization module 136 renders a UI on the collector's client device 102$_i$ displaying a list of template files from which to select a template file. FIG. 7D shows UI 760 displaying template files that the collector can choose for the template. After rendering the UI displaying a list of template files, method 600 can proceed to block 624. At block 624, receive a template file selection. For example, UI module 122 and/or customization module 136 receives a selection of a template file. After receiving the template file selection, method 600 can proceed to block 606.

At block 626, render a UI displaying previous file requests. For example, UI module 122 and/or customization module 136 can render a UI on the collector's client device 102$_i$ displaying a list of previous file requests to select a previous file request. For example, FIG. 4B shows a UI displaying previous file requests from which the collector can choose. After rendering the UI displaying a list of previous file requests, method 600 can proceed to block 628. At block 628, receive a previous file request selection. For example, UI module 122 and/or customization module 136 receives a selection of a previous file request. After receiving the previous file request selection, method 600 can proceed to block 606.

At block 630, store the customization settings. For example, UI interface 122 and/or customization module 136 can store and associate the customization settings with the file request. After storing the customization settings, method 600 can proceed to block 308 of FIG. 3.

Referring to FIG. 3, at block 308, generate a link in response to receiving the prompted information. For example, link generation module 202 generates a collection link to a designated collection folder using at least some of the information received from the prompts, e.g., where the collector would like the uploaded files to be stored. If the designated collection folder does not exist, link generation module 202 can create the collection folder. Link generation module 202 can store the generated collection link. The generated collection link can be stored in one or more locations. For example, the generated collection link can be associated with the collection and stored in content storage 160 and/or in an activity log. After generating the link, method 300 can proceed to block 310.

Figure 8A:
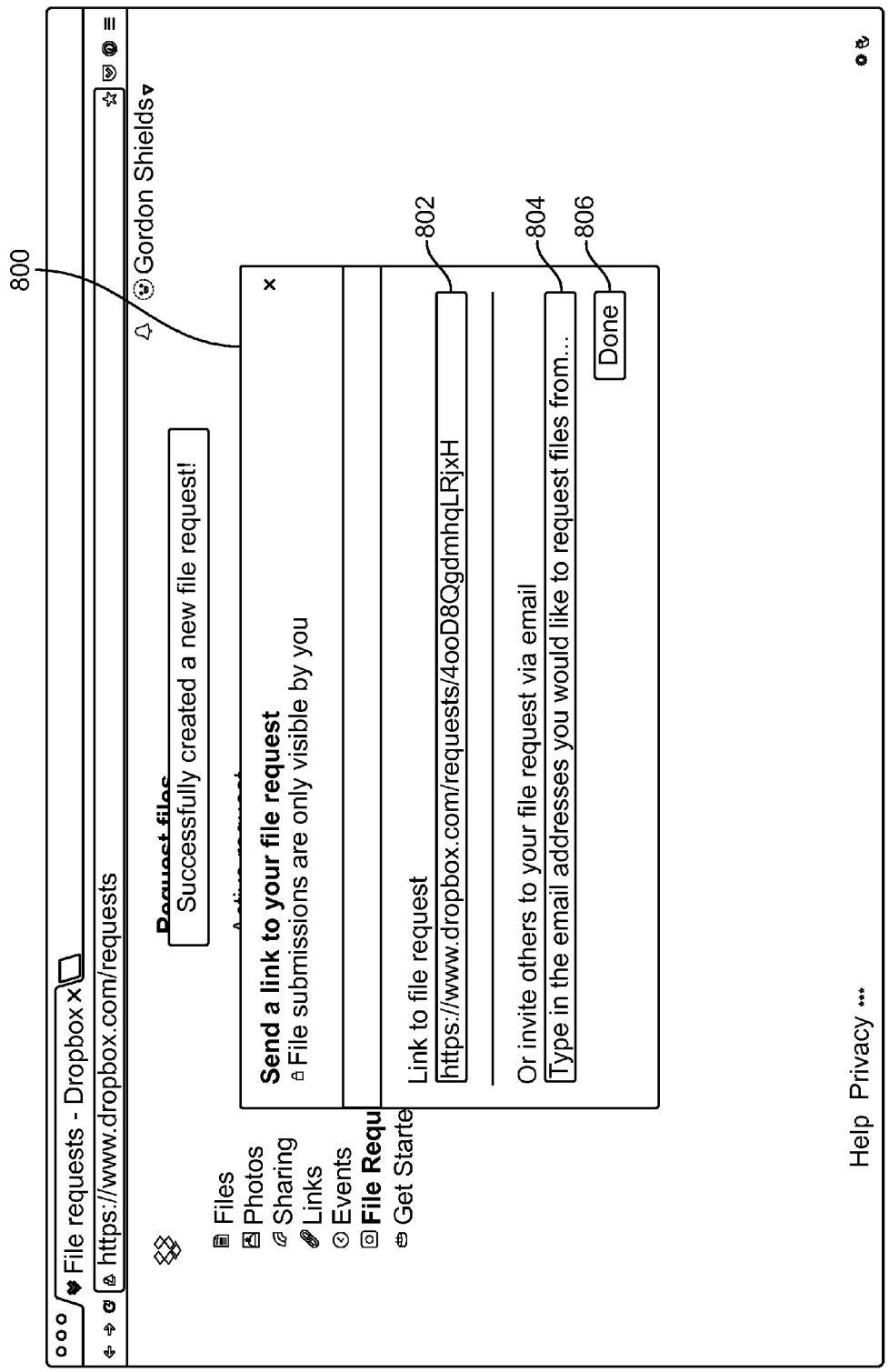
FIG. 8A, is a submitter invite UI in accordance with an exemplary embodiment.

At block 310, render a prompt to identify submitters. For example, UI module 122 renders a submitter invite UI on the collector's client device 102$_i$ prompting the collector to enter email addresses of one or more submitters. As shown in FIG. 8A, the submitter invite UI 800 renders a generated collection link 802. In this example, the collection link is "https://meta-dbdev.dev.corp.dropbox.com/drops/4ooD8QgdMhqt.RjxHl." Rendering the generated collection link can be optional. Submitter invite UI 800 can prompt the collector to invite submitters to upload content to the collection folder. For example, the prompt is "Or invite others to your file request via email." The collector can enter one or more email addresses for one or more submitters in invite box 804. Alternatively, the collector can copy the file request link for later use. If the collector used a previous file request, the email addresses associated with the previous file request can be auto-filled into the invite box. If the user enters one or more email addresses and selects done button 806 rendered on submitter invite UI 800, method 300 can proceed to block 312. If the user does not enter one or more email addresses and selects done button 806 rendered on submitter invite UI 800, method 300 can proceed to block 316.

Figure 8B:
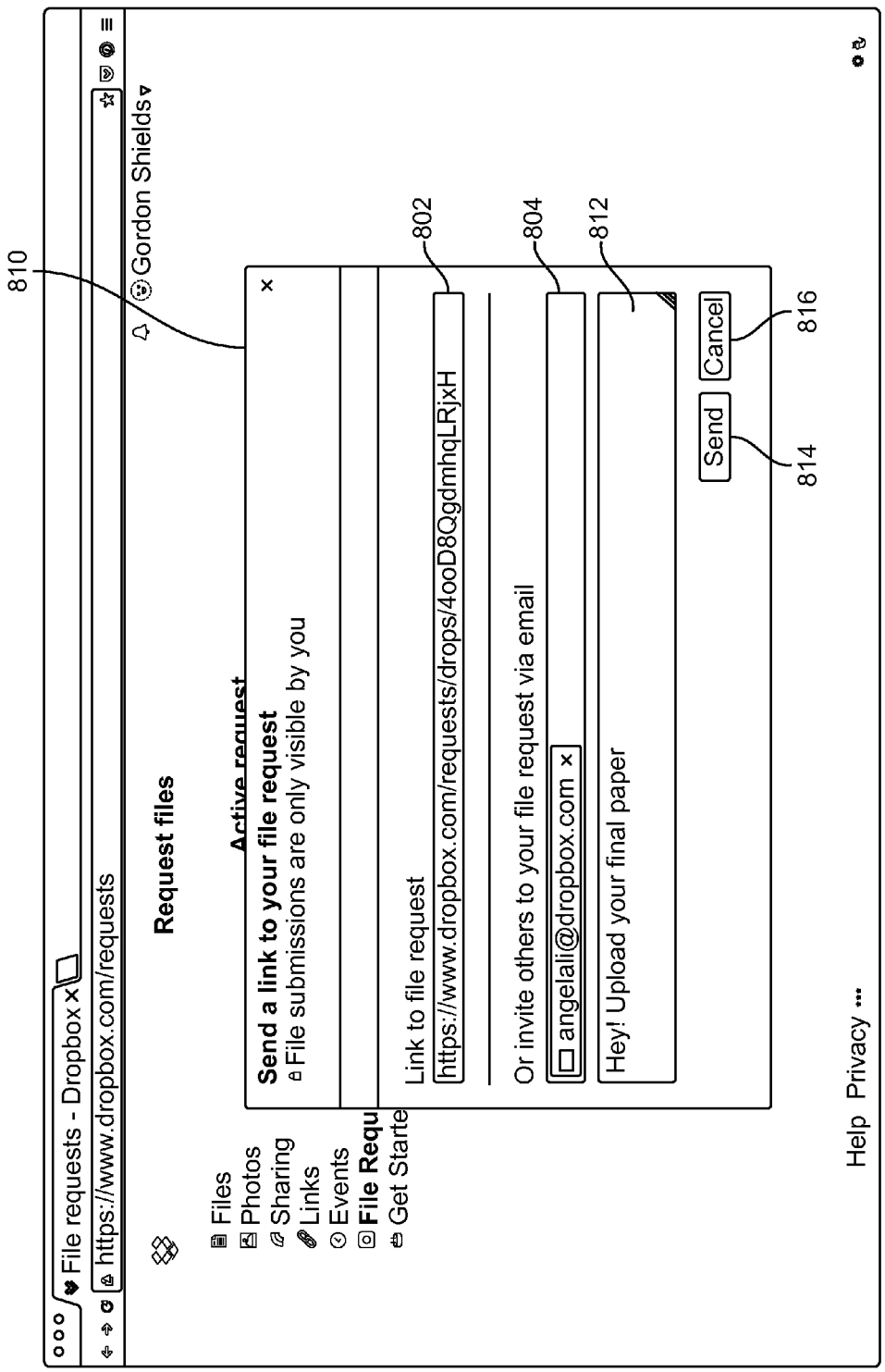
FIG. 8B is a second submitter invite UI in accordance with an exemplary embodiment.

At block 312, render a prompt for a message. For example, UI module 122 renders a second submitter invite UI on the collector's client device 102$_i$ prompting the collector to enter a message to be sent to the one or more submitters along with the file request link. As shown in FIG. 8B, second submitter invite UI 810 can display file request link 802, entered email addresses 804 and comment box 812 for entering a comment. Rendering the generated collection link can be optional. As shown in FIG. 8B, the exemplary email address is anglealli@dropbox.com and the message is "Hey! Upload your final papers here." To have the file requests sent, the collector can select send button 814 rendered on second submitter invite UI 810. Alternatively, the collector can select cancel button 816 rendered on second submitter invite UI 810 to cancel the file request. After receiving information to the prompts and receiving the selection of the send button, method 300 can proceed to block 314.

At block 314, store the entered email addresses and a message if entered. For example, UI module 122 can store the entered email addresses and the message, if entered, in content storage 160. After storing the one or more email addresses and a message, if entered, method 300 can proceed to block 316.

At block 316, distribute the generated link. For example, collection module 130 and/or email module 140 sends an email message based on at least some of the received information. The email message can contain the generated link, and the message, if entered, to the one or more submitters whose email addresses were entered by the collector. In another example, the collector can type or paste the generated collection link in an email message and send it. In another example, the collector can paste the generated collection link in a website, such as a social network website. The email message or the website can contain the generated collection link, which the submitter can click on to upload one or more files to the collection folder. The email message can contain a hypertext link for the generated collection link. If the collector customized the file request, the email message can contain information based on the customization settings. For example, the email message can indicate the number of submissions that the submitter is allowed to submit, the types of file that the submitter can submit, if the submitter is permitted to override a submission and a deadline for completing a submission. If the file request is based on a template file, the submitter can be informed to complete the template file and submit the completed template file. If the collector did not enter an email address, an email message containing the generated collection link can be sent to the collector. After distributing the generated collection link, method 300 can proceed to block 318.

At block 318, notify the collector that the collection folder request is established. Notification can include, but is not limited to, email, text message, posting to the account, application notifications (e.g., in-band notifications) or any other means of notification. For example, collection module 130 and/or email module 140 sends an email message to the collector informing the collector that the collection folder request has been established. After notifying the collector that the collection folder request is established, method 300 can proceed to block 320.

At block 320, render a file upload UI prompting the submitter for information in response to a submitter activating the generated collection link. For example, UI module 122 causes a file upload UI to be rendered on the submitter's client device $102_i$. FIG. 9A shows rendered file upload UI 900. As shown, the submitter is prompted to enter first name 902, last name 904, email address 906, choose files 908 to upload to the collection folder and to add comment 910. In one or more embodiments, rendered file upload UI 900 can inform the submitter of any customization settings, such as, number of submissions permitted 912, type of files permitted 914, if overrides 916 are permitted and deadline 918, if any. If the file request was customized, then one or more of the customization setting can be displayed. In one or more embodiments, the customization settings can be displayed or not displayed if no customization settings were displayed. The rendered file upload UI 900 can render white labeling 920 if the collector elected to display one. As shown, ABC Corp. logo 920 is displayed as white labeling. After rendering the file upload page, method 300 can proceed to block 322.

At block 322, receive information associated with the submitter and one or more uploaded files. For example, UI module 122 receives information provided by the submitter in response to the prompts and the selection of one or more files to be uploaded. To select the one or more files to be uploaded, the submitter can select the choose files option and a directory of the submitter's client device $102_i$ can be rendered allowing the submitter to select one or more files for uploading. The submitter can enter a comment in response to comments prompt 910, which will be provided to the collector. After receiving the information and the selection of one or more files to be uploaded, method 300 can proceed to block 324.

At block 324, upload the information and one or more selected files. After providing the information and selecting one or more files to upload, the submitter can select upload button 922 shown in FIG. 9A to upload the information and one or more files to content management system 106. For example, the client software on the submitter's client device $102_i$ can cause the information and one or more selected files to be uploaded to content management system 106. After uploading the information and one or more files, method 300 can proceed to block 326.

At block 326, store the one or more uploaded files. For example, content item management module 128 stores the one or more uploaded files in content storage 160. The one or more uploaded files can be stored in the collection folder and/or be associated with the collection folder. A content directory can identify the location of each content item in content storage 160. The content directory can include a unique content entry for each content item stored in content storage 160. The content entry can include a content pointer that identifies the location of the content item in content storage 160 if the submitter has an account with content management system 106. After storing the one or more uploaded files, method 300 can proceed to block 328.

At block 328, notify the collector in response to one or more files being stored in the collection folder. Notification can include, but is not limited to, email, text message, posting to the account, application notifications (e.g., in-band notifications) or any other means of notification. For example, account management module 124, email module 140 and/or link distribution module 206 causes an email message to be sent to the collector notifying the collector that one or more files have been uploaded to the collection folder. The email message can provide information associated with the uploaded one or more files. For example, the information can include the file name, a timestamp for when the file was uploaded and the name of the submitter for each uploaded file. After notifying the collector of one or more files being stored in the collection folder, method 300 can proceed to block 330.

At block 330, access the collection folder by the collector. For example, the collector can access the collector's account and can select the collection folder. The collector can access the collector's account via a web browser or via the client software residing on the collector's client device $102_i$. Alternatively, the collector can click on a link in the email message to access the collection folder. After accessing the collection folder, method 300 can proceed to block 332.

At block 332, publish the collection folder in response to a publish command. For example, collection module 130 can receive a publish command and cause the collection folder to be available to the submitters. As a result, a submitter can access the collection folder and view other submitters' uploaded files. Block 332 is further discussed below.

Roles/Permission

In one or more embodiments, content management system 106 does not require the submitter to be authenticated in order to submit one or more files. In one or more embodiments, the submitter can be authenticated. For example, authenticator module 134 can perform the authentication of a submitter prior to storing the submitter's uploaded content. In order for a submitter to upload content to the collection folder, the submitter uses the file request link and enters limited data, such as, a first name, last name and email address. Authentication can include the submitter having to login into the submitter's user account and/or entering a password. Authenticator module 126 can authenticate a submitter by determining if the user is logged into a user account. If the submitter is not logged into a user account, the submitter can be prompted to enter user account login information. For example, the submitter can enter a user name and a password that are associated with the submitter's user account. In one or more embodiments, authenticator module 126 can authenticate a user by prompting the user to enter a password. The password can be a password that the collector registered when the collection folder was created. The collector can distribute the password via email or using other known methods. For example, a teacher can simply tell the password to the students in person. Alternatively, the password can be a password that the submitter set when the submitter initially accessed a link associated with content management system 100.

Figure 9B:
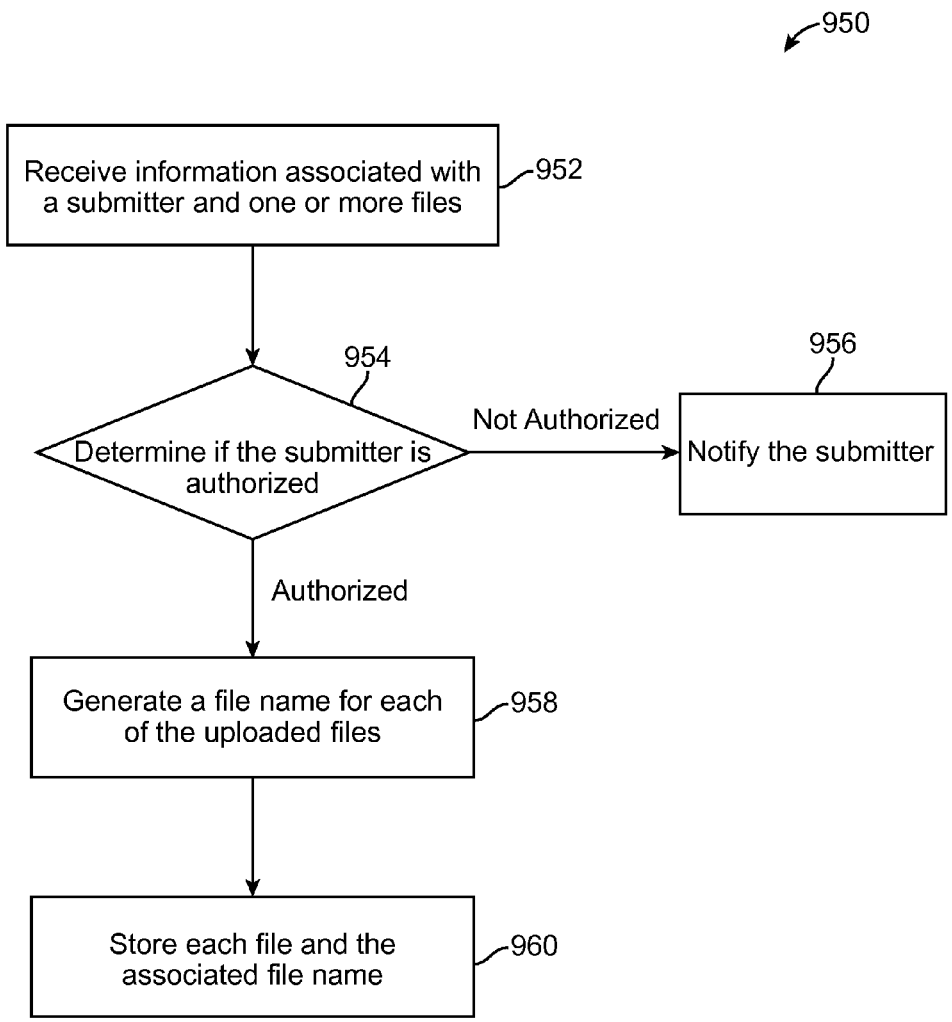
FIG. 9B is a flowchart for a method for storing an uploaded file in a collection folder in accordance with an exemplary embodiment.

Referring to FIG. 9B, a flowchart for a method for storing an uploaded file in a collection folder in accordance with an exemplary embodiment is illustrated. Exemplary method 950 is provided by way of example, as there are a variety of ways to carry out the method. Method 950 described below can be carried out using the configurations illustrated in FIGS. 1 and 2A by way of example, and various elements of these figures are referenced in explaining exemplary method 950. Each block shown in FIG. 9B represents one or more processes, methods or subroutines, carried out in exemplary method 900. Exemplary method 950 can begin at block 952.

At block 952, receive information associated with the submitter and the one or more files to be uploaded. For example, communications interface module 120 receives information associated with the submitter and the one or more uploaded files. After receiving the information and the one or more files, method 950 can proceed to block 954.

At block 954, determine if the submitter is an authorized submitter. For example, authenticator module 126 can determine if the submitter is authorized to upload content based on the information received from the submitter. For example, authenticator module 126 can compare the received information against information associated with the collection folder to determine if the submitter is authorized to upload content. If the submitter is not authorized, method 950 can proceed to block 956. If the submitter is authorized, method 950 can proceed to block 958.

At block 956, notify the submitter. Notification can include, but is not limited to, email, text message, posting to the account, application notifications (e.g., in-band notifications) or any other means of notification. For example, authenticator module 126, UI module 122 and/or email module 144 notifies the submitter that the submitter is not authorized to upload content to the collection folder. UI module 122 can cause a message to be rendered on the submitter's client device $102_i$ and/or email module 144 can send an email message to the submitter. The message and/or email message can inform the submitter that they are not authorized to submit a file. The notification can be done via an email message or a web page.

At block 958, generate a file name for each of the uploaded files. For example, file access module 204 determines how many files the submitter has submitted in the collection folder under the file request name and generates a file name for each of the uploaded files. The file name is generated by combining the file request name and either the submitter's name or the submitter's user name of the submitter's email address. The submitter's first name, last name or any combination thereof can be used. For example, if the file request was named Homework Assignment #3 and Jane Doe uploaded a file, the file name can be "Homework Assignment #3—Jane Doe". Depending on whether the submitter's name or user name is unique a number may be added. For example, if two submitter's have the same first and last name, then a number can be added to the one of the submitter's name to differentiate the two submitters. If the submitter has submitted more than one file, the files submitted after the first file can include a number. For example, if a file request for a Wedding Photos collection folder is generated and Bob Smith submits three files/photos, the first photo can be named Bob Smith Wedding Photo, the second photo can be named Bob Smith Wedding Photo 2 and the third photo can be Bob Smith Wedding Photo 3. One of ordinary skill in the art would recognize other methods for generating unique names for the submitters and for generating unique file names can be used. After generating a file name for each uploaded file, method 900 can proceed to block 910.

At block 910, store each file and the associated file name. For example, file access module 204 stores each file and the generated name in content storage 160.

Malicious Content Detection

In one or more embodiments, the information and one or more uploaded files from a submitter can be provided to malicious content detection system 170 prior to being stored in collection folder and/or content storage 160. For example, in response to a submitter uploading the information and one or more files at block 324 of FIG. 3, the information and the one or more uploaded files can be provided to malicious content detection system 170 for scanning. Alternatively, the one or more uploaded files can be received by content management system 106 and then sent to malicious code detection system 170 for scanning.

Figure 10:
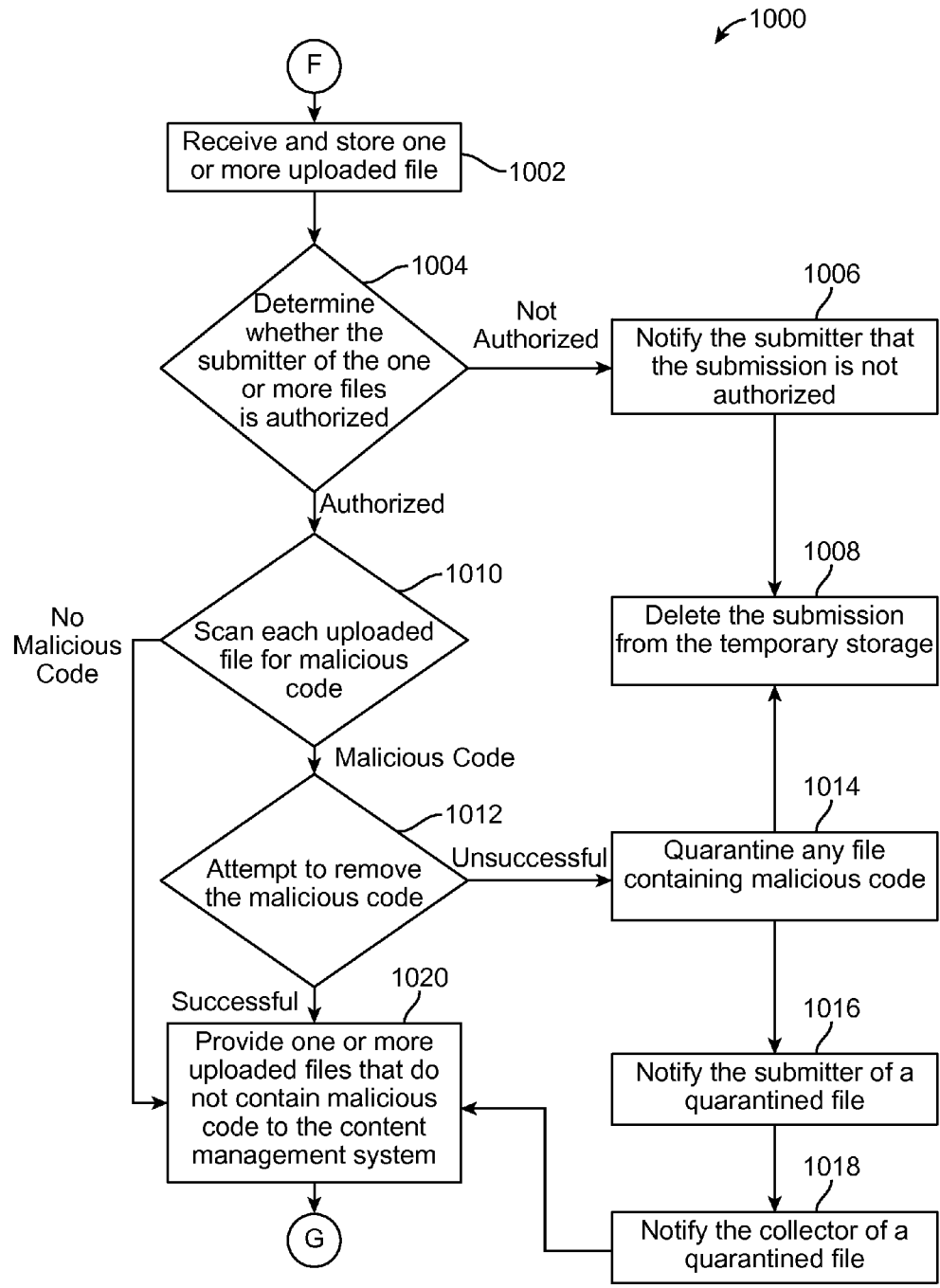
FIG. 10 is a flowchart for a method for scanning one or more uploaded files in accordance with an exemplary embodiment.

Referring to FIG. 10, a flowchart for a method for scanning one or more uploaded files in accordance with an exemplary embodiment is illustrated. Exemplary method 1000 is provided by way of example, as there are a variety of ways to carry out the method. Method 1000 described below can be carried out using the configurations illustrated in FIGS. 1 and 2B by way of example, and various elements of these figures are referenced in explaining exemplary method 1000. Each block shown in FIG. 10 represents one or more processes, methods or subroutines, carried out in exemplary method 1000. Exemplary method 1000 can begin at block 1002.

At block 1002, receive and store one or more uploaded files. For example, malicious content detection system 170 can receive the one or more uploaded files and store the received files in memory. The one or more uploaded files can be received from the submitter's client device $102_i$ or can be received from content management system 106. For example, the one or more uploaded files can be sent by communication interface module 120. The one or more uploaded files can pass through firewall 172 and be received by communication module 174, which stores the one or more uploaded files in temporary storage 176. Temporary storage 176 can be random access memory (RAM), hard disk drive (HDD), flash memory, such as a solid state drive (SSD), one or more servers, etc. After receiving and storing the one or more uploaded files, method 1000 can proceed to block 1004.

At block 1004, determine whether the submitter of the one or more files is authorized. For example, authenticator module 178 can verify whether the submitter is an authorized user/submitter. Authenticator module 178 can determine if the submitter is associated with the collection folder. The determination can be based on credentials, security tokens, API calls, specific client devices, and so forth. Alternatively, authenticator module 178 can communicate with authentication module 122 to determine if the submitter is authorized. If the submitter is determined not to be associated with the collection folder, method 1000 can proceed to block 1006. If the submitter is determined to be associated with the collection folder, method 1000 can proceed to block 1010.

At block 1006, notify the submitter that the submission is not authorized. Notification can include, but is not limited to, email, text message, posting to the account, application notifications (e.g., in-band notifications) or any other means of notification. For example, communication module 174 can send an email message to the submitter notifying the submitter that the submission is not authorized. Alternatively, communication module 174 can send a command to UI module 122 that can cause a notification UI to be rendered on the submitter's client device $102_i$ notifying the submitter that the submission is not authorized. Alternatively, communication module 174 can send a command to UI module 122 that can cause an email message to be sent to the submitter notifying the submitter that the submission is not authorized. After notifying the submitter, method 1000 can proceed to block 1008. At block 1008, delete the submission from the temporary storage. For example, communication module 174 can cause the submission to be deleted from temporary storage 176.

At block 1010, scan each uploaded file for malicious code. For example, malware scanning tool 180 can scan each uploaded file for malicious code, such as viruses, trojans, malware, etc. If an uploaded file contains malicious content, method 1000 can proceed to block 1012. If an uploaded file does not contain malicious code, method 1000 can proceed to block 1020.

At block 1012, attempt to remove the malicious code. For example, malware scanning tool 180 attempts to remove the malicious code. If the malicious code is not successfully removed from an uploaded file, method 1000 can proceed to block 1014. If the malicious code is successfully removed from an uploaded file, method 1000 can proceed to block 1020.

At block 1014, quarantine a file containing malicious code. For example, malware scanning tool 180 quarantines an uploaded file containing malicious code. Quarantining can include maintaining an uploaded file containing malicious code in temporary storage 176, storing an uploaded file containing malicious code in separate storage, deleting an uploaded file containing malicious code and/or flagging an uploaded file containing malicious content. After quarantining an uploaded file containing malicious code, method 1000 can proceed to block 1016.

At block 1016, notify the submitter of a quarantined file. Notification can include, but is not limited to, email, text message, posting to the account, application notifications (e.g., in-band notifications) or any other means of notification. For example, communication module 174 can send an email message to the submitter notifying the submitter that an uploaded file contains malicious code. Alternatively, communication module 174 can send a command to UI module 122 that causes a notification UI to be rendered on the submitter's client device $102_i$ notifying the submitter that an uploaded file contains malicious code. After notifying the submitter, method 1000 can proceed to block 1018.

At block 1018, notify the collector of a quarantined file. Notification can include, but is not limited to, email, text message, posting to the account, application notifications (e.g., in-band notifications) or any other means of notification. For example, communication module 174 can send an email message to the collector notifying the collector that an uploaded file contains malicious code. Alternatively, communication module 174 can send a command to UI module 122 that causes a notification UI to be rendered on the collector's client device $102_i$ notifying the collector that an uploaded file contains malicious code. After notifying the collector, method 1000 can proceed to block 1020 if another uploaded file does not contain malicious code.

At block 1020, provide each uploaded file that does not contain malicious code to the content management system. For example, communication module 174 provides each of the uploaded files that do not contain malicious code to content management system 106 for storage.

Plagiarism Detection

In one or more embodiments, the one or more uploaded files from a submitter can be scanned for plagiarism. For example, in response to storing one or more uploaded files at block 326 of FIG. 3, plagiarism module 144 can scan the one or more uploaded files for plagiarism. For example, each uploaded file can be compared to the other uploaded files in the collection folder and/or content items available via the Internet and/or content items stored in a database built from archived instances of the Internet. The plagiarism detection can be done by plagiarism module 144 and/or via a third party service $109_i$. For example, plagiarism module 144 can include a plagiarism API which can send one or more uploaded files to a plagiarism detector service, such as, Turnitin by iParadigms, LLC of Oakland, Calif., Plagiarism Detector Pro or Plagiarism Detector Accumulator Server by Skyline, Inc. of Alexandria, Va. or plagiarism module 144 can include plagiarism software from such vendors and/or proprietary plagiarism software.

Figure 11:
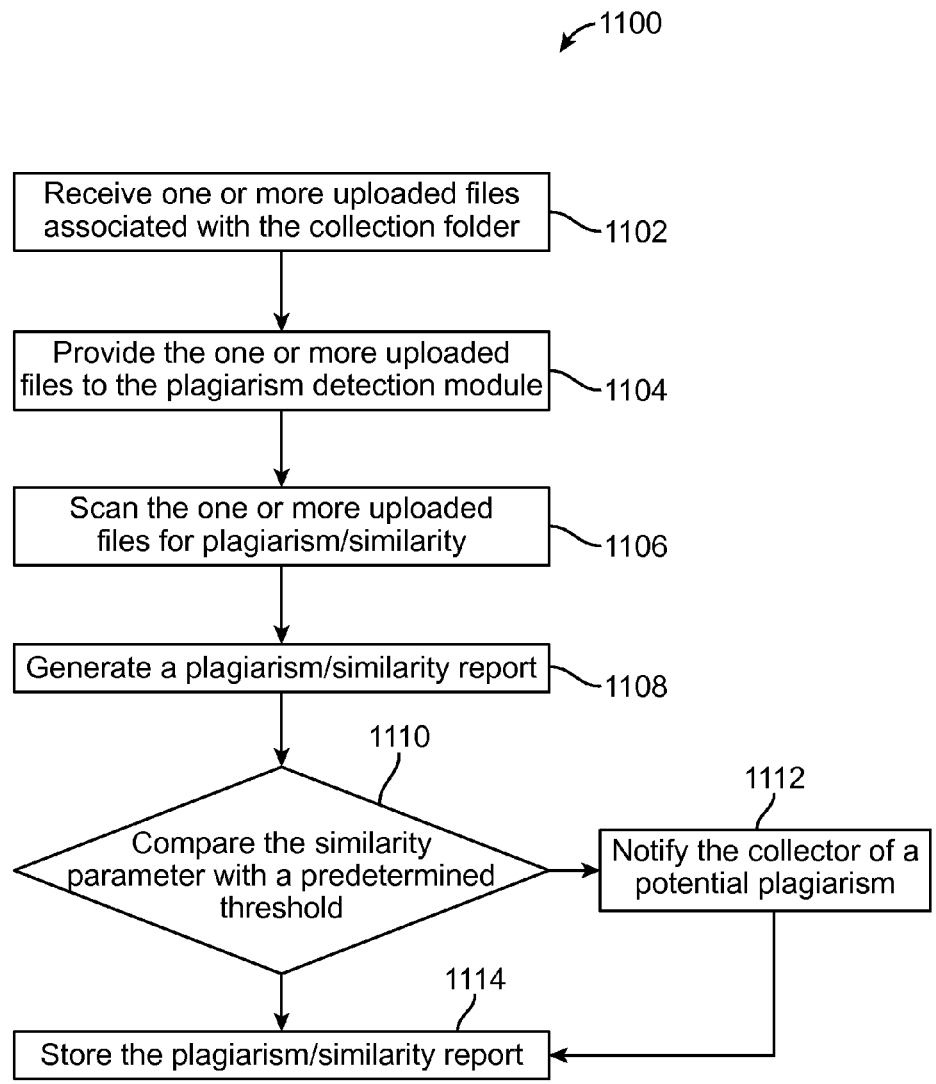
FIG. 11 is a flowchart for a method for detecting plagiarism in one or more uploaded files in accordance with an exemplary embodiment.

Referring to FIG. 11, a flowchart for a method for detecting plagiarism in one or more uploaded files in accordance with an exemplary embodiment is illustrated. Exemplary method 1100 is provided by way of example, as there are a variety of ways to carry out the method. Method 1100 described below can be carried out using the configurations illustrated in FIGS. 1 and 2A by way of example, and various elements of these figures are referenced in explaining exemplary method 1100. Each block shown in FIG. 11 represents one or more processes, methods or subroutines, carried out in exemplary method 1100. Exemplary method 1100 can begin at block 1102.

At block 1102, receive one or more uploaded files associated with the collection folder. For example, collection module 130 receives one or more uploaded files submitted to the collection folder. After receiving the one or more uploaded files, method 1100 can proceed to block 1104.

At block 1104, provide the one or more uploaded files to the plagiarism detection module. For example, collection module 130 provides the content item to plagiarism detection module 144. The one or more uploaded files can be provided to the plagiarism detection module 144 at the time the uploaded file is received, at periodic intervals and/or upon completion of a file request collection. After providing the content item to the plagiarism detection module 144, method 1100 can proceed to block 1106.

At block 1106, scan the one or more uploaded files for plagiarism/similarity. For example, plagiarism detection module 144 can run plagiarism software or send the content item to plagiarism service $109_i$ to scan for plagiarism/similarities. In one or more embodiments, the plagiarism software or plagiarism service $109_i$ compares the one or more uploaded files to other uploaded files in the collection folder and/or checks the one or more uploaded files by comparing each uploaded file with other content items available via the Internet and/or one or more databases available via the Internet. For example, plagiarism detection is performed by breaking a received content item, e.g., the parent content item, into phrases. Then the phrases are sent to a search engine. Then, the search engine results are downloaded and each search engine source is analyzed by comparing the phrases from the parent content item with phrases in other content items. After scanning the one or more uploaded files for plagiarism/similarity, method 1100 can proceed to block 1108.

At block 1108, generate a plagiarism/similarity report. For example, plagiarism detection module 144 or plagiarism detection service $109_i$ generates a plagiarism/similarity report. If plagiarism detection service $109_i$ performs the plagiarism scanning then plagiarism detection service $109_i$ provides the plagiarism/similarity report to plagiarism detection module 144. The plagiarism/similarity report can include a similarity parameter. After generating a plagiarism/similarity report, method 1100 can proceed to block 1110.

At block 1110, compare the similarity parameter with a predetermined threshold. For example, plagiarism detection module 144 compares a similarity parameter from the plagiarism/similarity report to a predetermined threshold. The predetermined threshold can be set by the plagiarism software, plagiarism service $109_i$ or by the collector. If the comparison indicates plagiarism, e.g., the similarity parameter meets or exceeds the predetermined threshold, then method 1100 can proceed to block 1112. If the comparison does not indicate plagiarism, e.g., the similarity parameter is below the predetermined threshold, then method 1100 can proceed to block 1114.

At block 1112, notify the collector of potential plagiarism. Notification can include, but is not limited to, email, text message, posting to the account, application notifications (e.g., in-band notifications) or any other means of notification. For example, email module 140 or plagiarism detection module 144 sends an email message to the collector notifying the collector of potential plagiarism. The email message can include the plagiarism/similarity report. After notifying the collector, method 1100 can proceed to block 1114.

At block 1114, store the plagiarism/similarity report. For example, collection module 130 and/or plagiarism detection module 144 stores the plagiarism/similarity report in the collection folder.

Commenting

In one or more embodiments, online content management system 106 can enable users, e.g., submitter and/or collectors, to provide comments regarding a submission. As discussed below, a user can enter comments in a comment section rendered in a viewing UI. The comment section can be provided across devices, platforms, and file types. For example, content management system 106 can provide storage, retrieval, editing, and commenting service for content items such as word processing documents, spreadsheets, presentations, videos, streaming content, images, and any other content or file type. In one or more embodiments, the comment section can be provided, by content management system 106, on an interface different from a native application associated with a respective content item. For example, the comment section could be an application layer independent from, or layered on top of, the native application of a respective file type being displayed. In one example, the layer could be associated with an application provided by the online content management system or by a browser plug-in when viewed through a web browser. In one example, this could be achieved by adding metadata to each content item that is readable by the application provided by online content management system 106 or the metadata could point to a location with comment data that is retrievable by online content management system 106. Alternatively, the comments may also be displayed though the native application associated with the content item.

Figure 12A:
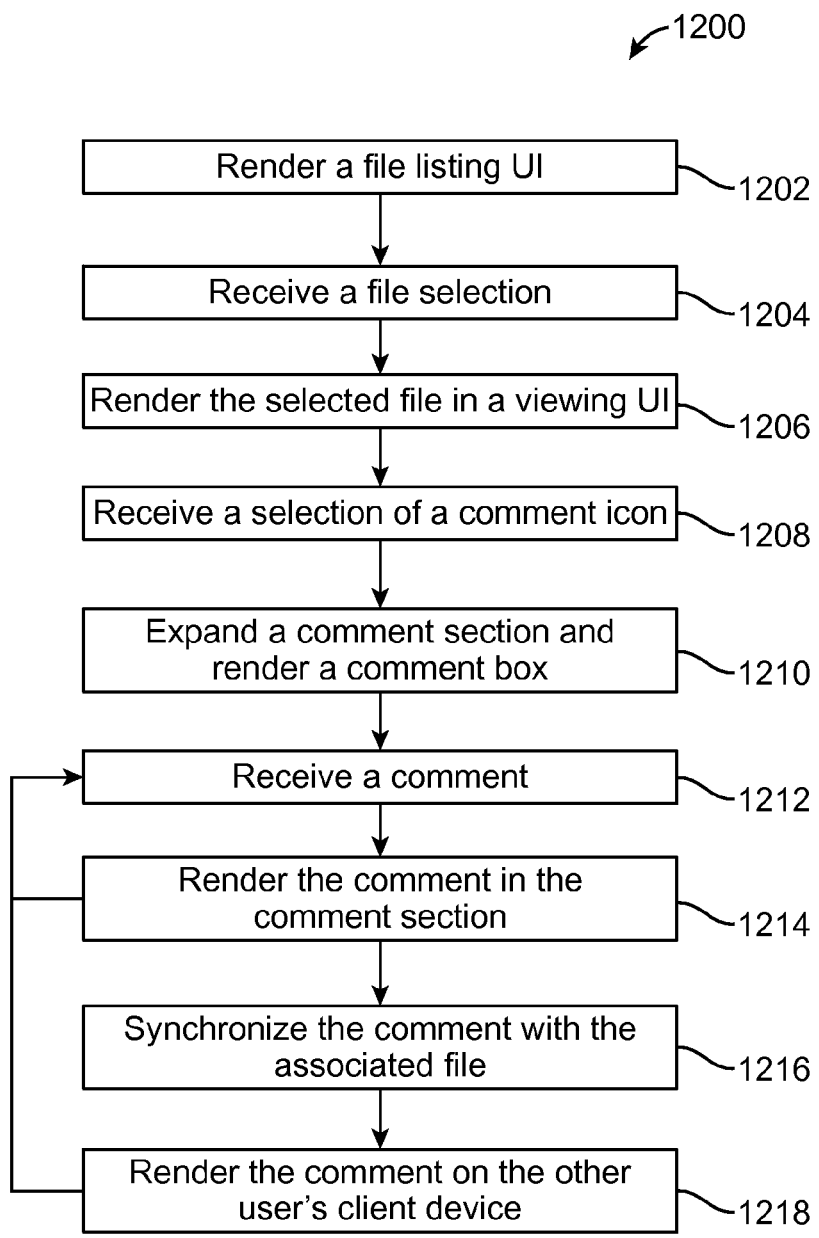
FIG. 12A is a flowchart for a method for enabling users to provide comments to a submission in accordance with an exemplary embodiment.

Referring to FIG. 12A, a flowchart for a method for enabling users to provide comments to a submission in accordance with an exemplary embodiment is illustrated. Exemplary method 1200 is provided by way of example, as there are a variety of ways to carry out the method. Method 1200 described below can be carried out using the configurations illustrated in FIGS. 1 and 2A by way of example, and various elements of these figures are referenced in explaining exemplary method 1200. Each block shown in FIG. 12A represents one or more processes, methods or subroutines, carried out in exemplary method 1200. Exemplary method 1200 can begin at block 1202.

Figure 12B:
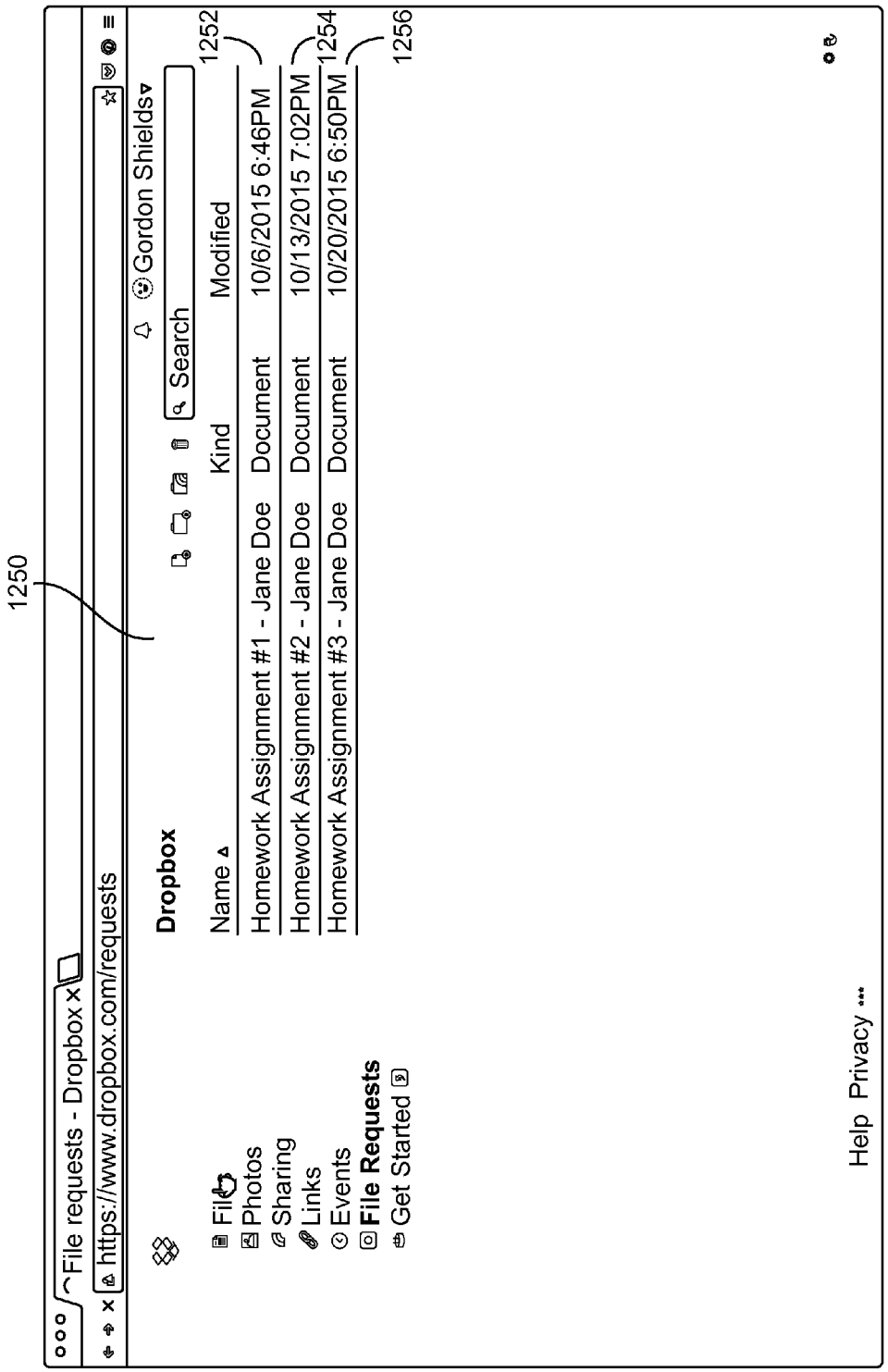
FIG. 12B is a file listing UI listing files in a user's account in accordance with an exemplary embodiment.

At block 1202, render a file listing UI. For example, UI module 122 causes the rendering of a file listing UI displaying a list of files that a user has saved to content management system 106. For example, UI module 122 renders a file listing UI 1250 on the submitter's client device 102$_i$ listing three files that submitter Jane Doe has stored in content management system 106 as shown in FIG. 12B. As shown, the three files are: Homework Assignment #1—Jane Doe 1252, Homework Assignment #2—Jane Doe 1254 and Homework Assignment #3—Jane Doe 1256. The collector can have a similar listing of files for files that were submitted to a collection folder. After rendering the file listing UI, method 1200 can proceed to block 1204.

At block 1204, receive a file selection. For example, UI module 122 receives a file selection made by the user. In this example, the submitter selected the Homework Assignment #3—Jane Doe file. After receiving the file selection, method 1200 can proceed to block 1206.

Figure 12C:
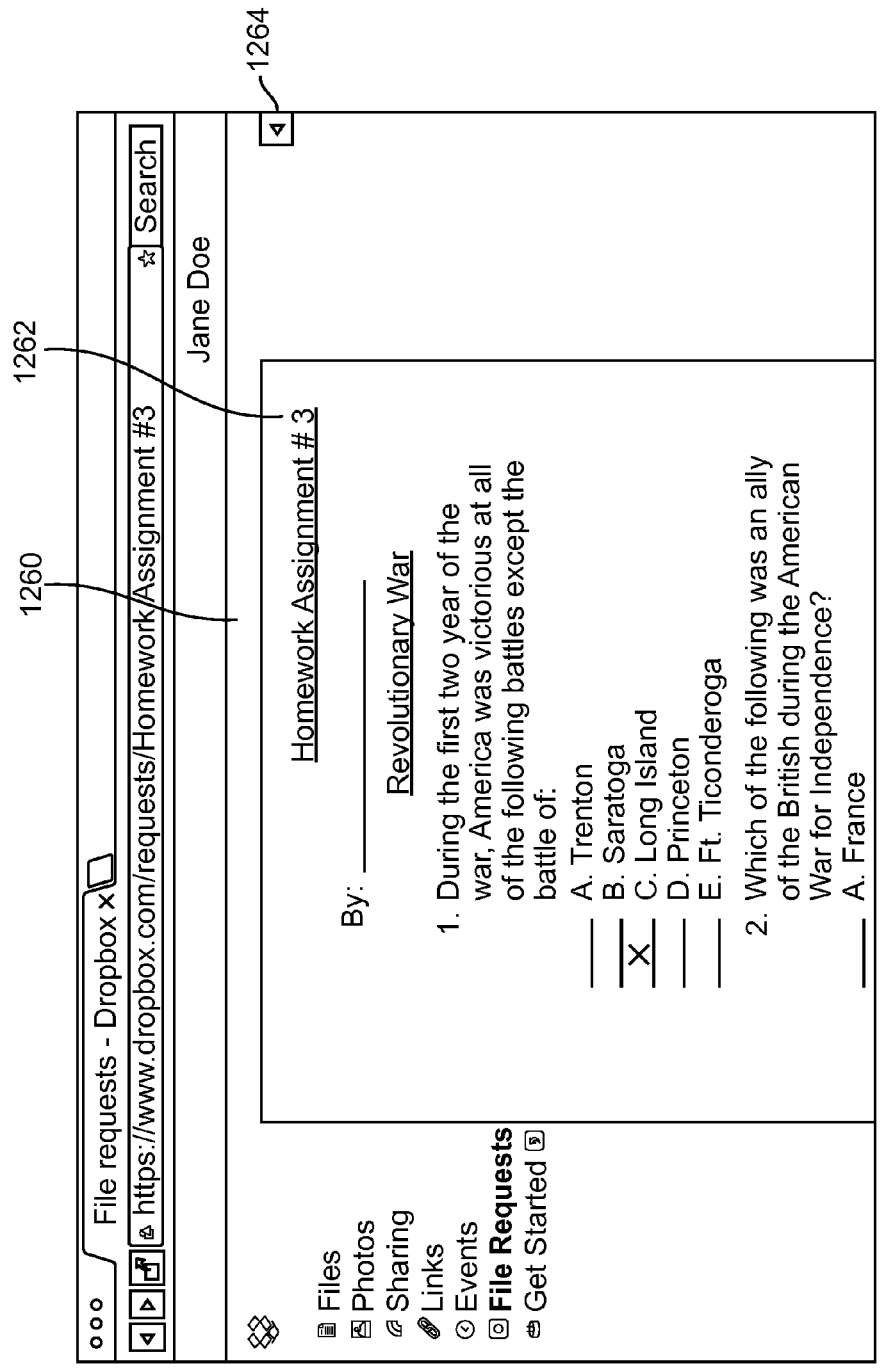
FIG. 12C is a viewing UI rendering a selected file in accordance with an exemplary embodiment.

At block 1206, render the selected file in a viewing UI. For example, UI module 122 causes the rendering of a viewing UI displaying the selected file. The selected file, Homework Assignment #3—Jane Doe, is rendered in viewing UI 1260 on the submitter's client device 102$_i$ as shown in FIG. 12C. After rendering the selected file, method 1200 can proceed to block 1208.

At block 1208, receive a selection of a comment icon. For example, UI module 122 and/or comment module 142 receives the selection of displayed comment icon 1264 shown in FIG. 12C. After receiving the comment icon selection, method 1200 can proceed to block 1210.

Figure 12D:
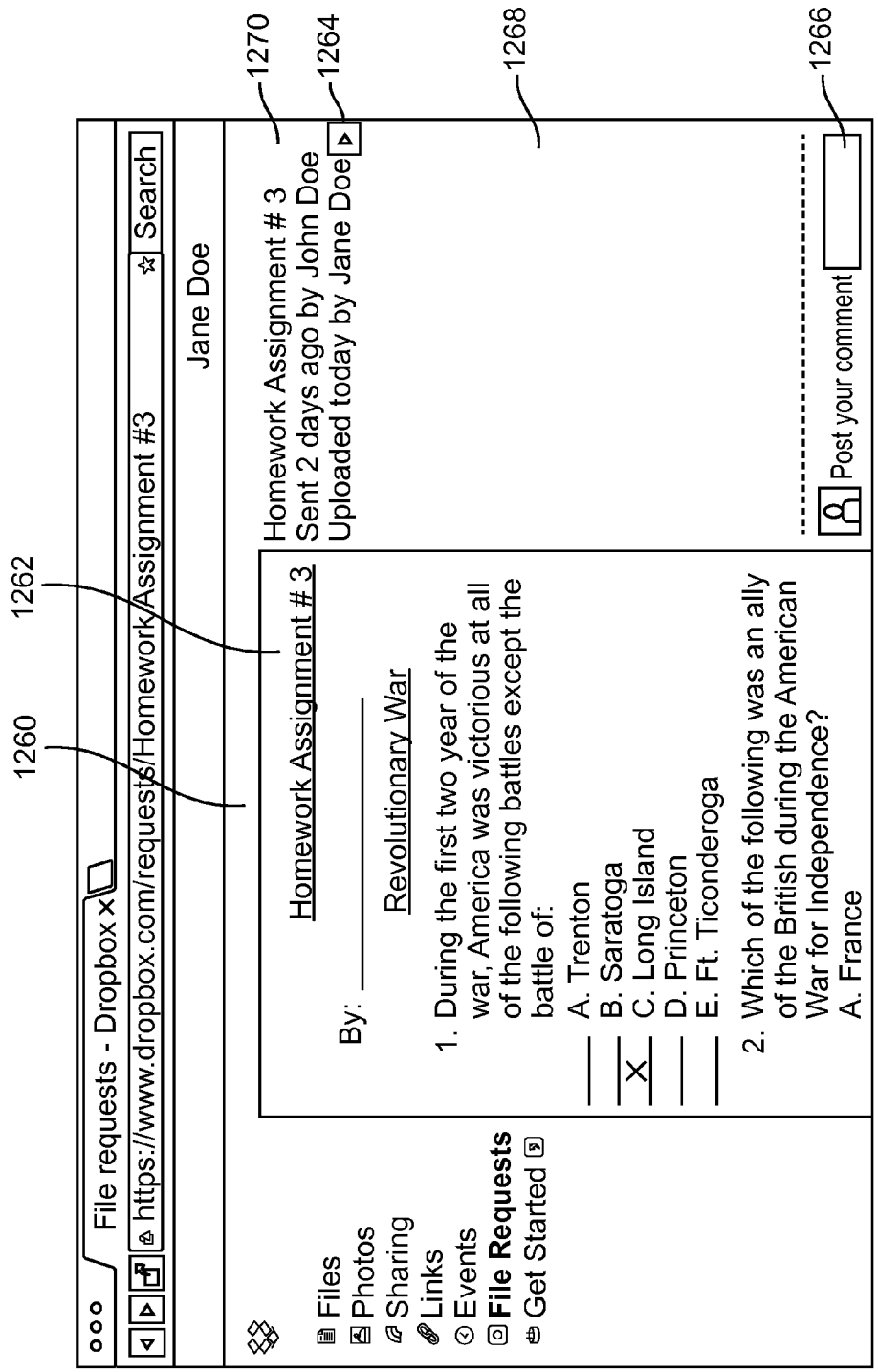
FIG. 12D is a UI rendering an expanded comment section in accordance with an exemplary embodiment.

At block 1210, expand a comment section and render a comment box. For example, UI module 112 and/or the comment module 142 can cause comment section 1268 to expand and causes comment box 1266 to be rendered as shown in FIG. 12D. As shown, information associated with the content item can be rendered 1270 by UI module 112 and/or comment module 142 on the submitter's client device 102$_i$. For example, the title of the submitted file is rendered: "Homework Assignment #3" and information about when the content item was shared is displayed: "Sent 2 days ago by John Doe." After expanding the comment section and rendering a comment box, method 1250 can proceed to block 1212.

At block 1212, receive a comment. For example, UI module 112 and/or comment module 142 receives a comment that the user entered in comment box 1266. For example, the submitter, Jane, enters a comment, "I did not do well on this assignment and would like to meet with you to discuss." After receiving the comment, method 1200 can proceed to block 1214.

Figure 12E:
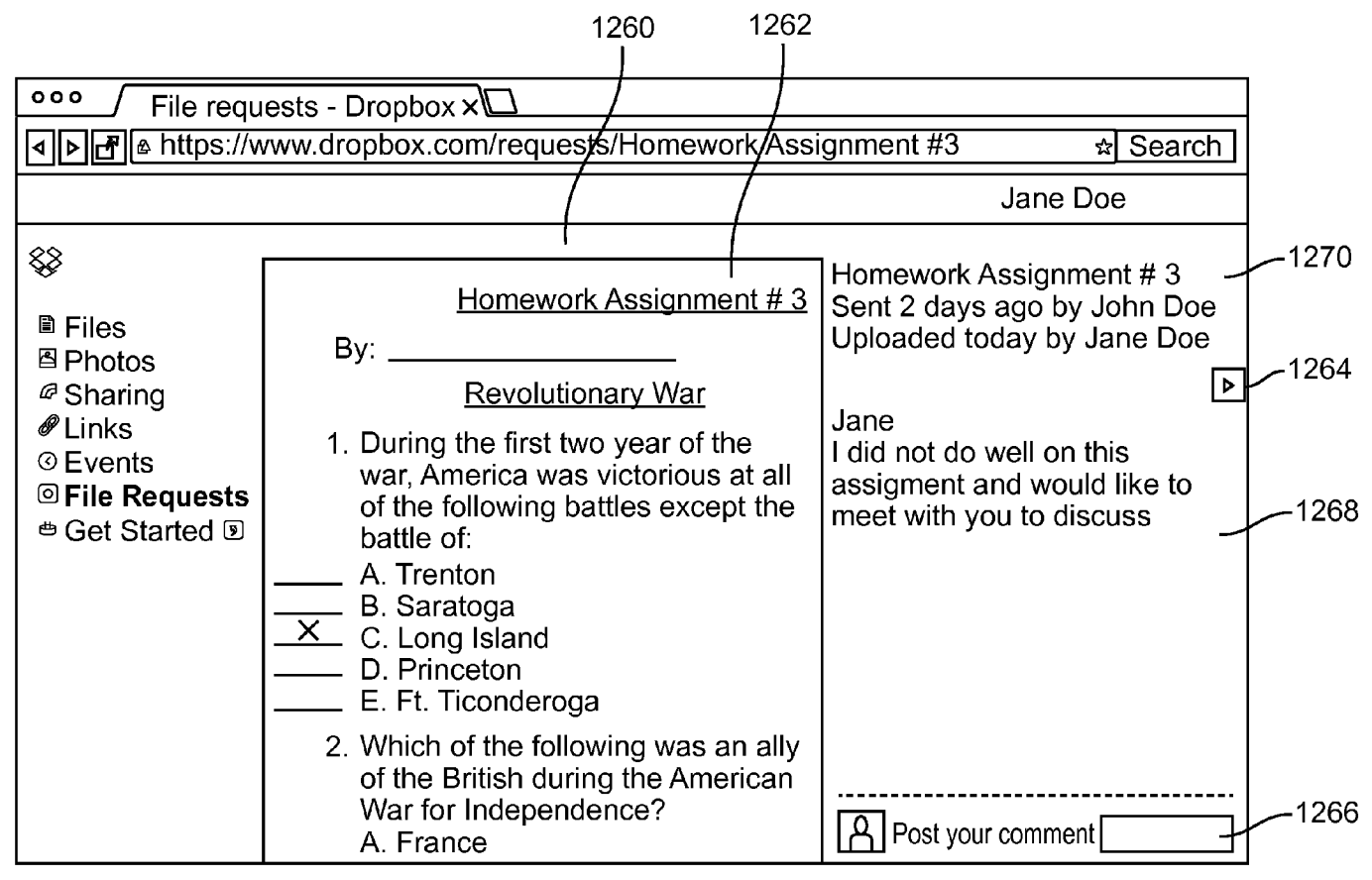

At block 1214, render the comment in the comment section. For example, UI module 112 and/or comment module 142 can cause the comment to be rendered on the submitter's client device 102$_i$ in the comment section on the viewing UI as shown in FIG. 12E. The user can enter another comment by entering a comment in comment box 1266. After rendering the comment, method 1200 can proceed to block 1216.

At block 1216, synchronize the comment with the associated file. For example, synchronization module 134 can synchronize the comment by the first user, e.g., the submitter, with the uploaded file associated with the user account of the second user, e.g., the collector. After synchronizing the comment, method 1200 can proceed to block 1218.

At block 1218, render the comment on the other user's client device. For example, UI module 112 and/or comment module 142 can cause the comment to be rendered on the other user's client device 102$_i$, e.g., the collector's client device 102$_i$. Comment section 1269 with the comment can be rendered next to document 1262 when the user opens the file associated with the comment. The other user can respond to the comment and have the new comment posted to both users' client devices 102$_i$. For example, the comments can be posted on the submitter's client device 102$_i$ as shown in FIG. 12F. As shown, the collector responded with "How about Wednesday after class?"

Figure 12G:
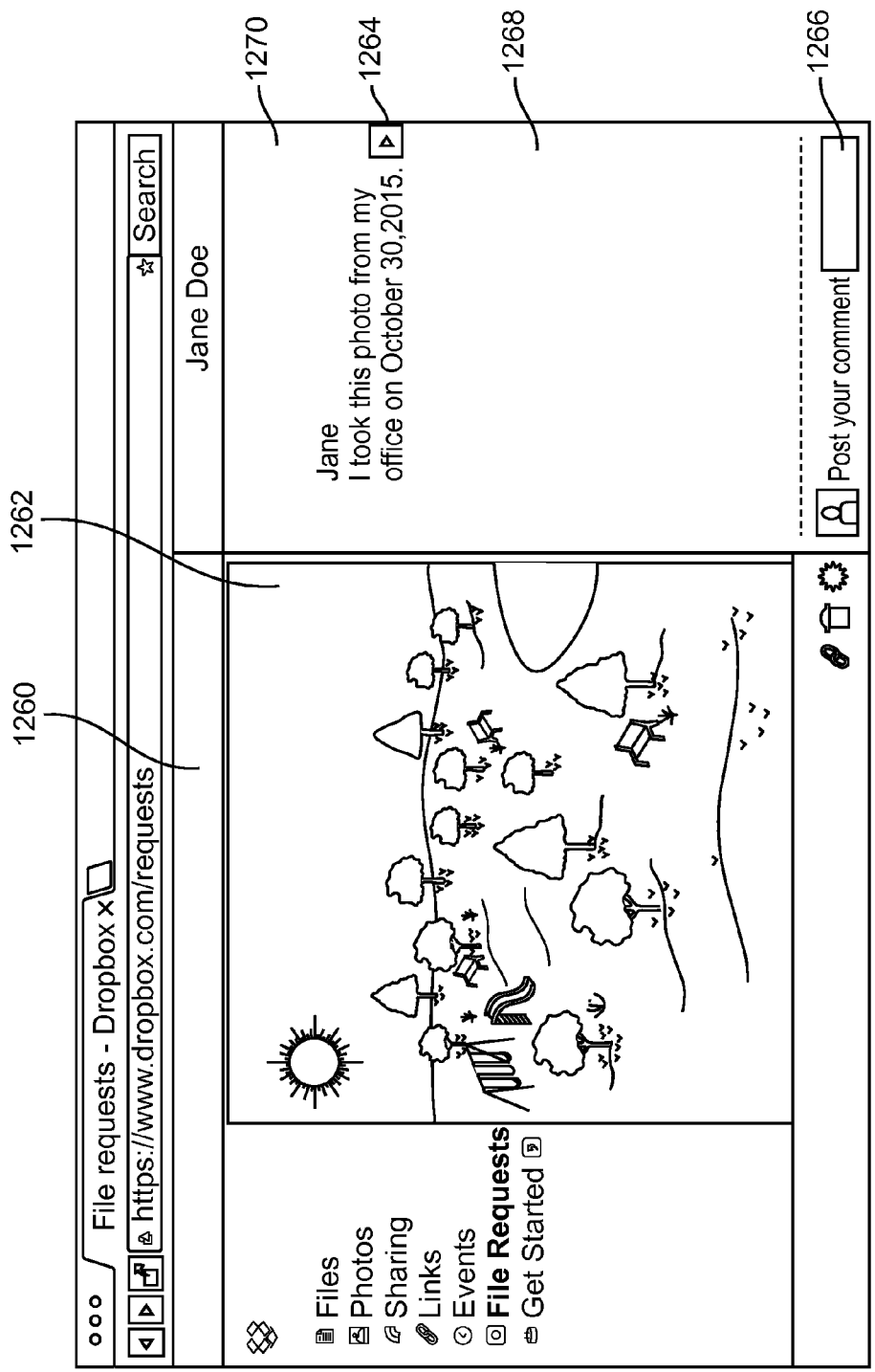
FIG. 12G is a UI rendering a photo with a comment in accordance with an exemplary embodiment.

Although the above example is directed at the submitter, one of ordinary skill in the art would recognize that the example can be directed to the collector entering an initial comment. In another example, a user can enter a comment for a photograph to provide details of the photo. For example, as shown in FIG. 12G, a user, Jane, entered the comment, "I took this photo from my office on Oct. 30, 2015."

Chat

In one or more embodiments, online content management system 106 can enable users, e.g., submitter and/or collectors, to chat about a submission. As discussed below, a user can enter comments in a chat section rendered in a viewing UI. The chat section can be provided across devices, platforms, and file types. For example, content management system 106 can provide storage, retrieval, editing, and commenting service for content items such as word processing documents, spreadsheets, presentations, videos, streaming content, images, and any other content or file type. In one or more embodiments, the chat section can be provided, by the content management provider, on an interface different from a native application associated with a respective content item. For example, the chat section could be an application layer independent from, or layered on top of, the native application of a respective file type being displayed. In one example, the layer could be associated with an application provided by the online content management system or by a browser plug-in when viewed through a web browser. In one example, this could be achieved by adding metadata to each content item that is readable by the application provided by the online content management system or the metadata could point to a location with chat data that is retrievable by the online content management system. Alternatively, the chat session may also be displayed though the native application associated with the content item.

Figure 13A:
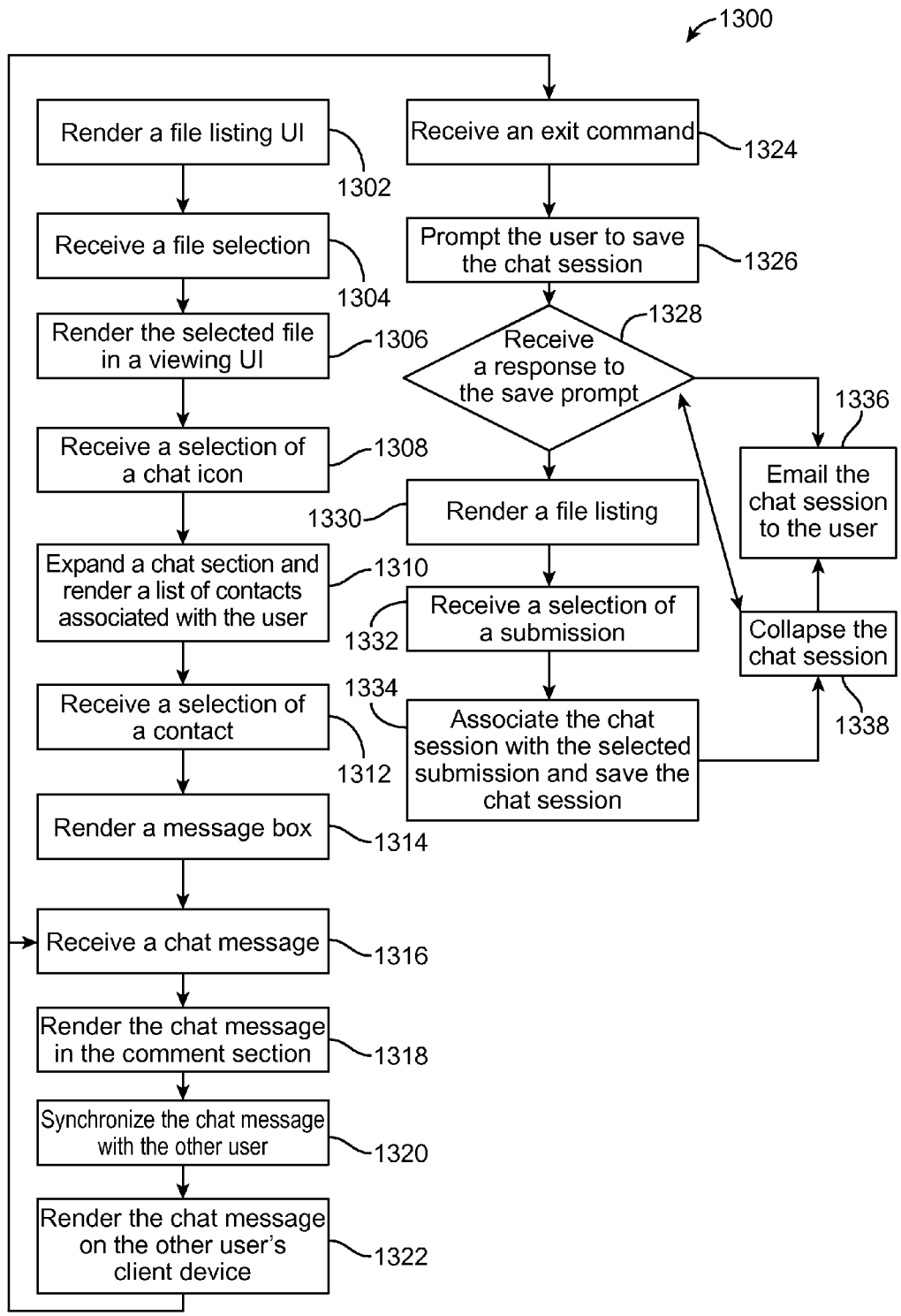
FIG. 13A is a flowchart for a method for enabling users to have a chat session relating to a submission in accordance with an exemplary embodiment.

Referring to FIG. 13A, a flowchart for a method for enabling users to have a chat session relating to a submission in accordance with an exemplary embodiment is illustrated. Exemplary method 1300 is provided by way of example, as there are a variety of ways to carry out the method. Method 1300 described below can be carried out using the configurations illustrated in FIGS. 1 and 2A by way of example, and various elements of these figures are referenced in explaining exemplary method 1300. Each block shown in FIG. 13A represents one or more processes, methods or subroutines, carried out in exemplary method 1200. Exemplary method 1300 can begin at block 1302.

At block 1302, render a file listing UI. For example, UI module 122 causes the rendering of a file listing UI displaying a list of files that a user has saved to content management system 106. For example, UI module 122 renders file listing UI 1250 on the submitter's client device $102_i$ listing three files that submitter Jane Doe has stored in content management system 106 as shown in FIG. 12B. As shown, Jane Doe has three files: Homework Assignment #1—Jane Doe 1252, Homework Assignment #2—Jane Doe 1254 and Homework Assignment #3—Jane Doe 1256. The collector can have a similar listing of files for files that were submitted to a collection folder. After rendering the file listing UI, method 1300 can proceed to block 1304.

At block 1304, receive a file selection. For example, UI module 122 receives a file selection made by the user. In this example, the submitter selected the Homework Assignment #3—Jane Doe file. After receiving the file selection, method 1300 can proceed to block 1306.

Figure 13B:
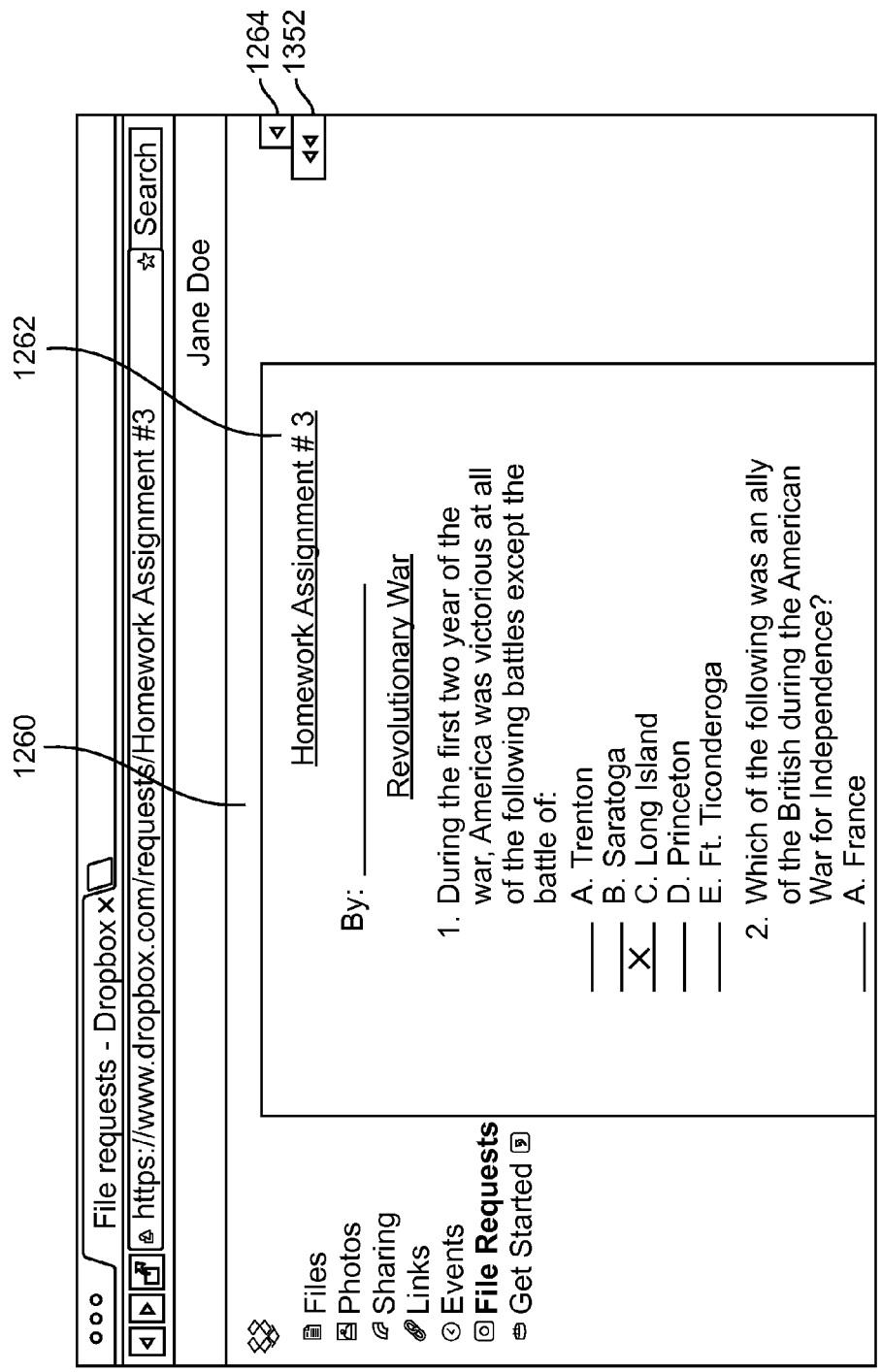
FIG. 13B is a UI rendering a selected file and a chat icon in accordance with an exemplary embodiment.

At block 1306, render the selected file in a viewing UI. For example, UI module 122 causes the rendering of a viewing UI displaying the selected file on the submitter's client device $102_i$. The selected file, Homework Assignment #3—Jane Doe, is rendered in viewing UI 1260 as shown in FIG. 13B. After rendering the selected file, method 1300 can proceed to block 1308.

At block 1308, receive a selection of a chat icon. For example, UI module 122 and/or comment module 142 receives the selection of displayed chat icon 1352 shown in FIG. 13B. After receiving the chat icon selection, method 1300 can proceed to block 1310.

Figure 13C:
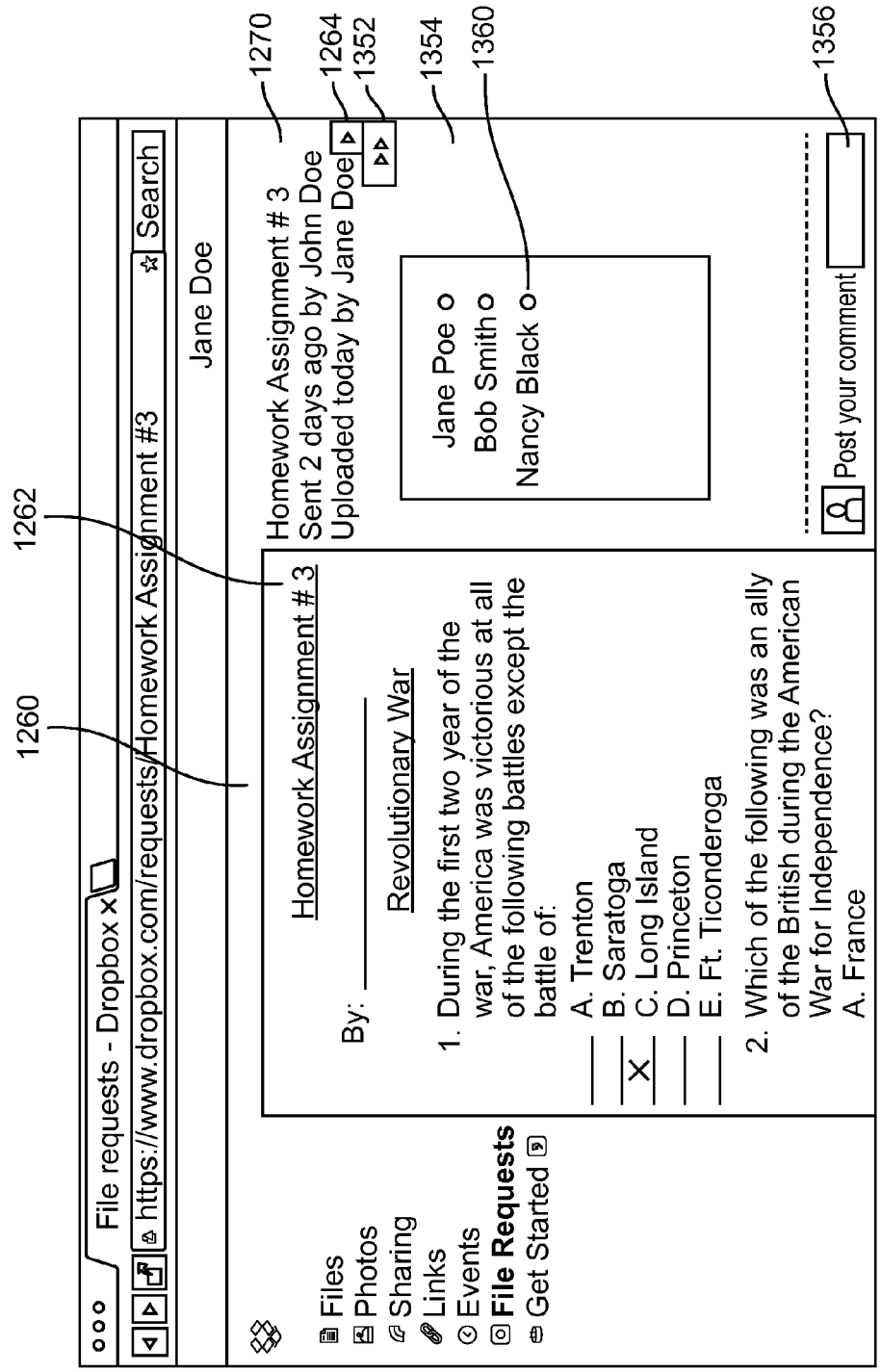
FIG. 13C is a UI rendering that status of contacts in accordance with an exemplary embodiment.

At block 1310, expand a chat section and render a list of contacts associated with the user. For example, UI module 112 and/or comment module 143 can expand chat section 1354 and cause a list of contacts associated with the user to be rendered along with each user's online status with content management system 106 or the chat feature if separate from content management system 106. For example, list of associated contacts 1358 along with online status 1360 is rendered on the submitter's client device $102_i$ in status box 1360 as shown in FIG. 13C. Contacts that are online can have a green online status 1360 and contacts that are offline can have a red online status. Other status identifiers can be used in place of the green and red online statuses 1360. After rendering the list of contacts, method 1300 can proceed to block 1314.

At block 1312, receive a selection of a contact. For example, UI module 112 and/or comment module 143 can receive a selection of a contact rendered on the submitter's client device $102_i$. After receiving a selection of a contact, method 1300 can proceed to block 1314.

Figure 13D:
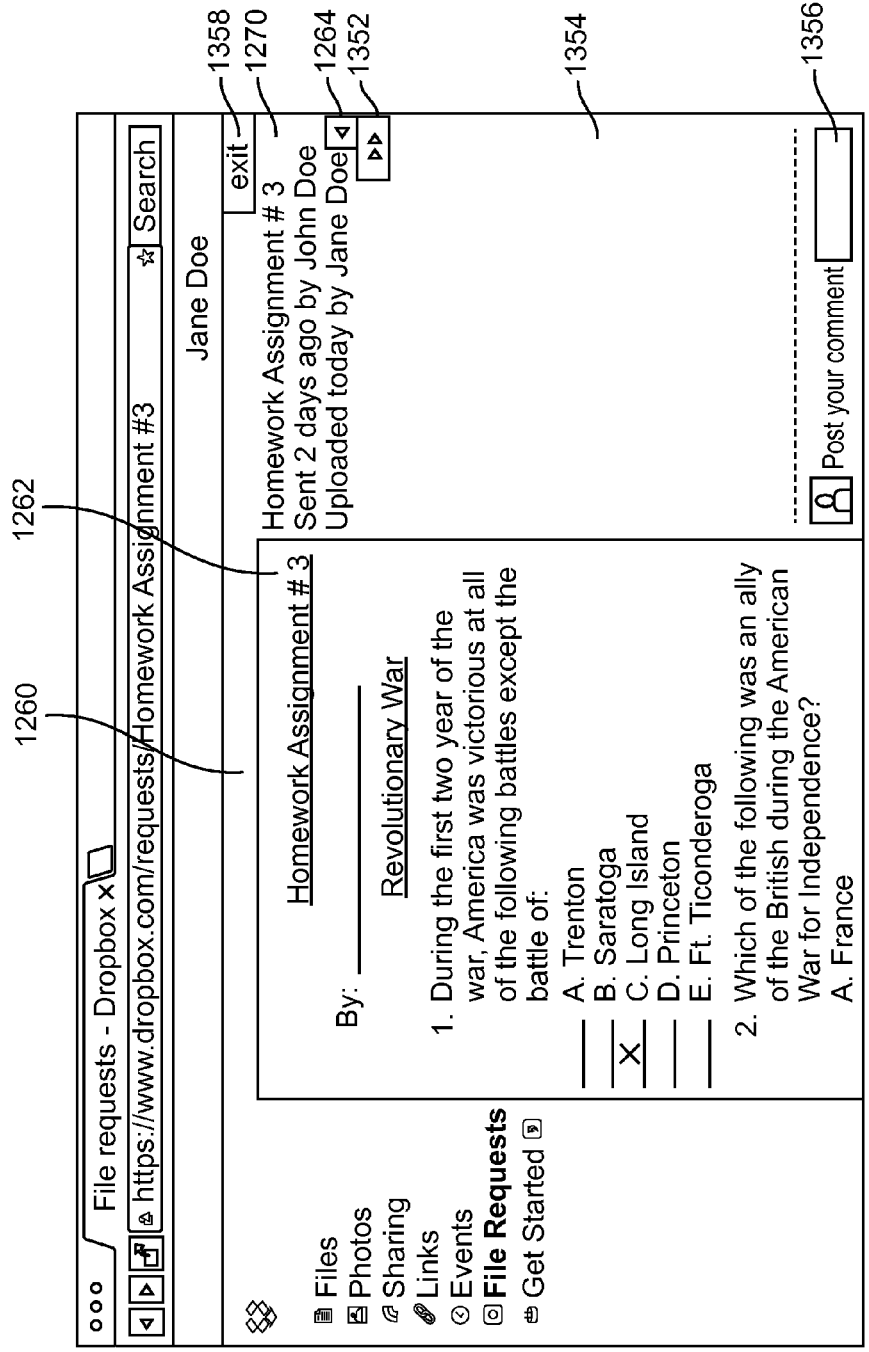
FIG. 13D is a UI rendering a message box in accordance with an exemplary embodiment.

At block 1314, render a message box. For example, UI module 112 and/or comment module 142 can cause message box 1356 to be rendered on the submitter's client device 102i as shown in FIG. 13D. As shown, information associated with the content item can be rendered 1270 by UI module 112 and/or comment module 142. For example, the title of the submitted file is rendered: Homework Assignment #3 and information about when the file was shared is displayed: Sent 2 days ago by John Doe. After rendering a message box, method 1300 can proceed to block 1316.

At block 1316, receive a chat message. For example, UI module 112 and/or comment module 142 receives a chat message that the user enters in message box 1356 rendered on the submitter's client device $102_i$. For example, the submitter, Jane, enters a chat message, "Can we setup a meeting to discuss the homework assignment." After receiving the chat message, method 1300 can proceed to block 1318.

Figure 13E:
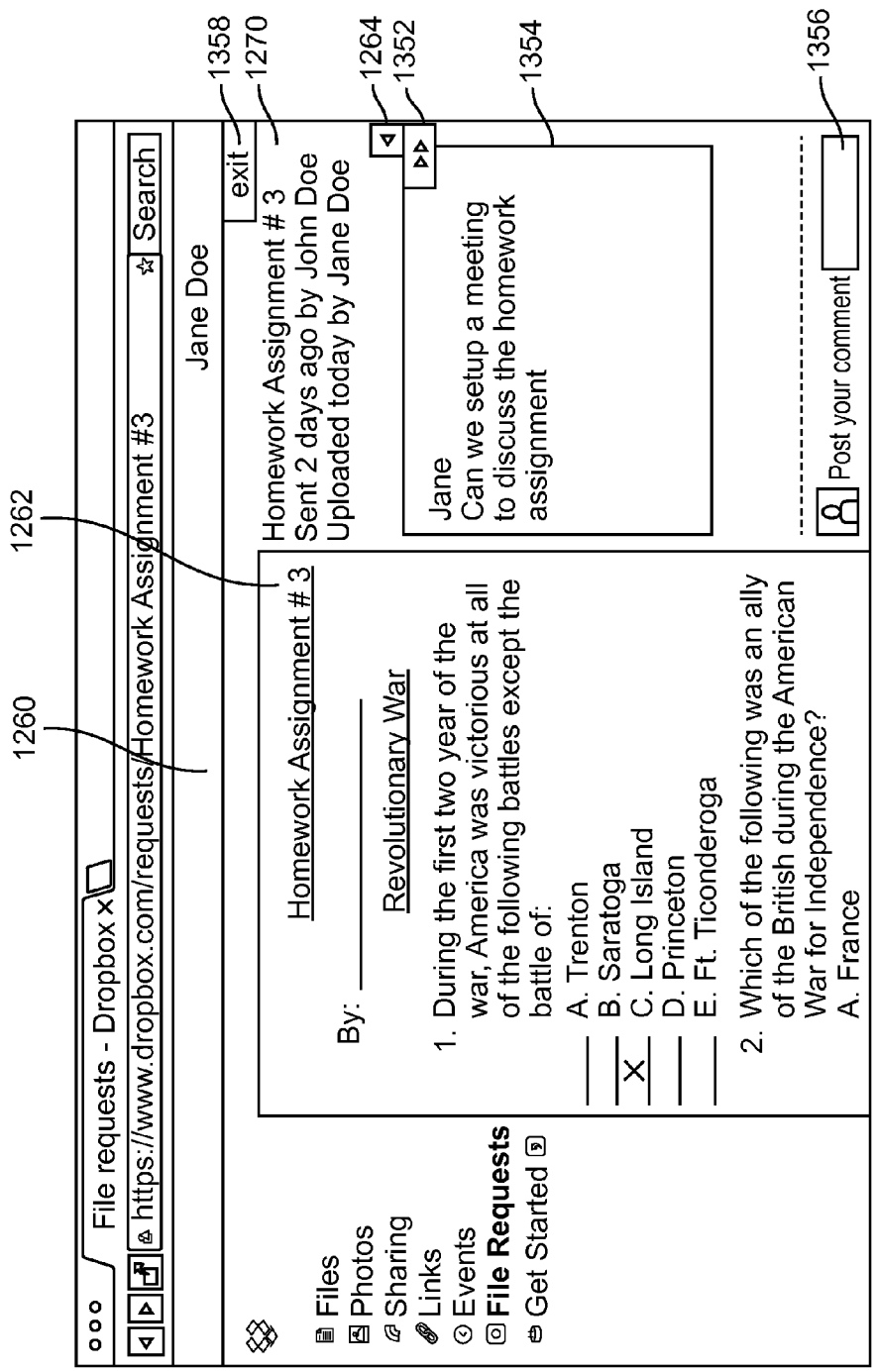
FIG. 13E is a UI rendering a chat message in a chat section in accordance with an exemplary embodiment.

At block 1318, render the chat message in the comment section. For example, UI module 112 and/or comment module 142 can cause the chat message to be rendered in chat section 1354 on the viewing UI as shown in FIG. 13E. As shown, the chat message, "Can we setup a meeting to discuss the homework assignment." is rendered on the submitter's client device $102_i$. The user can enter another chat message by entering a comment in chat box 1356. After rendering the chat message, method 1300 can proceed to block 1320.

At block 1320, synchronize the chat message with the other user. For example, synchronization module 134 can synchronize the chat message by the first user, e.g., the submitter, with the user account of the second user, e.g., the collector. After synchronizing the chat message, method 1300 can proceed to block 1322.

Figure 13F:
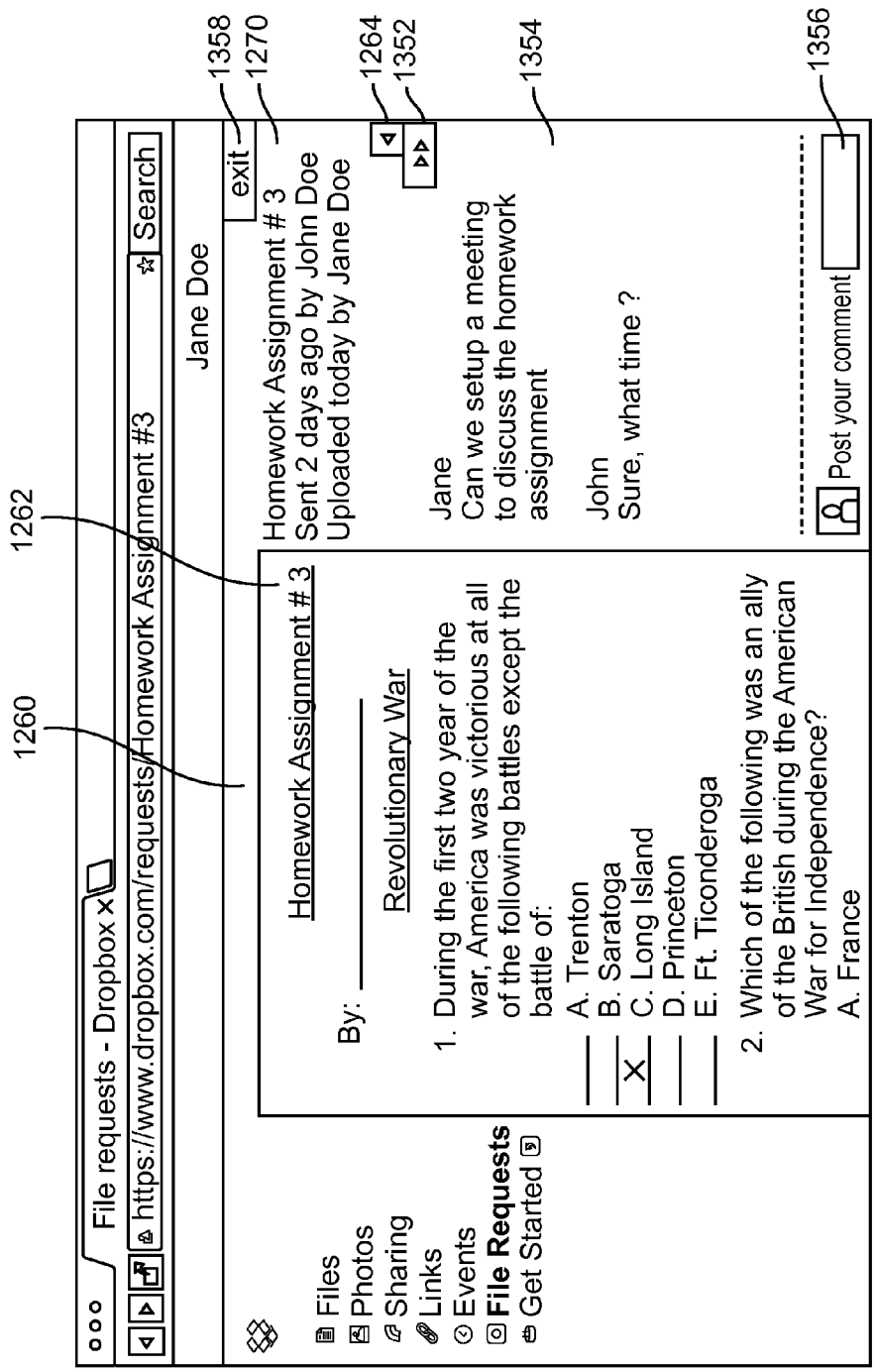
FIG. 13F is a UI rendering a plurality of chat messages in a chat section in accordance with an exemplary embodiment.

At block 1322, render the chat message on the other user's client device. For example, UI module 112 and/or comment module 142 can cause the chat message to be rendered on the other user's client device $102_i$, e.g., the collector's client device 102$_i$. The other user can respond to the chat message and have the new chat message posted to both users' client devices 102$_i$ as shown in FIG. 13F. As shown, the collector responded with "Sure. What time?" After rendering the chat message, method 1300 can proceed to block 1324.

At block 1324, receive an exit command. For example, UI module 112 and/or comment module 142 can receive an exit command in response to one of the users in the chat session selecting exit button 1358 rendered in the viewing UI 1260 as shown in FIG. 13F. After receiving an exit command, method 1300 can proceed to block 1326.

Figure 13G:
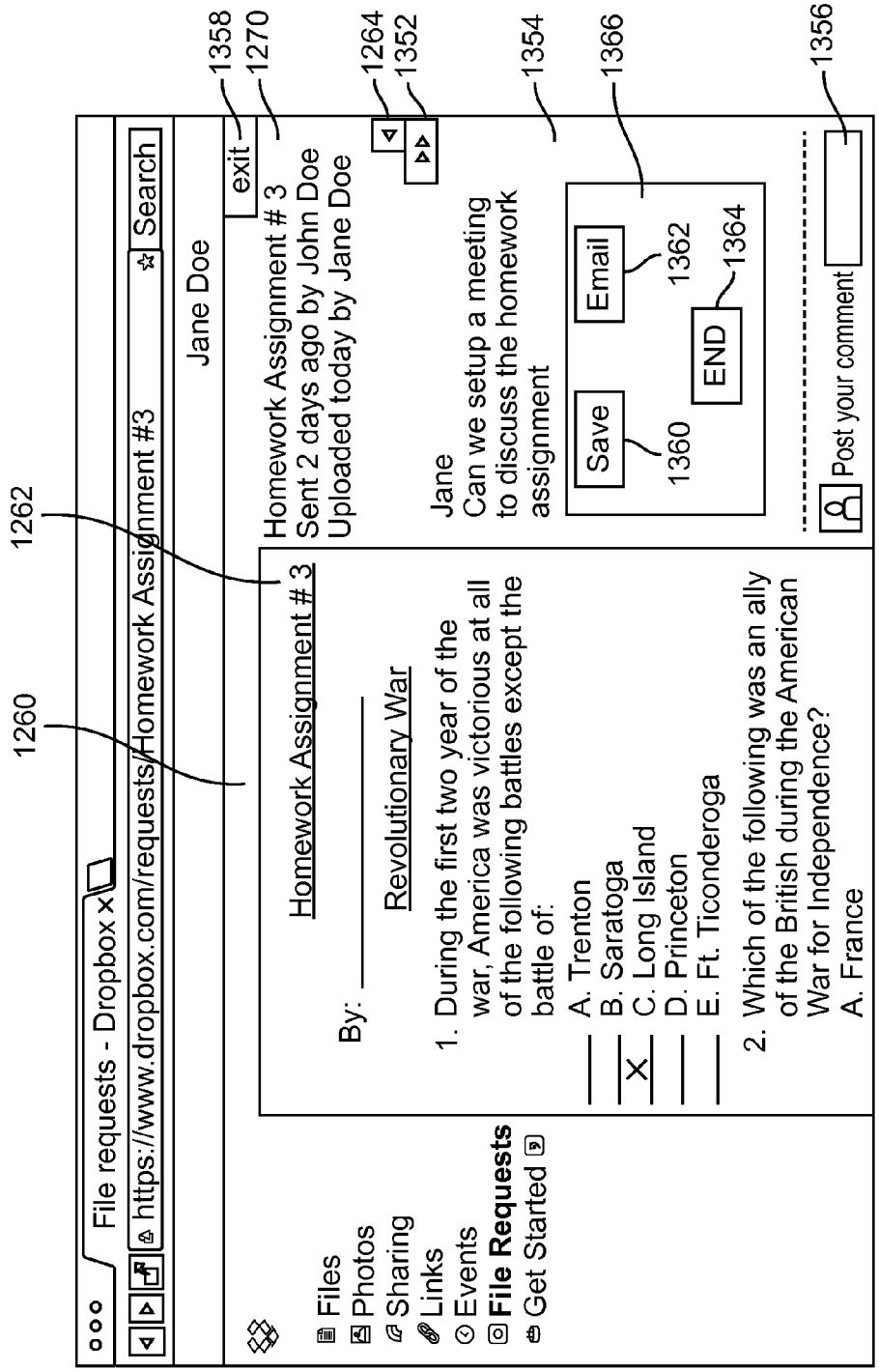
FIG. 13G is a save UI rendering save options in accordance with an exemplary embodiment.

At block 1326, prompt the user to save the chat session. For example, in response to a user selecting exit button 1358, UI module 112 and/or comment module 142 can prompt a user to select save button 1360, email button 1362 or end button 1364 in a save UI 1366. FIG. 13G shows save UI 1366 that is rendered over viewing UI 1260, save UI 1366 prompting the user to save the chat session, method 1300 can proceed to block 1328.

At block 1328, receive a response to the save prompt. For example, UI module 112 and/or comment module 142 receives the response to the save prompts. If the user selected save button 1360 and the chat session is associated with a submission, method 1300 can proceed to block 1334. If the user selected save button 1360 and the chat session is not associated with a submission, method 1300 can proceed to block 1330. If the user selected email button 1362, method 1300 can proceed to block 1336. If the user selected end button 1364, method 1300 can proceed to block 1338.

At block 1330, render a file listing. For example, UI module 112 and/or comment module 142 renders a file listing to a collection folder homepage on the user's client device 102$_i$. FIG. 4B shows an exemplary file listing. After rendering the file listing, method 1300 can proceed to block 1332.

At block 1332, receive a selection of a submission. For example, UI module 112 and/or comment module 142 receives a submission selection to associate with the chat session. After receiving a selection of a submission, method 1300 can proceed to block 1334.

At block 1334, associate the chat session with the selected submission and save the chat session. For example, UI module 112 and/or comment module 142 associates the chat session with the selected submission and saves the chat session. After saving the chat session, method 1300 can proceed to block 1338.

At block 1336, email the chat session to the user. For example, email module 140 emails the chat session to the user. After emailing the chat session to the user, method 1300 can proceed to block 1338.

At block 1338, collapse the chat session. For example, UI module 112 and/or comment module 142 causes the chat section 1354 to collapse as shown in FIG. 13B.

Although the above example is directed at the submitter, however one of ordinary skill in the art would recognize that the example can be directed to the collector initiating the chat session. In one or more embodiments, the chat feature does not need to be tied to a submission. For example, a submitter, prior to submitting a file, can select chat icon 1352 as shown in FIG. 9A and can proceed to block 1308 of FIG. 13A.

Facial and/or Object Recognition

In one or more embodiments, recognition module 146 can be used to associate metadata tags with an identified person and/or an identified object. To identify faces and/or objects a user can use an image interface to train recognition module 146 to recognize and identify faces and/or objects in a digital image and/or video. Recognition module 146 can include proprietary or known facial recognition software and/or object recognition software. For example, for facial recognition software, iPhoto by Apple, Inc. of Cupertino, Calif., Photoshop Elements by Adobe Systems of Mountain View, Calif., Picassa by Google of Mountain View, Calif. or any other facial recognition software can be used. For example, for object recognition software, Object Recognition Software by Dynamic Ventures, Inc. d/b/a Computer Vision Software of Cupertino, Calif., GoogLeNet by Google of Mountain View, Calif., or any other object recognition software can be used. In one or more embodiments, recognition module 146 can use service provider 109$_i$, which can be offered by one or more of the vendors recited above. In such embodiments, an API can be used to perform the recognition method described below.

Using uploaded files stored in the collection folder or elsewhere, a collector can train the facial recognition software and/or object recognition software by viewing and tagging faces and/or objects in photographs or videos. The tags can be saved as metadata, e.g., metadata tags. The metadata and metadata tags can be saved as a token. For example, a collector can tag people in one or more photographs and then run photographs against the facial recognition software to tag people in different photographs. Similarly, the collector can do the same for the object recognition software. The object recognition software can tag animals, such as a family pet, and/or objects such as the Eiffel Tower or Statute of Liberty. In one or more embodiments, recognition module 146 can provide different tokens: event specific tokens and global tokens. An event specific token can include the metadata as well as metadata filter parameters. The global token can include the metadata without the metadata filter parameters. The metadata filter parameters can include filters for identifying photographs based a variety of different parameters, such as date, time, location and/or season. For example, if a collector uploads photographs from an event to a collector folder and trains recognition module 146 to recognize the faces, the collector can also add a filter for date(s) and/or location(s) for the event based on metadata associated with the photographs. Once trained, the collector can save the event token. Then the collector can send a file request to others with the trained event token to collect additional photographs from people who have attended the same event. For example, the event can be a wedding, party, game, etc.

In one or more embodiments, once recognition module 146 is run against the contents in a collection folder, recognition module 146 can cause an email message to be sent to the collector informing the collector of how many photographs the collector was identified in. An exemplary email message can be, "You're in 3 photos received in your photo request."

Figure 14A:
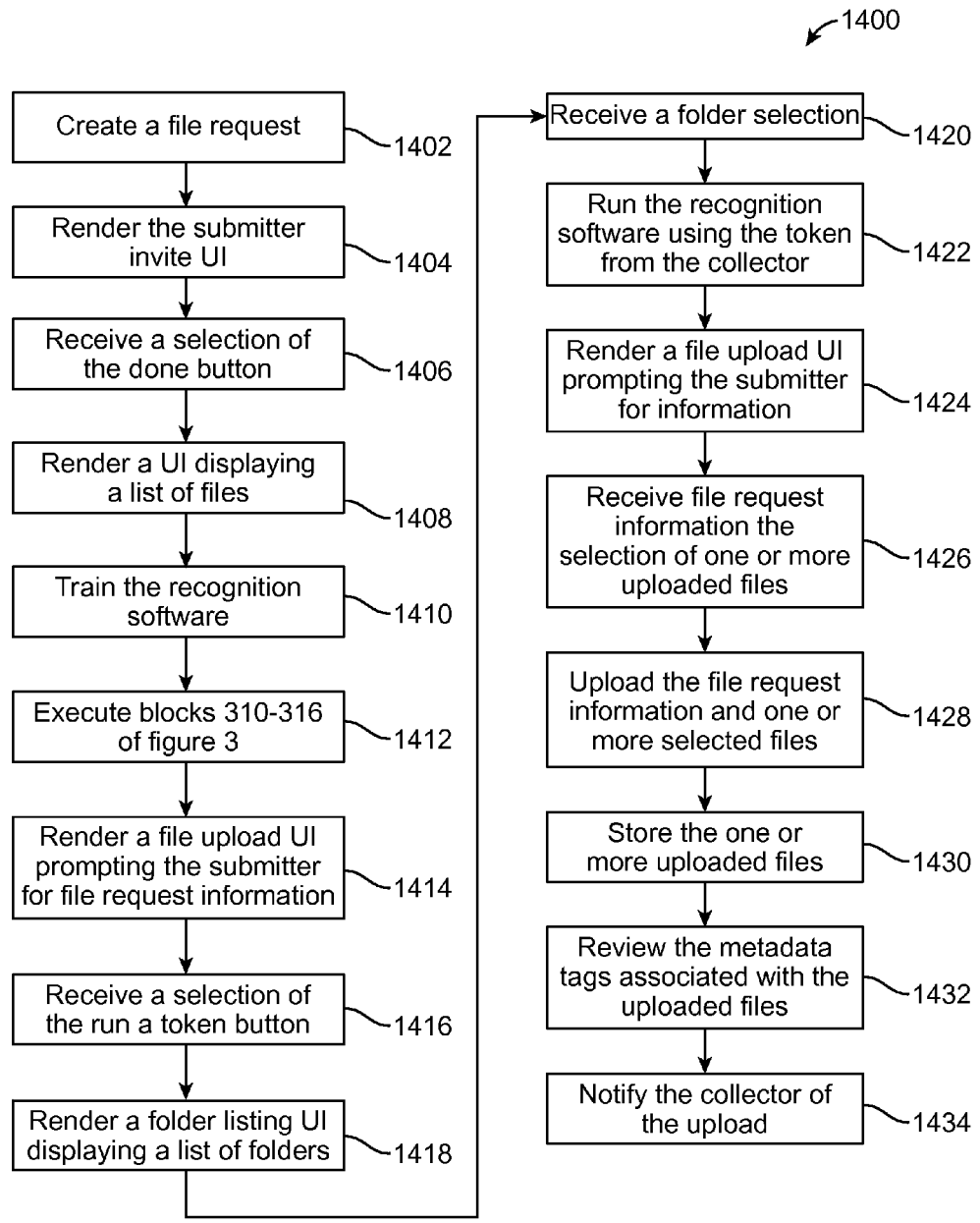
FIG. 14A is a flowchart for a method for using a facial and/or object recognition on a collection folder in accordance with an exemplary embodiment.

Referring to FIG. 14A, a flowchart for a method for using facial and/or object recognition on a collection folder in accordance with an exemplary embodiment is illustrated. Exemplary method 1400 is provided by way of example, as there are a variety of ways to carry out the method. Method 1400 described below can be carried out using the configurations illustrated in FIGS. 1 and 2A by way of example, and various elements of these figures are referenced in explaining exemplary method 1400. Each block shown in FIG. 14A represents one or more processes, methods or subroutines, carried out in exemplary method 1400. Exemplary method 1400 can begin at block 1402.

Figure 14B:
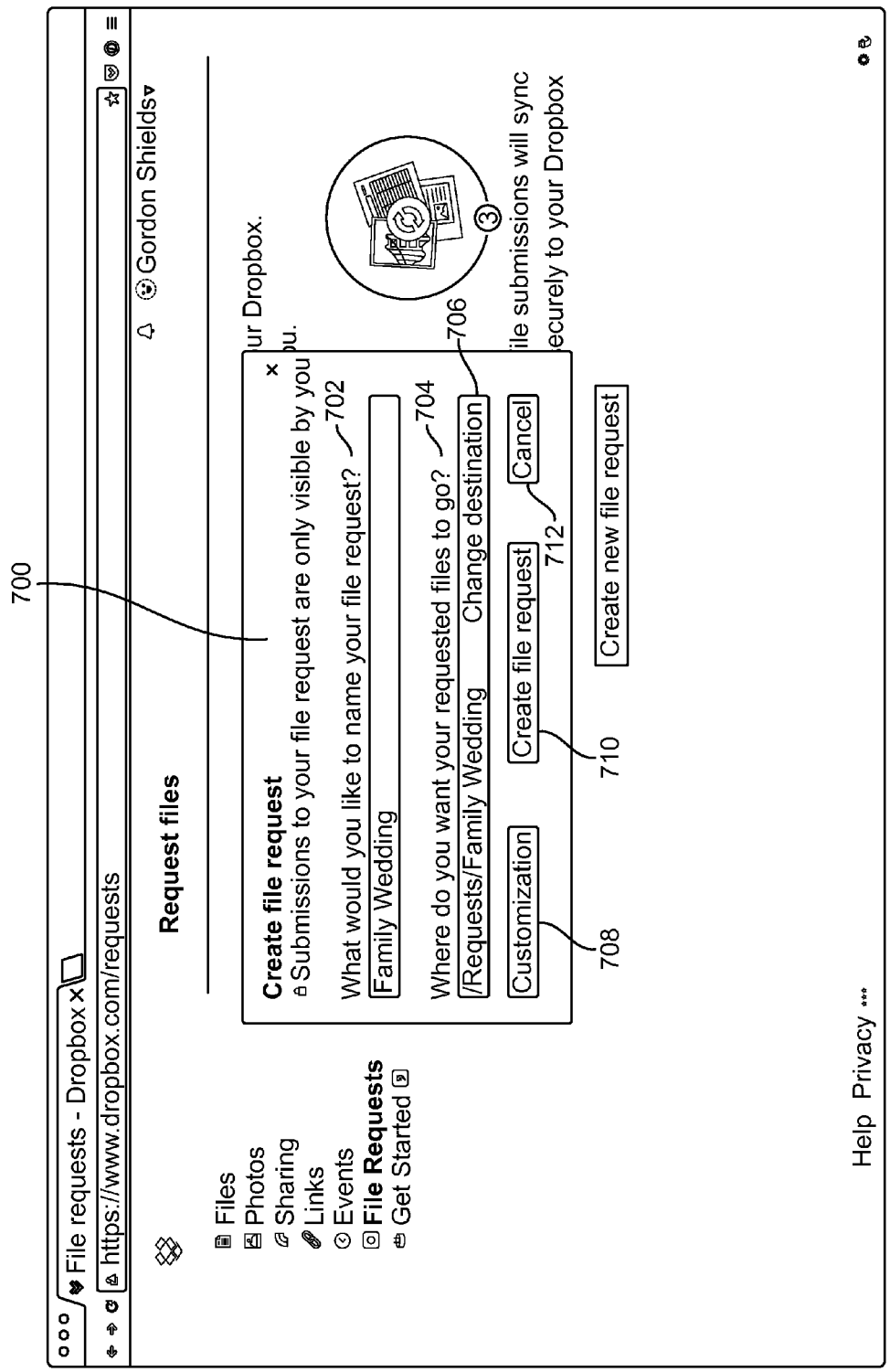
FIG. 14B is a Create a File Request UI rendering prompts for a file request in accordance with an exemplary embodiment.

At block 1402, create a file request. For example, the collector can execute blocks 302-306 in method 300 shown in FIG. 3. For example, in response to the prompts at block 306, the collector can name the file request "Family Wedding" with the requested files being stored at "/Requests/Family Wedding" as shown in FIG. 14B. The collector can select the rendered create new file request option 710. After selecting the file request menu option, method 1400 can proceed to block 1404.

At block 1404, render the submitter invite UI. For example, collection module 130 can render submitter invite UI 800 including generated collection link 802 as shown in FIG. 8A on the collector's client device $102_i$. After rendering submitter invite UI 800, method 1400 can proceed to block 1406.

At block 1406, receive a selection of the done button. For example, collection module 130 receives a selection of done button 806 as shown in FIG. 8A without the collector entering any email addresses. After receiving the selection of the done button, method 1400 can proceed to block 1408.

At block 1408, render a UI displaying a list of files. For example, UI module 122 renders a UI on the collector's client device $102_i$ displaying a list of files for the collector to select a file. FIG. 7C shows a UI 750 displaying files that the collector can choose. After rendering the UI displaying a list of files, method 1400 can proceed to block 1410.

At block 410, train the recognition software. For example, the recognition module 146 can run the recognition software to recognize faces and/or objects in one or more photos to train the recognition software. The recognition software can apply any filters associated with the token. The recognition software can recognize faces and/or objects 1464, 1466. FIG. 14K, discussed below, provides a flowchart for training the recognition software in more detail. After training the recognition software, method 1400 can proceed to block 1412.

At block 1412, execute blocks 310-316 of FIG. 3. At block 310, render submitter invite UI 800. For example, collection module 130 can render submitter invite UI 800 rendering generated collection link 802 as shown in FIG. 8A on the collector's client device $102_i$. Alternatively, the collector can send an email message to one or more submitters. The email message can contain the generated link that the collector can copy and paste or type into the email message and can attach a token. After rendering submitter invite UI 800, method 300 can proceed to block 312. At block 312, the collector can enter a message. For example, the collector can enter a message, such as, "Please use the token to find photos from our wedding!" After entering a message, method 300 can proceed to block 314. At block 314, store the entered email addresses and message, if entered. After storing the entered email addresses and message, if entered, method 300 can proceed to block 316. At block 316, the generated link is distributed. After executing blocks 310-316 of FIG. 3, method 1400 can proceed to block 1414.

Figure 14C:
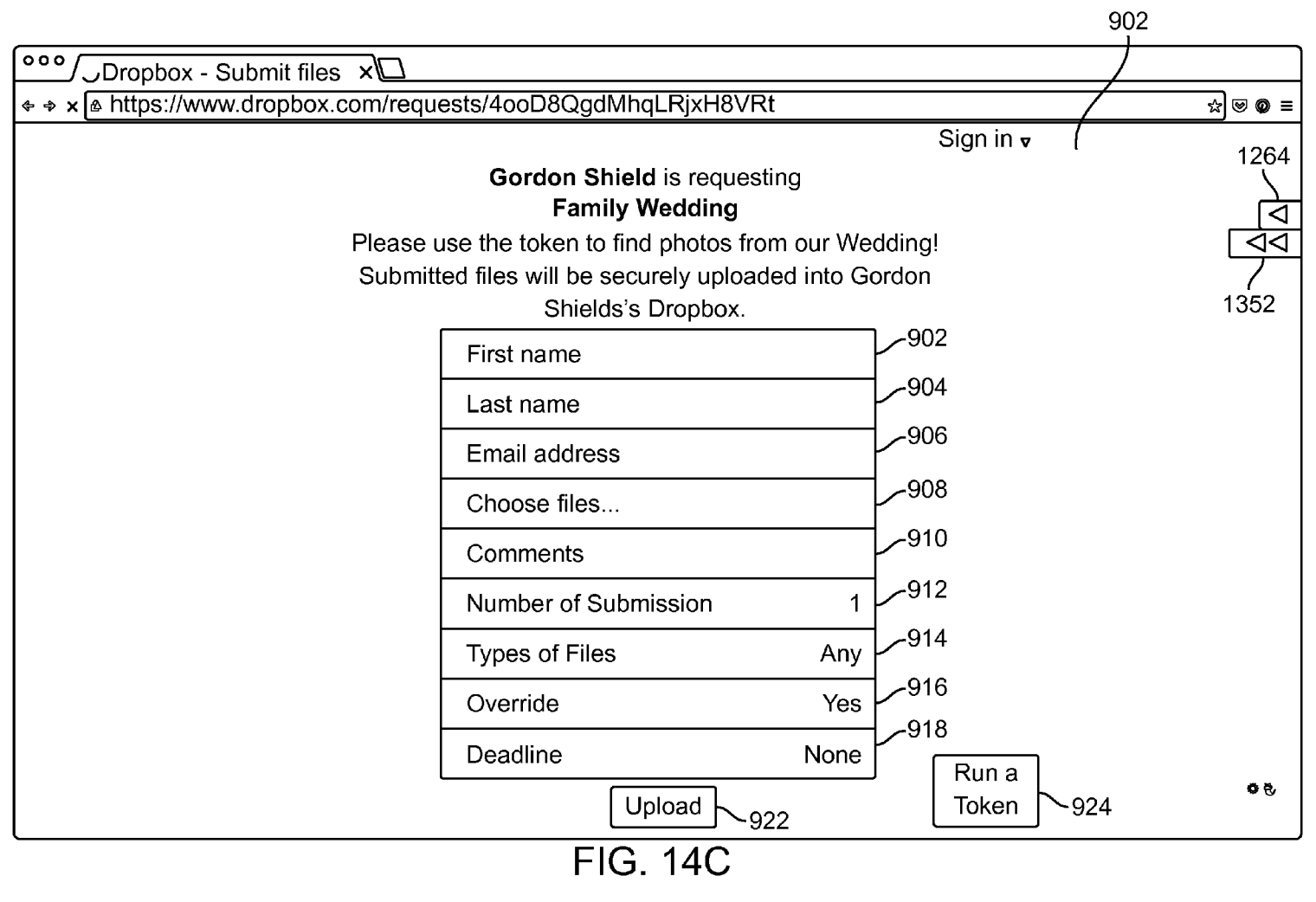

At block 1414, render a file upload UI prompting the submitter for file request information in response to a submitter activating the generated collection link. For example, UI module 122 causes a file upload UI to be rendered on the submitter's client device $102_i$. FIG. 14C shows rendered file upload UI 900. As shown, the file request came from Gordon Shields. File upload UI 900 can render the message from the collector: "Please use the token to find photos from our wedding!" As shown, rendered file upload UI 900 includes a run a token button 924. After rendering the file upload page, method 1400 can proceed to block 1416.

At block 1416, receive a selection of the run a token button. For example, recognition module 146 receives a selection of run a token button 924. After receiving a selection of run a token button 924, method 1400 can proceed to block 1418.

Figure 14D:
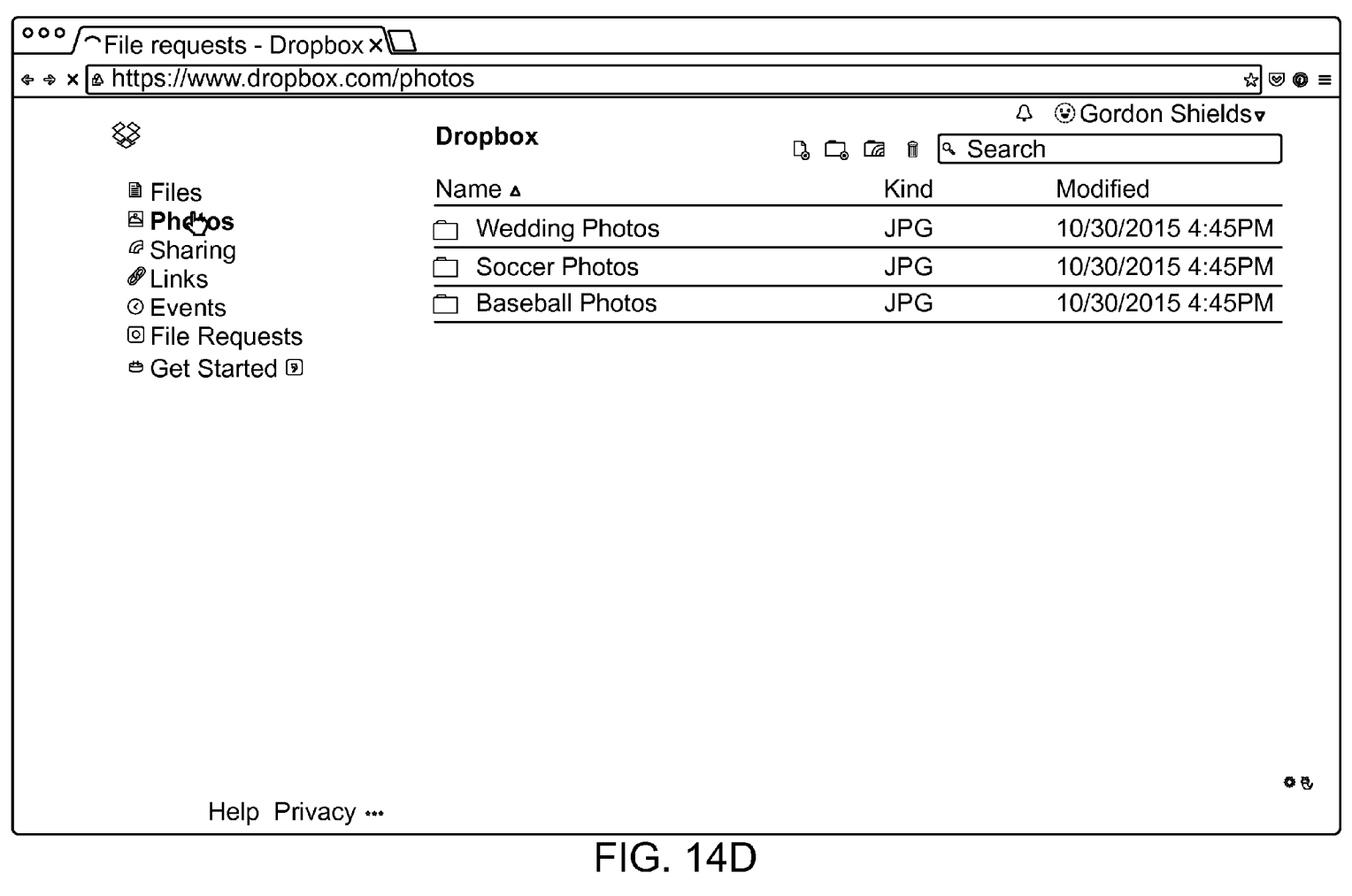

At block 1418, render a folder listing UI displaying a list of folders. For example, UI module 122 can render a folder listing of the submitter's files as shown in FIG. 14D on which the submitter can choose to run the recognition software. After rendering the file listing UI displaying a list of files, method 1400 can proceed to block 1420.

At block 1420, receive a folder selection. For example, UI module 122 receives a selection of a rendered folder to run the recognition software using the token from the collector. After receiving the selection, method 1400 can proceed to block 1422.

At block 1422, run the recognition software using the token from the collector. For example, recognition module 146 can run the recognition feature using the token to recognize faces and/or objects in one or more photos or videos. In one or more embodiments, the submitter can train the recognition software. Recognition module 146 can store the entered names as metadata tags and associate the metadata tags with the corresponding photo/file. Recognition module 146 can store the entered names as metadata tags and associate the metadata tags with the token. The submitter can run the token against one or more folders. When the submitter is done running the recognition software, method 1400 can proceed to block 1424.

At block 1424, render a file upload UI prompting the submitter for information in response to a submitter activating the generated collection link. For example, UI module 122 causes a file upload UI to be rendered on the submitter's client device $102_i$. FIG. 14C shows a rendered file upload UI 900. As shown, the file request came from Bob Smith. The submitter can enter information in response to the prompts. The submitter can select one or more folders and/or files to upload. After rendering the file upload UI, method 1400 can proceed to block 1426.

At block 1426, receive file request information and the selection of one or more uploaded files. For example, UI module 122 receives file request information provided by the submitter in response to the prompts and the selection of one or more files to be uploaded. To select the one or more files to be uploaded, the submitter can select the choose files option and a directory of the submitter's client device can be rendered allowing the submitter to select one or more files for uploading. After receiving the information and the one or more uploaded files are received, method 1400 can proceed to block 1428.

At block 1428, upload the file request information and one or more selected files. After providing the information and selecting one or more files to upload, the submitter can select upload button 922 shown in FIG. 14C to upload the information and one or more files to content management system 106. For example, the client software on the submitter's client device $102_i$ can cause the information and one or more selected files to be uploaded to content management system 106. After uploading the information and one or more files, method 1400 can proceed to block 1430.

At block 1430, store the one or more uploaded files. For example, content item management module 128 stores the one or more uploaded files in content storage 160. The one or more uploaded files can be stored in the collection folder and/or be associated with the collection folder. A content directory can identify the location of each content item in content storage 160. The content directory can include a unique content entry for each content item stored in the content storage. The content entry can include a content pointer that identifies the location of the content item in content storage 160. After storing the one or more uploaded files, method 1400 can proceed to block 1432.

At block 1432, review the metadata tags associated with the uploaded files. For example, the recognition software can review the metadata tags associated with the uploaded files to locate one or more objects that the token was trained for, such as the collector's name. After reviewing the metadata tags, method 1400 can proceed to block 1424.

At block 1434, notify the collector of the upload. Notification can include, but is not limited to, email, text message, posting to the account, application notifications (e.g., in-band notifications) or any other means of notification. For example, email module 140 notifies the collector of the upload. Email module 140 can send an email to the collector informing the collector that a submitter uploaded file. For example, the email message can recite, "Peter Smith uploaded 35 photos." If the metadata tags indicate that one or more objects were tagged, the email message can provide a notification of the metadata tags. For example, the email message can recite, "Peter Smith uploaded 35 photos in which you were tagged in 20 photos." In another example, the email message can recite, "Peter Smith uploaded 35 photos in which Fido was tagged in 20 photos."

Figure 14E:
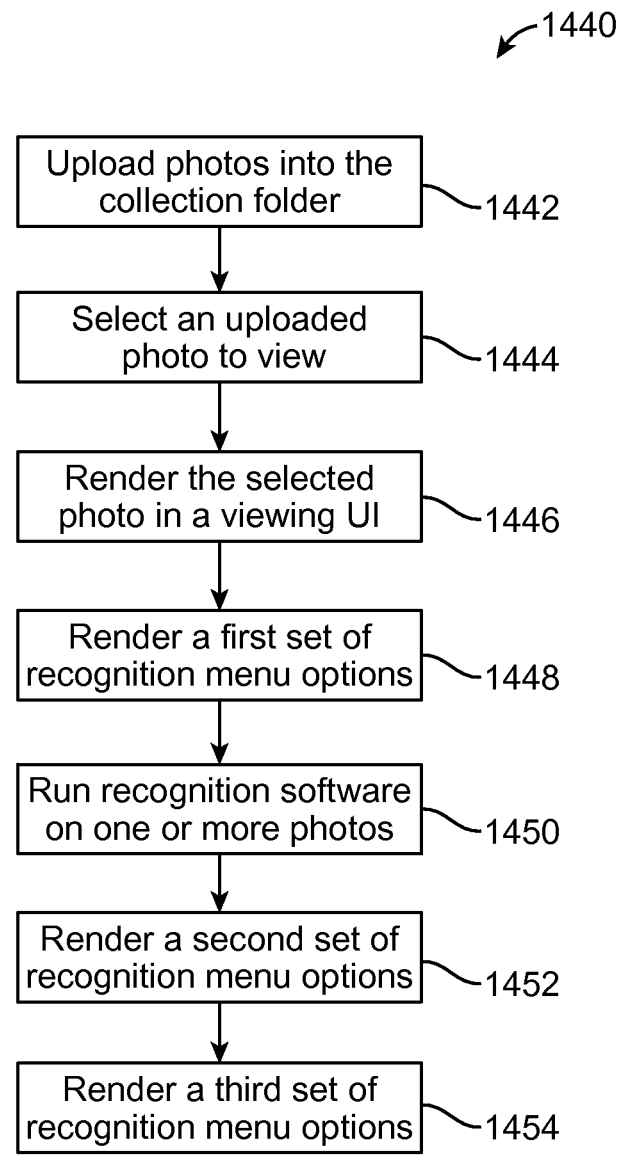
FIG. 14E is a flowchart for a method for training recognition software in accordance with an exemplary embodiment.

Referring to FIG. 14E, a flowchart for a method for training the recognition software in accordance with an exemplary embodiment is illustrated. Exemplary method 1440 is provided by way of example, as there are a variety of ways to carry out the method. Method 1440 described below can be carried out using the configurations illustrated in FIGS. 1 and 2A by way of example, and various elements of these figures are referenced in explaining exemplary method 1440. Each block shown in FIG. 14E represents one or more processes, methods or subroutines, carried out in exemplary method 1440. Exemplary method 1440 can begin at block 1442.

At block 1442, upload photos into the collection folder. For example, the collector can upload photos from a camera, client device $102_i$, and/or the collector's user account as known in the art. After uploading photos into the collection folder, method 1480 can proceed to block 1444.

At block 1444, select an uploaded photo to view. For example, the collector can select an uploaded photo from a list of photographs stored in the Family Wedding collection folder and rendered on the collector's client device $102_i$. After selecting an uploaded photo to view, method 1440 can proceed to block 1446.

Figure 14F:
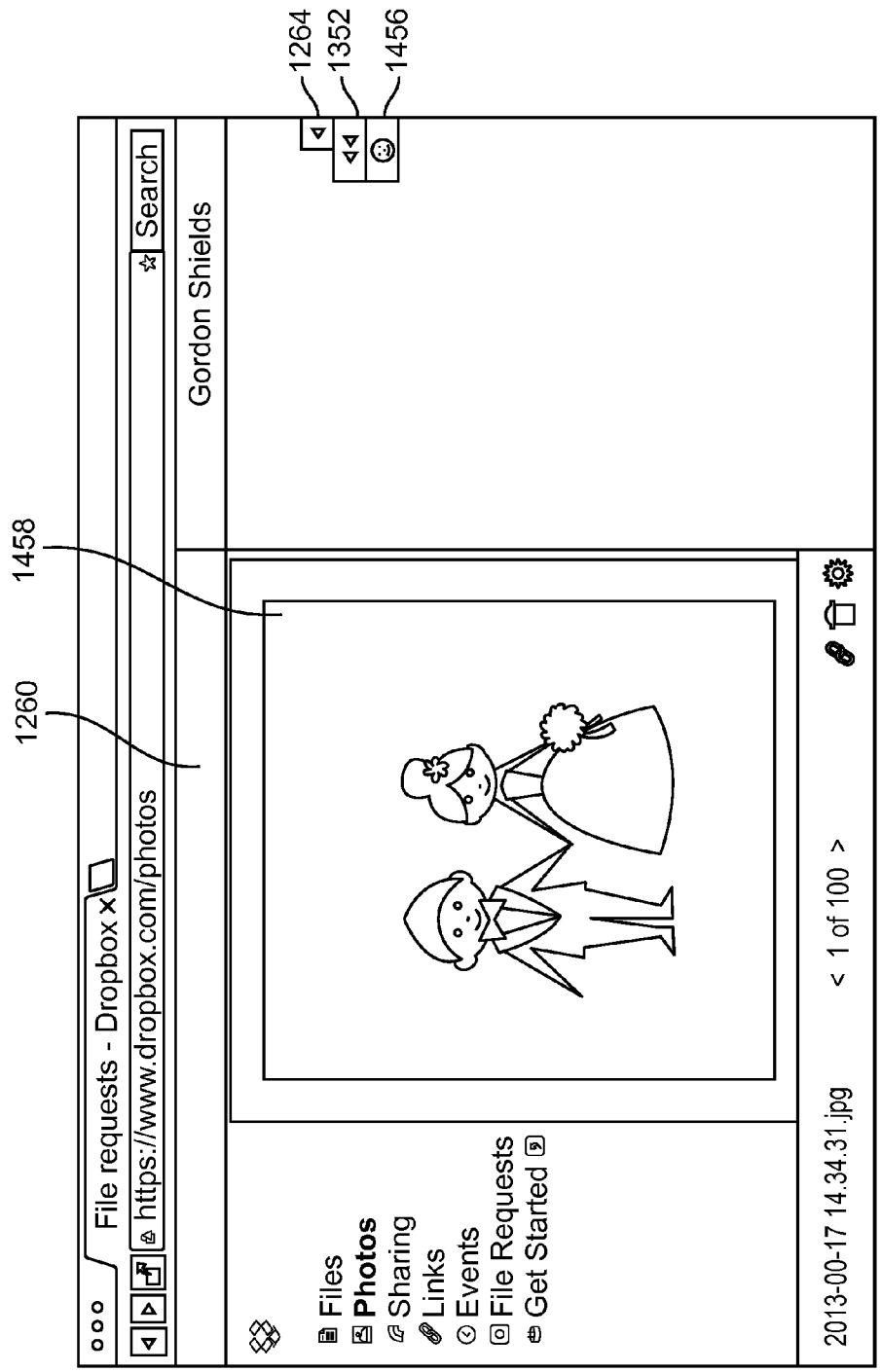
FIG. 14F is a viewing UI rendering a selected photo in accordance with an exemplary embodiment.

At block 1446, render the selected photo in a viewing UI. For example, UI module 122 causes the rendering of selected photo 1458 in viewing UI 1260 on the collector's client device $102_i$ as shown in FIG. 14F. Viewing UI 1260 can also display comment icon 1264, chat icon 1352 and facial recognition and/or object recognition icon 1456. Facial recognition and/or object recognition icon 1456 can be referred to as recognition icon 1456. After rendering the selected photo and receiving a selection of recognition icon 1456, method 1440 can proceed to block 1448.

Figure 14G:
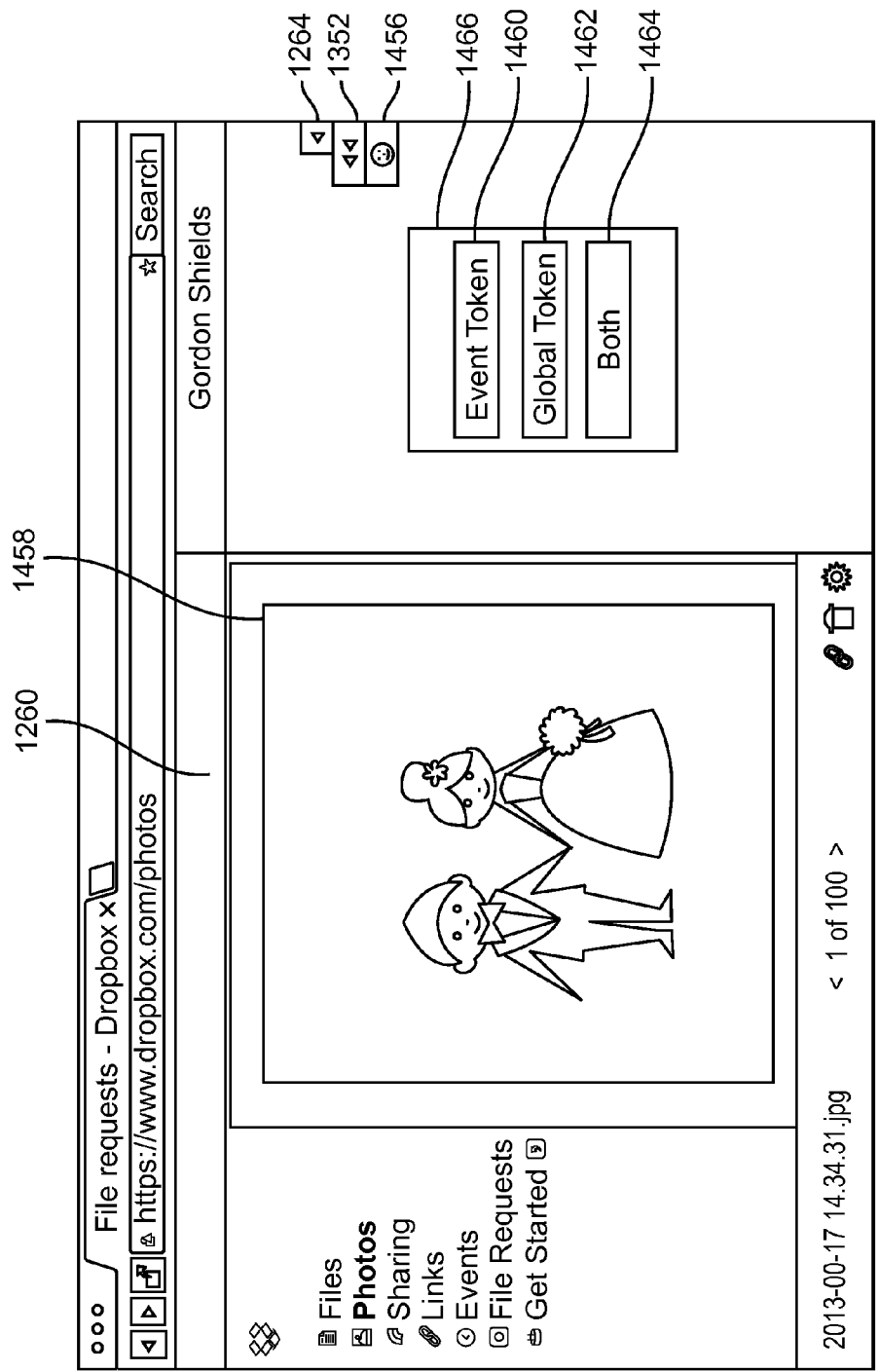
FIG. 14G is a UI rendering a first set of recognition menu options in accordance with an exemplary embodiment.

At block 1448, render a first set of recognition menu options and receive a selection of a menu option, the first set of recognition menu options is rendered in response to the selection of the recognition icon. For example, recognition module 146 can cause the rendering of a first set of recognition menu options 1466 as shown in FIG. 14G. As shown, the first set of recognition menu options can include event token button 1460, global token button 1462 and both 1464. After rendering the recognition menu options and receiving a selection, method 1440 can proceed to block 1450.

Figure 14H:
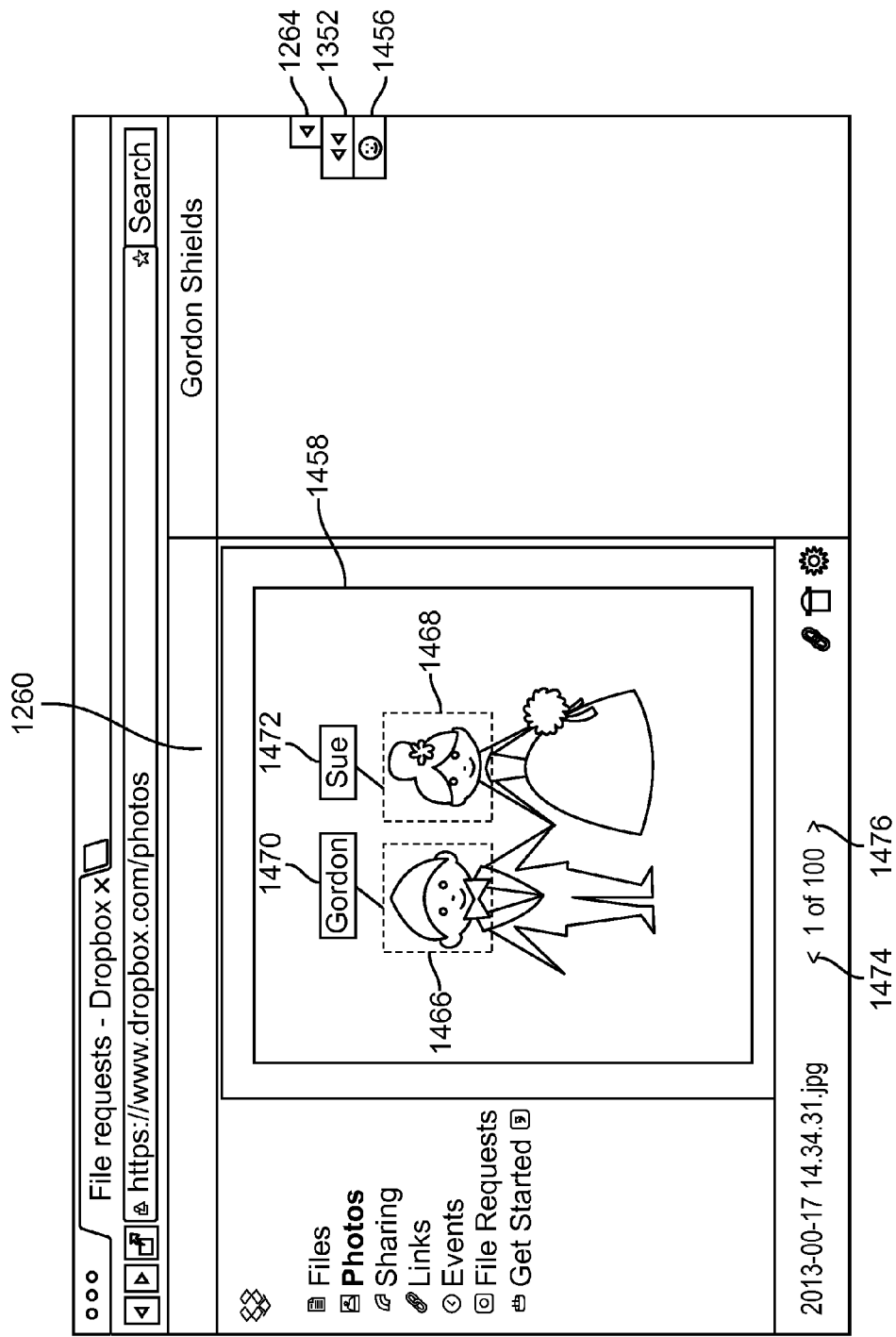
FIG. 14H is a UI rendering prompts to identify one or more recognized faces in accordance with an exemplary embodiment.

At block 1450, run recognition software on one or more photos. For example, recognition module 146 can run the recognition software to recognize faces and/or objects in one or more photos to train the recognition software. The recognition software can apply any filters associated with the token. The recognition software can recognize faces and/or objects 1466, 1468. The recognition software can prompt the collector to identify one or more recognized faces and/or objects 1470, 1472 by typing names for the recognized faces and/or objects as shown in FIG. 14H. As shown, the collector entered Gordon 1470 and Sue 1472. Recognition module 146 can store the entered names as metadata tags and associate the metadata tags with the corresponding photo/file. Recognition module 146 can store the entered names as metadata tags and associate the metadata tags with the selected token: event token, global token or both. After tagging a photo, the collector can go through more photos and tag the recognized faces and/or objects. For example, the collector can use navigation buttons 1474, 1476 to move to another photo. Recognition module 146 can save the event token 1460 in the corresponding collection folder. Recognition module 146 can save the event token 1460 and/or the global token 1462 in a photo folder or in a token folder. The event token can be saved and automatically named under the event, e.g., Family Wedding Token. The global token can be saved and automatically named, e.g., Global Token. When the user is done running the recognition software, method 1440 can proceed to block 1452.

Figure 14I:
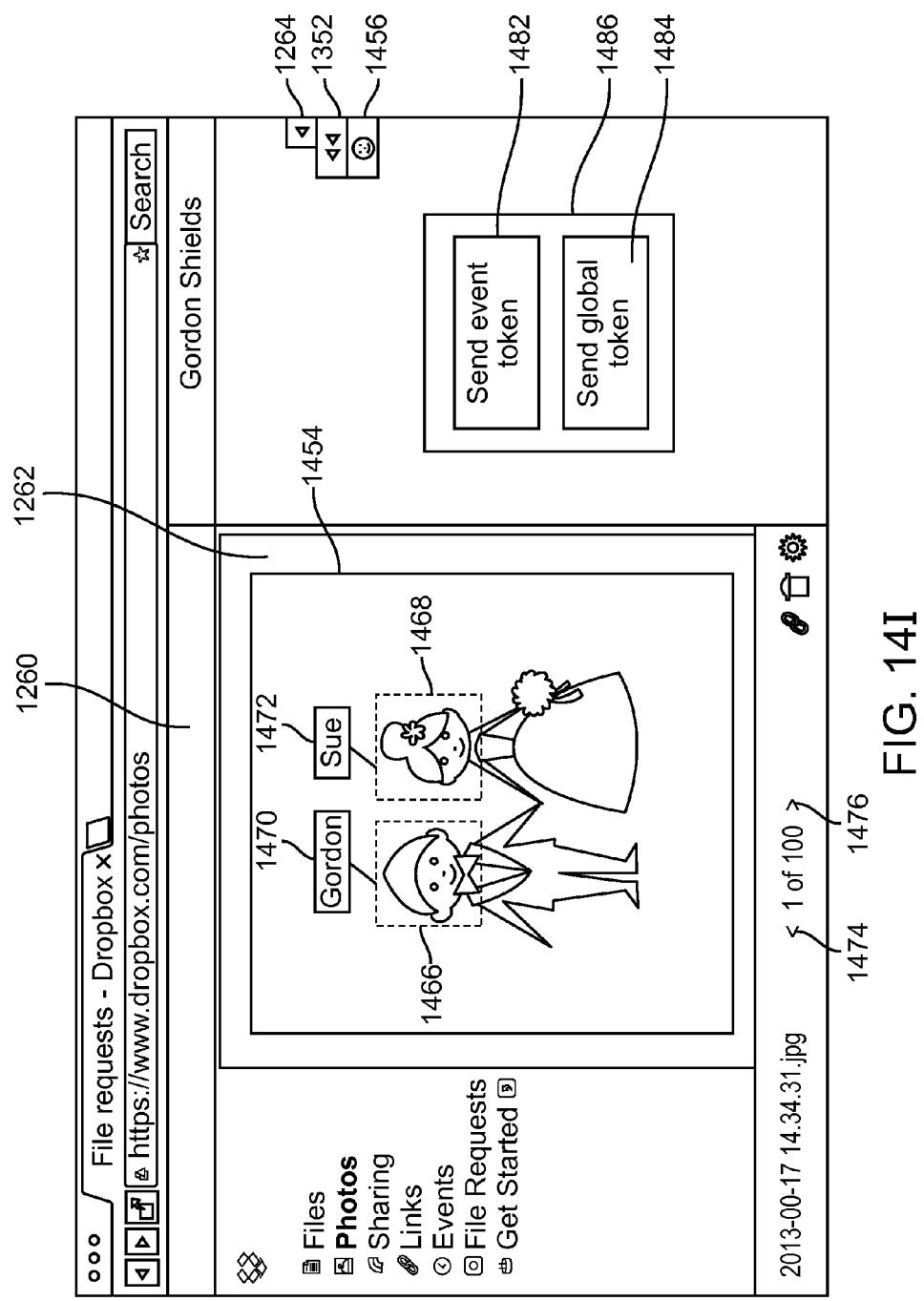
FIG. 14I is a UI rendering a second set of recognition menu options in accordance with an exemplary embodiment.

At block 1452, render a second set of recognition menu options and receive a selection of a menu option. For example, recognition module 146 can cause the rendering of a second set of recognition menu options 1484 on the collector's client device $102_i$ as shown in FIG. 14I. The second set of recognition menu options 1486 can include send event token button 1482 and/or send a global token button 1484. If event token button 1460 was selected earlier, then only send event token button 1482 is rendered. If global token button 1462 was selected earlier, then only send global token button 1484 is rendered. If both button 1464 was selected earlier, then send event token button 1482 and send global button 1484 are rendered. After rendering the second set of recognition menu options and receiving a selection of a button, method 1440 can proceed to block 1454.

Figure 14J:
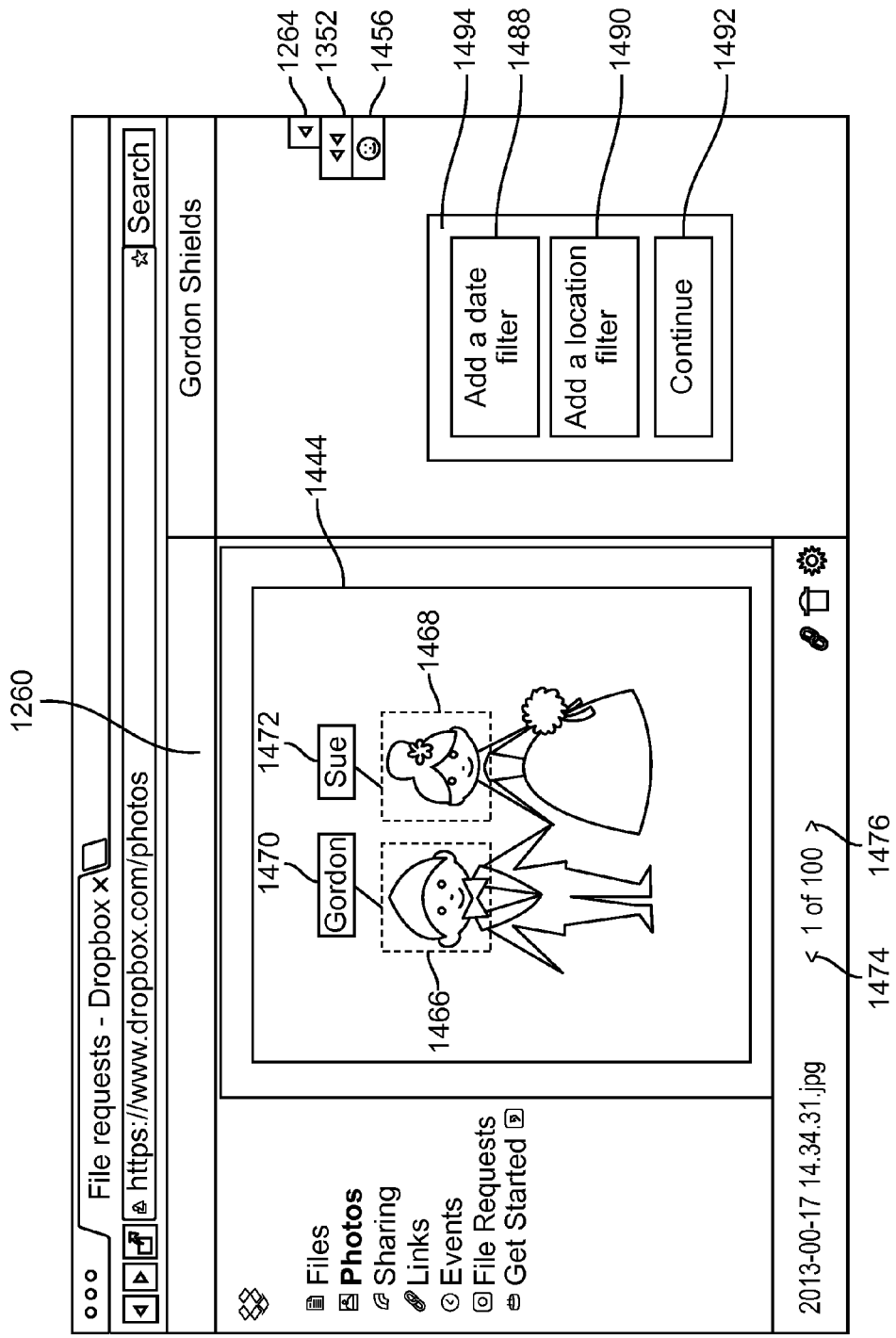
FIG. 14J is a UI rendering a third set of recognition menu options in accordance with an exemplary embodiment.

At block 1454, render a third set of recognition menu options and receive a selection of a menu option. For example, recognition module 146 can cause the rendering of a third set of recognition menu options 1494 on the collector's client device $102_i$ as shown in FIG. 14J in response to one of send event token button 1482 and send global token button 1484 being selected. The third set of recognition menu options 1484 can include add date filter button 1488, add a location filter button 1490 and continue button 1492. If add a date filter button 1488 is selected, the collector can enter a date or a range of dates to the token. If add a location filter button 1490 is selected, the collector can add a location or a location with a distance threshold to the token. The collector can select both of add a date filter button 1488 and add a location filter button 1490. In response to the collector selecting continue button 1492, method 1440 can proceed to block 1412 of FIG. 14A.

Email

In one or more embodiments, when a user is typing an email message, an email module 144 can monitor the text of the email message for one or more triggering words and suggest the use of a file request. For example, if the text recites, "Can you send me that file," email module 144 can prompt the user if the user would like to have a file request generated. If you the user agrees to the use of a file request, email module 144 can cause a file request to be created and can embed the generated link into the email message. The generated link can be hypertext. Email module 144 can replace or supplement the text with the hypertext. For example, the text can become, "can you send me that file using my collection folder." The "my collection folder" can be hypertext and when the submitter clicks on the hypertext, an upload page can be rendered on the submitter's client device. The triggering language can be set by content management system 106 and/or can be user driven. For user driven triggering language, a user can set one or more words or phrases to trigger the prompt for generating a file request.

Figure 15A:
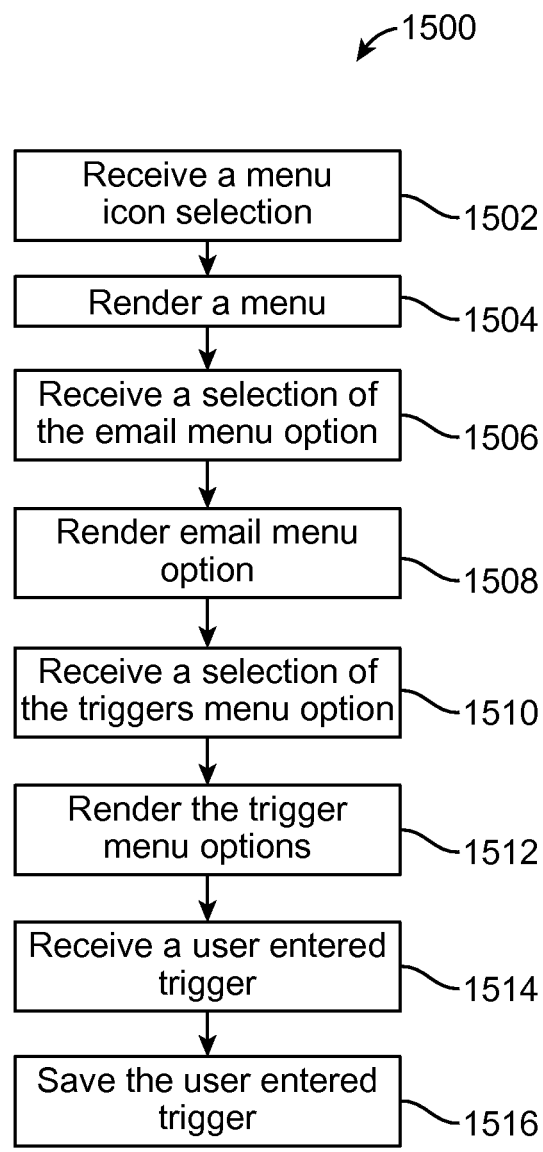
FIG. 15A is a flowchart for a method for creating a file request trigger in accordance with an exemplary embodiment.

Referring to FIG. 15A, a flowchart for a method for creating a file request trigger in accordance with an exemplary embodiment is illustrated. Exemplary method 1500 is provided by way of example, as there are a variety of ways to carry out the method. Method 1500 described below can be carried out using the configurations illustrated in FIGS. 1 and 2A by way of example, and various elements of these figures are referenced in explaining exemplary method 1500. Each block shown in FIG. 15A represents one or more processes, methods or subroutines, carried out in exemplary method 1500. Exemplary method 1500 can begin at block 1502.

Figure 15B:
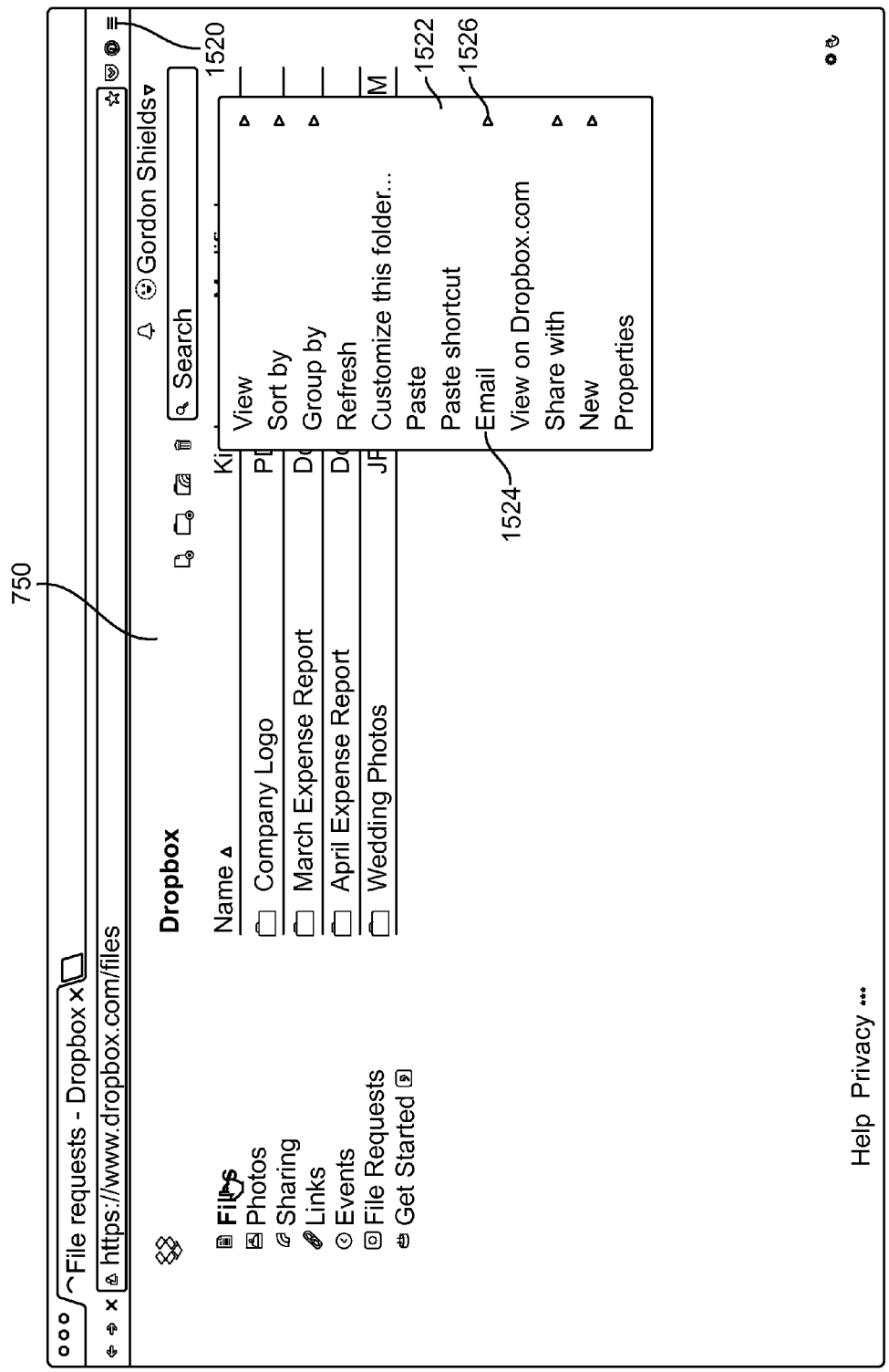
FIG. 15B is a menu rendering a list of menu options in accordance with an exemplary embodiment.

At block 1502, receive a menu icon selection. For example, UI module 122 can receive a selection of a menu icon by the user, e.g., a collector, selecting menu icon 1520 rendered on the user's client device 102$_i$ as shown in FIG. 15B. After receiving a menu icon selection, method 1500 can proceed to block 1504.

At block 1504, render a menu. For example, UI module 122 renders menu 1524 on the user's client device 102$_i$, as shown in FIG. 15B, a menu listing menu options. After rendering menu 1524, method 1500 can proceed to block 1506.

At block 1506, receive a selection of the email menu option. For example, UI module 122 and/or email module 140 receives a selection of email menu option 1524 or email expansion icon 1526. After receiving the selection of the email menu option, method 1500 can proceed to block 1508.

Figure 15C:
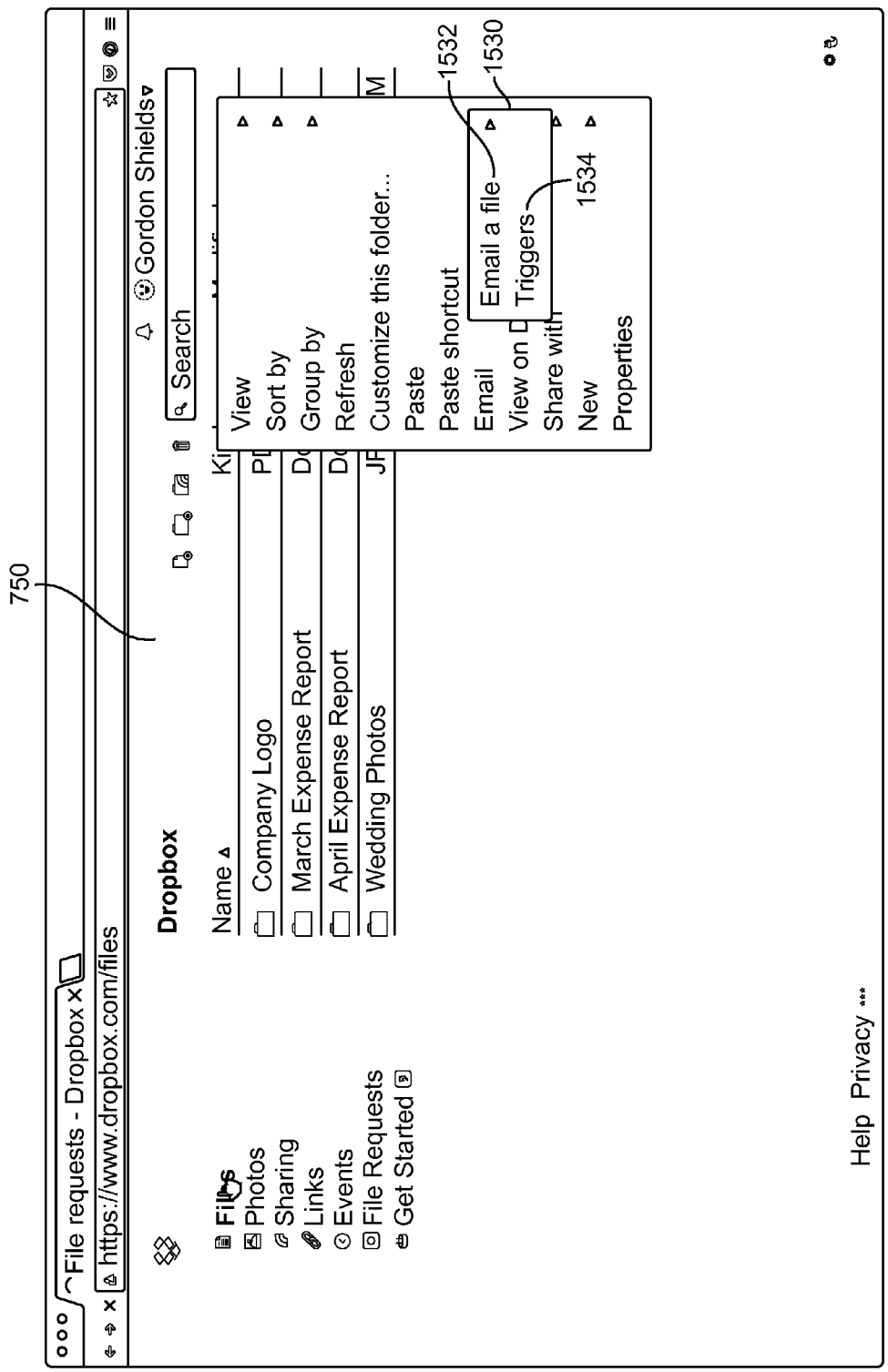
FIG. 15C is a menu rendering a list of email menu options in accordance with an exemplary embodiment.

At block 1508, render email menu options. For example, UI module 122 and/or email module 140 renders email menu options 1530 on the user's client device 102$_i$ as shown in FIG. 15C. As shown, there are two email menu options: email a file 1532 and triggers 1534. After rendering the email menu options, method 1500 can proceed to block 1510.

At block 1510, receive a selection of the triggers menu option. For example, UI module 122 and/or email module 140 receives a selection of triggers menu option 1534. After receiving a selection of triggers menu option 1534, method 1500 can proceed to block 1512.

Figure 15D:
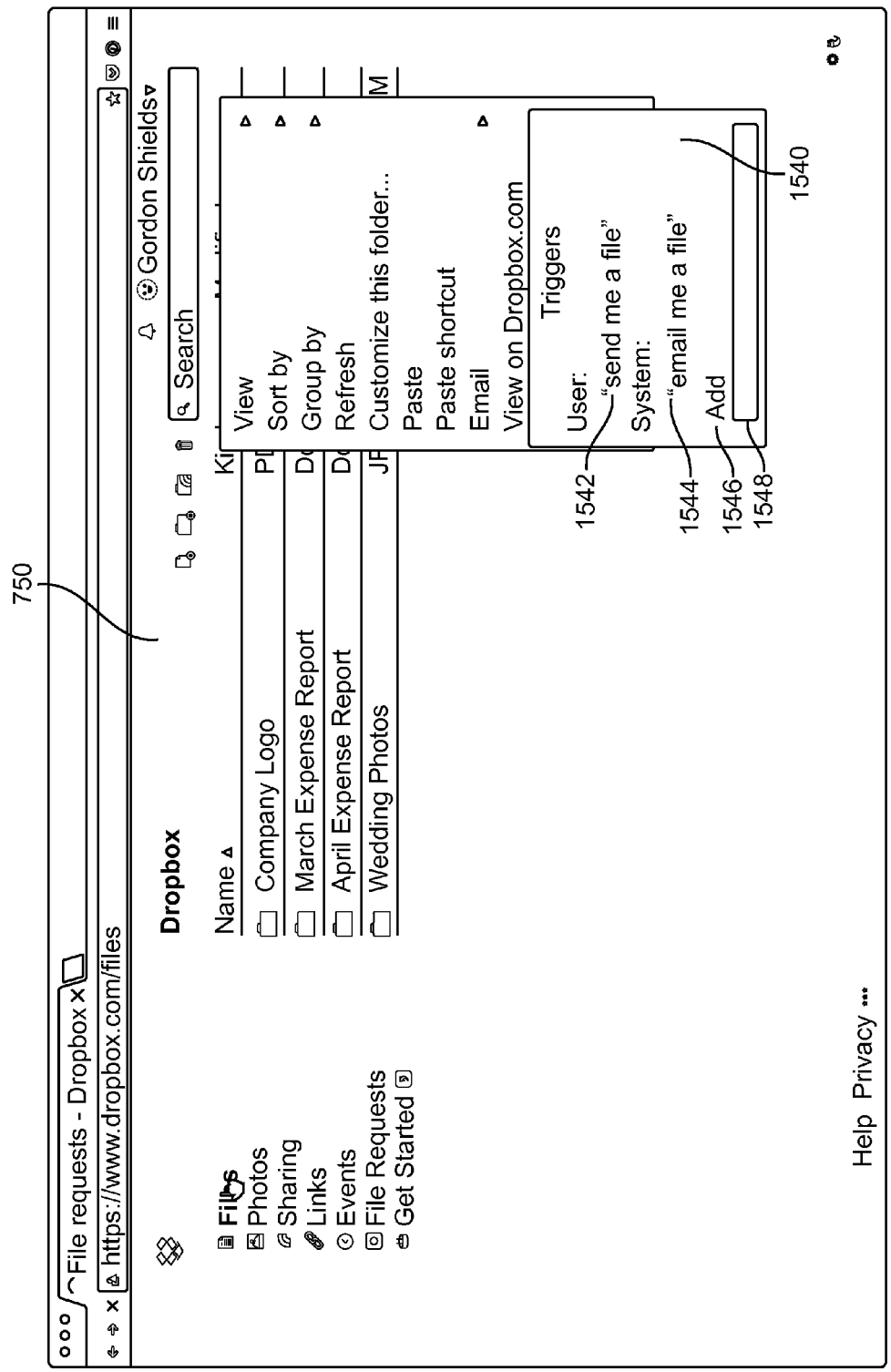
FIG. 15D is a menu rendering a list of trigger email menu options in accordance with an exemplary embodiment.

At block 1512, render the trigger menu options. For example, UI module 122 and/or email module 140 renders trigger menu options 1540 on the user's client device 102$_i$ as shown in FIG. 15D. The trigger menu options can include user defined triggers and/or system default triggers. For example, as shown, there is one user defined trigger: "send me a file" 1542 and a system default trigger: "email me a file" 1544. The menu can include an add option 1546 along with an entry box 1548. If the user had previously entered one or more triggers, the previously entered one or more triggers would be displayed as shown. After rendering the trigger menu options, method 1500 can proceed to block 1514.

At block 1514, receive a user entered trigger. For example, UI module 122 and/or email module 140 receives a user entered trigger, such as "attach a file to your email." After receiving a user entered trigger, method 1500 can proceed to block 1516.

At block 1516, save the user entered trigger. For example, UI module 122 and/or email module 140 saves the user entered trigger.

Figure 15E:
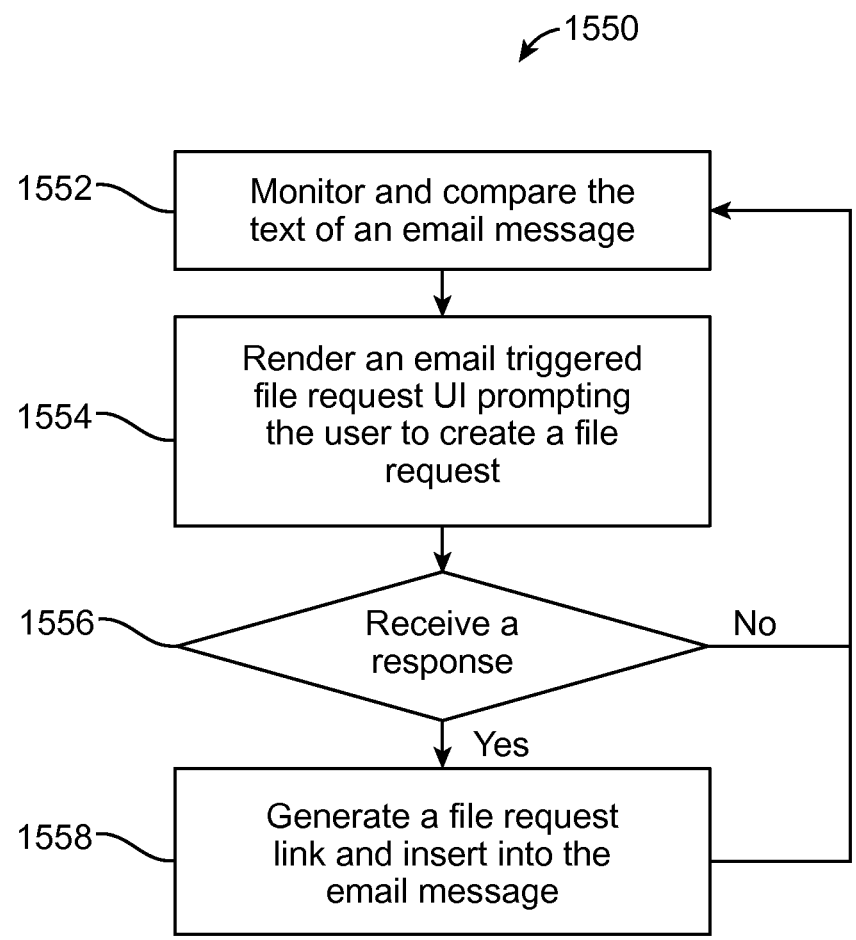
FIG. 15E is a flowchart for a method for creating a file request trigger in accordance with an exemplary embodiment.

Referring to FIG. 15E, a flowchart for a method for creating a file request in response to detecting a trigger in accordance with an exemplary embodiment is illustrated. Exemplary method 1550 is provided by way of example, as there are a variety of ways to carry out the method. Method 1550 described below can be carried out using the configurations illustrated in FIGS. 1 and 2A by way of example, and various elements of these figures are referenced in explaining exemplary method 1550. Each block shown in FIG. 15E represents one or more processes, methods or subroutines, carried out in exemplary method 1550. Exemplary method 1550 can begin at block 1552.

At block 1552, monitor and compare the text of an email message. For example, email module 140 monitors the text of an email message as the email message is being typed and compares the text to one or more stored email triggers. If the comparison results in a match, method 1550 can proceed to block 1554.

Figure 15F:
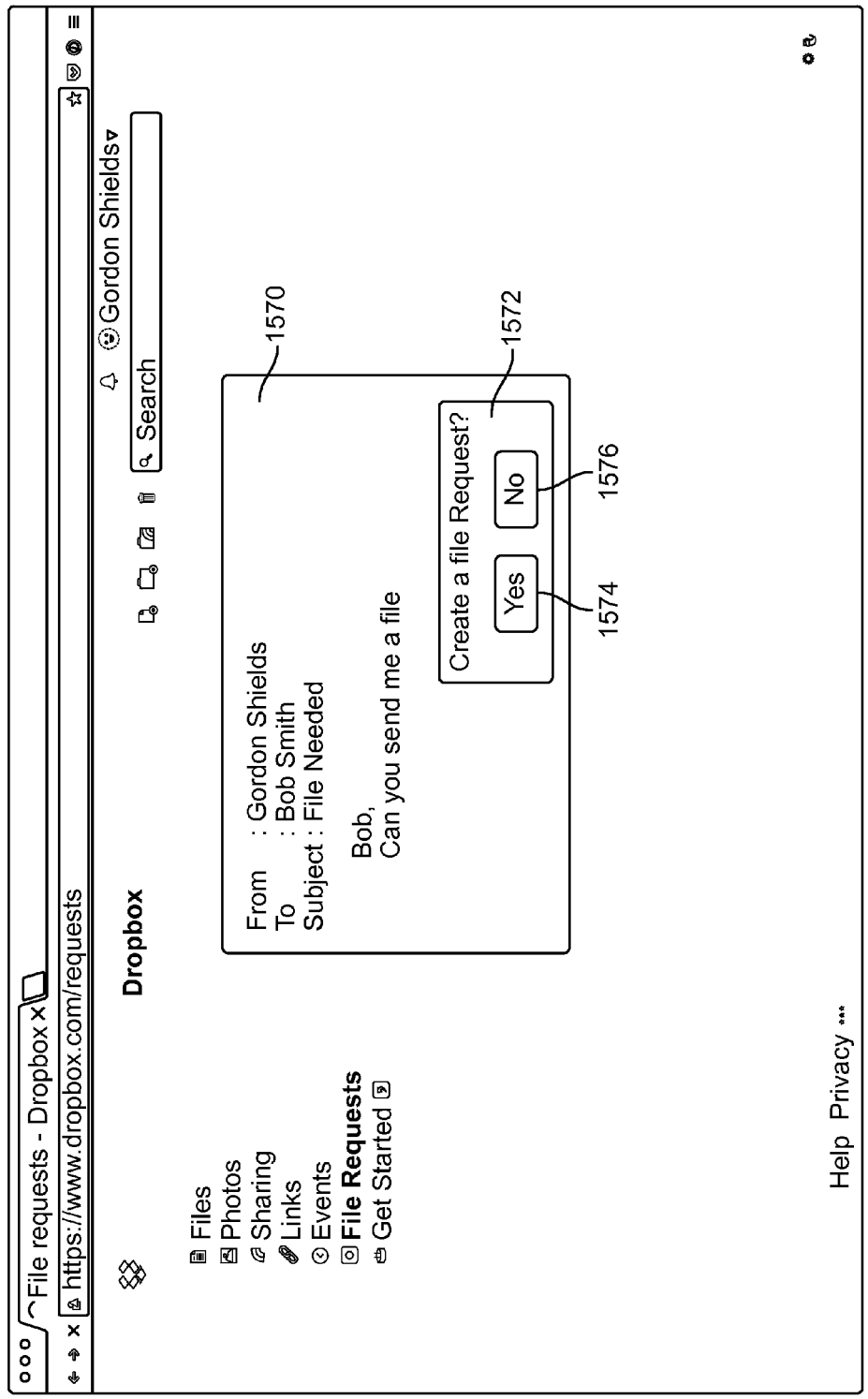
FIG. 15F is a UI rendering a prompt to create a file request in accordance with an exemplary embodiment.

At block 1554, render an email triggered file request UI prompting the user to create a file request. For example, collection module 130 and/or email module 140 renders an email triggered file request UI prompting the user to create a file request on the user's client device 102$_i$ as shown in FIG. 15F. As shown, email triggered file request UI 1572 prompts the user. The prompts include yes button 1574 to create a file request and no button 1576 not to create a file request while the user is typing email message 1570. After rendering the email triggered file request UI, method 1550 can proceed to block 1556.

At block 1556, receive a response. For example, collection module 130 and/or email module 140 receives a response to the prompt. If the response is a selection of yes button 1574, method 1550 can proceed to block 1558. If the response is the selection of no button 1576, method 1560 can proceed to block 1552.

At block 1558, generate a file request link and insert it into the email message. For example, collection module 130 and/or email module 140 can insert the generated file request link into the email message or replace text in the email message with a hypertext link. For example, if the user typed "Can you send me that file?", the text can be supplemented with the generated file request link so the text recites, "Can you send me the file at http://db.tt/xOFounw". In another example, if the text is replaced with a hyperlink, the text can recite, "Can you send me the file?" with the "send me" being a hyperlink. After generating the file request link and inserting it into the email message, the method 1550 can continue to block 1552.

In one or more embodiments, a collection email address can be created. The collection email address can be created in place of and/or in addition to the file request link. For example, the email address can be created when the link is generated by collection module 130. In one or more embodiments, email module 140 can create the email address. By using an email, a submitter can upload one or more files to the collection folder by replying to the email message and attaching the one or more files.

Figure 16A:
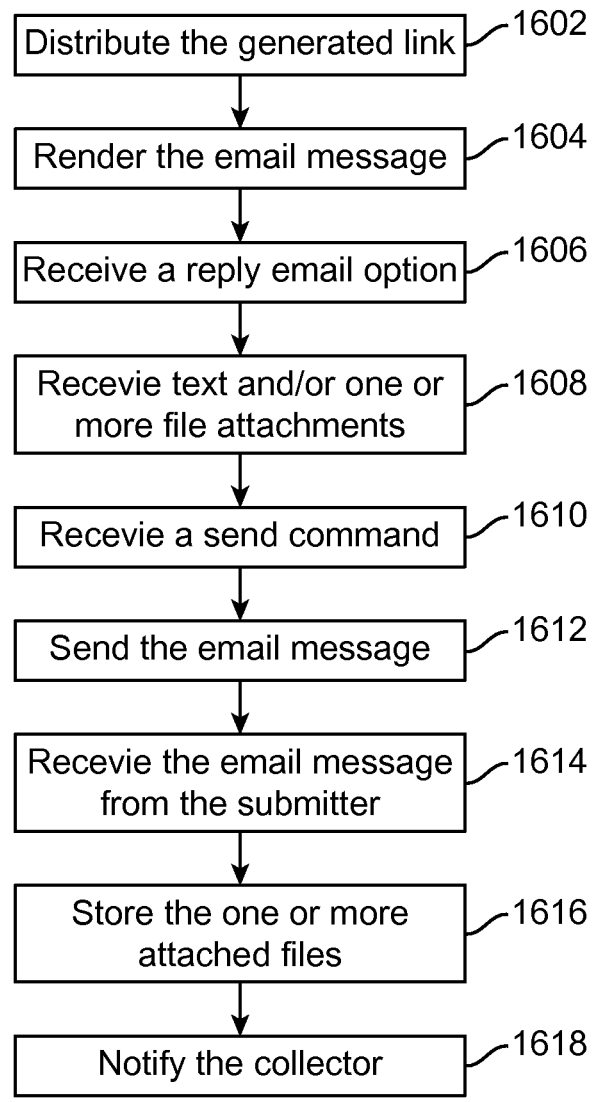
FIG. 16A is a flowchart for a method for creating a collection email address in accordance with an exemplary embodiment.

Referring to FIG. 16A, a flowchart for a method for creating a collection email address in accordance with an exemplary embodiment is illustrated. Exemplary method 1600 is provided by way of example, as there are a variety of ways to carry out the method. Method 1600 described below can be carried out using the configurations illustrated in FIGS. 1 and 2A by way of example, and various elements of these figures are referenced in explaining exemplary method 1600. Each block shown in FIG. 16A represents one or more processes, methods or subroutines, carried out in exemplary method 1600. Exemplary method 1600 can begin at block 1602.

At block 1602, distribute the generated link. For example, collection module 130 and/or email module 140 sends an email message based on the at least some of the received information. This can be the same or similar to block 316 of FIG. 3 in which the received information was received in block 314 of FIG. 3. The email message can contain the generated link, and the message, if entered, to the one or more submitters whose email addresses were entered by the collector. The email address from which the email address is sent from can be an email address generated by collection module 130 and/or email module 140. After distributing the generated link, method 1600 can proceed to block 1604.

Figure 16B:
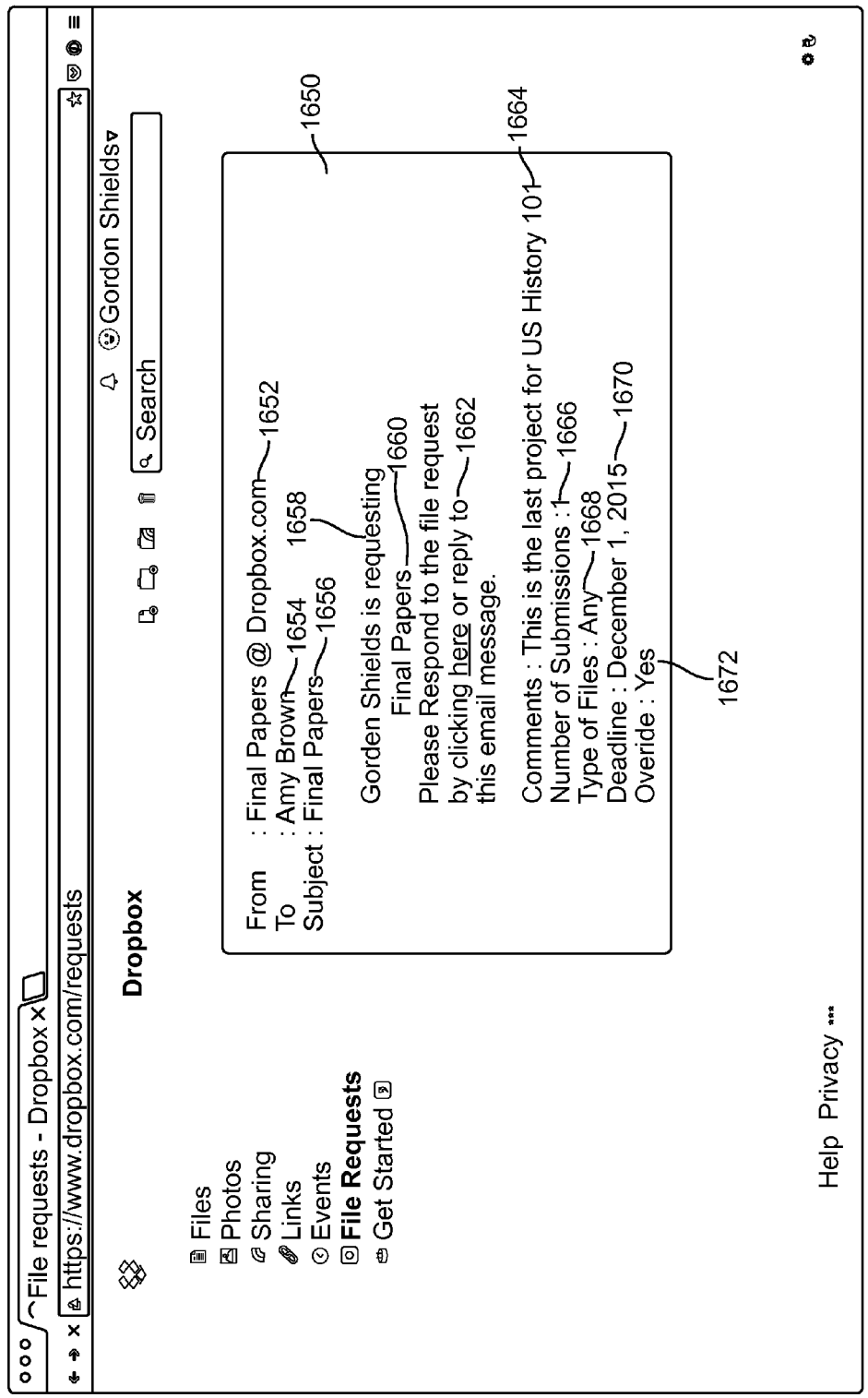
FIG. 16B is a rendered email in accordance with an exemplary embodiment.

At block 1604, render the email message. For example, an email program of content management system 106 or a third party email program can render an email message on a submitter's client device $102_i$ as known in the art as shown in FIG. 16B. As shown, email message 1650 can contain information associated with the file request, such as the email address, e.g., FinalPapers@Dropbbox.com 1652, who the email is sent to, e.g., submitter, "Amy Brown" 1654, subject, "Final Papers" 1656, who caused the email to be sent, e.g., "Gordon Shields" 1658, the title of the collection folder, e.g., "Final Papers" 1660, the generated link, e.g., "Please respond to the file request by clicking here or reply to this email message" with "here" being hypertext link 1662 to the collection folder, and a comment from the collector if entered, e.g., "This is the last project for US History 101" 1664. If the collector customized the file request, email message 1650 can include additional information such as, "Number of Submissions: 1" 1666, "Type of Files: any" 1668, "Deadline: Dec. 1, 2015" 1670 and "Override: yes" 1672. If the file request is a photo request, the email message can include a token as an attachment. After rendering the email message, method 1600 can proceed to block 1606.

At block 1606, receive a reply email option. For example, the email program of content management system 106 or a third party email program receives a selection of the reply option or reply email option as known in the art. After receiving the reply option, method 1600 can proceed to block 1608.

At block 1608, receive text and/or one or more file attachments. For example, the email program of content management system 106 or a third party email program receives text from the submitter and/or one or more file attachments as known in the art. After receiving text and/or one or more file attachments, method 1600 can proceed to block 1610.

At block 1610, receive a send command. For example, the email program of content management system 106 or a third party email program receives a send command as known in the art. After receiving the send command, method 1600 can proceed to block 1612.

At block 1612, send the email message. For example, the email program of content management system 106 or a third party email program sends the email message to content management system 106. After sending the email message, method 1600 can proceed to block 1614.

At block 1614, receive the email message from the submitter. For example, email module 140 receives the email message and one or more attached files from the submitter. After receiving the email message, method 1600 can proceed to block 1616.

At block 1616, store the one or more attached files. For example, collection module 130 and/or email module 140 stores the one or more attached files in content storage 160. The one or more files can be stored in the collection folder and/or be associated with the collection folder based on the email address that the email message was sent to. Collection module 130 and/or email module 140 can store the email as a separate file in the collection folder and/or be associated with the collection folder. A content directory can identify the location of each content item in content storage 160. The content directory can include a unique content entry for each content item stored in content storage 160. The content entry can include a content pointer that identifies the location of the content item in content storage 160. After storing the one or more uploaded files, method 1600 can proceed to block 1618.

At block 1618, notify the collector in response to one or more files being stored in the collection folder. Notification can include, but is not limited to, email, text message, posting to the account, application notifications (e.g., in-band notifications) or any other means of notification. For example, account management module 124 and/or email module 140 causes an email message to be sent to the collector in response to one or more files being stored in the collection folder. The notification can notify the collector that one or more files have been uploaded to the collection folder. The email message can provide information associated with the uploaded one or more files. For example, the information can include the file name, a timestamp for when the file was uploaded and the name of the submitter for each uploaded file.

Publishing

After receiving some or all of the content items in a collection folder, the collector can publish the contents of the collection folder. By publishing the collection folder, the collector is able to share submissions with the one or more submitters and/or others. The publishing of the collection folder can be private or public. A private publication can limit access to the private collection folder to only the submitters. A public publication can allow anyone to access the published collection folder. In one or more embodiments, the collector can publish the contents via a public discoverable URL, such as a vanity URL (e.g., www.dropbox.com/filerequest/gideon), or via a wiki, such as a company wiki. In one or more embodiments, the published collector folder can be published as an electronic dataroom.

Figure 17A:
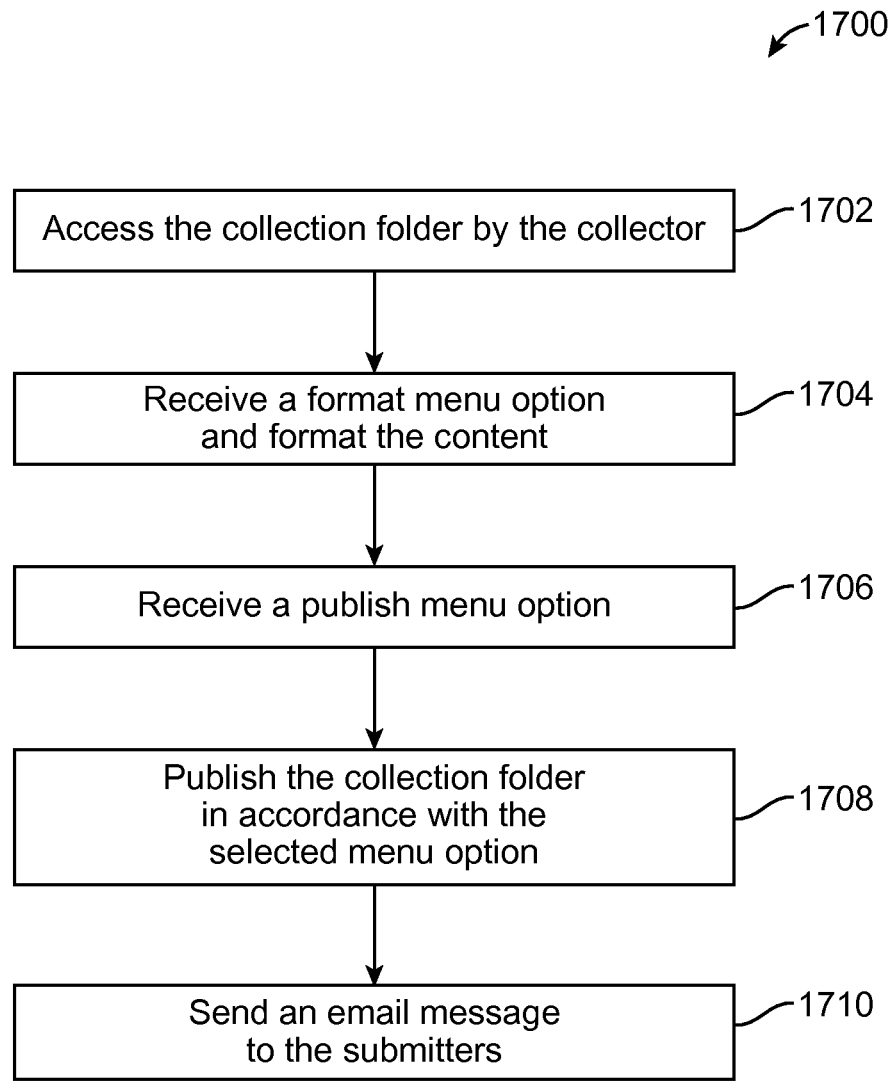
FIG. 17A is a flowchart for a method for publishing the contents of a collection folder in accordance with an exemplary embodiment.

Referring to FIG. 17A, a flowchart for a method for publishing the contents of a collection folder in accordance with an exemplary embodiment is illustrated. Exemplary method 1700 is provided by way of example, as there are a variety of ways to carry out the method. Method 1700 described below can be carried out using the configurations illustrated in FIGS. 1 and 2A by way of example, and various elements of these figures are referenced in explaining exemplary method 1700. Each block shown in FIG. 17A represents one or more processes, methods or subroutines, carried out in exemplary method 1700. Exemplary method 1700 can begin at block 1702.

At block 1702, access the collection folder by the collector. For example, the collector, e.g., Gordon Shields, accesses a collection folder by selecting a collection folder displayed in a homepage UI 410 rendered on the collector's client device 102$_i$ as shown in FIG. 4B. For example, the collector can select a collection folder, e.g., Homework Assignment #1 folder. After accessing the collection folder, method 1700 can proceed to block 1704.

Figure 17B:
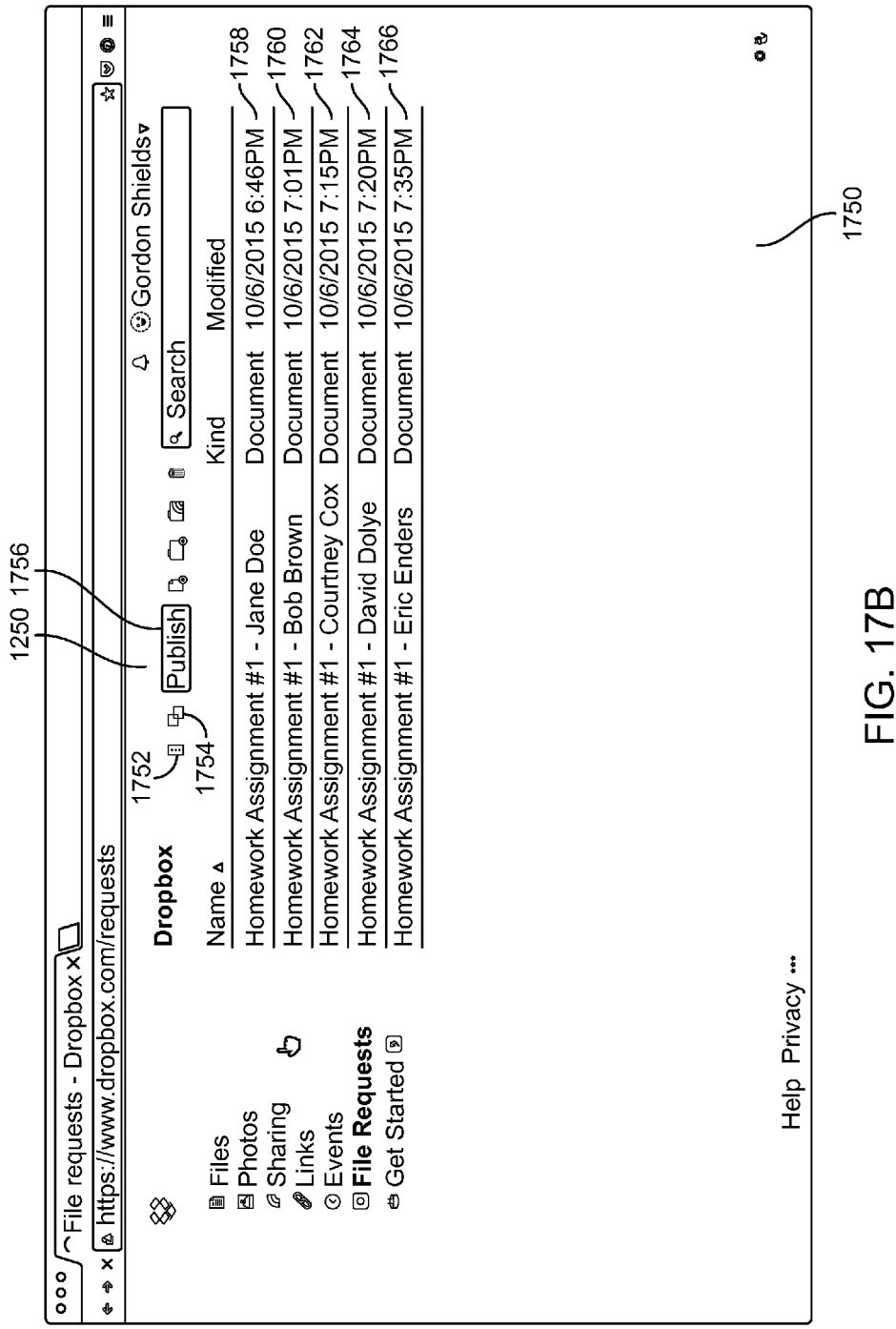
FIG. 17B is a UI with a rendered publish menu option in accordance with an exemplary embodiment.
Figure 17C:
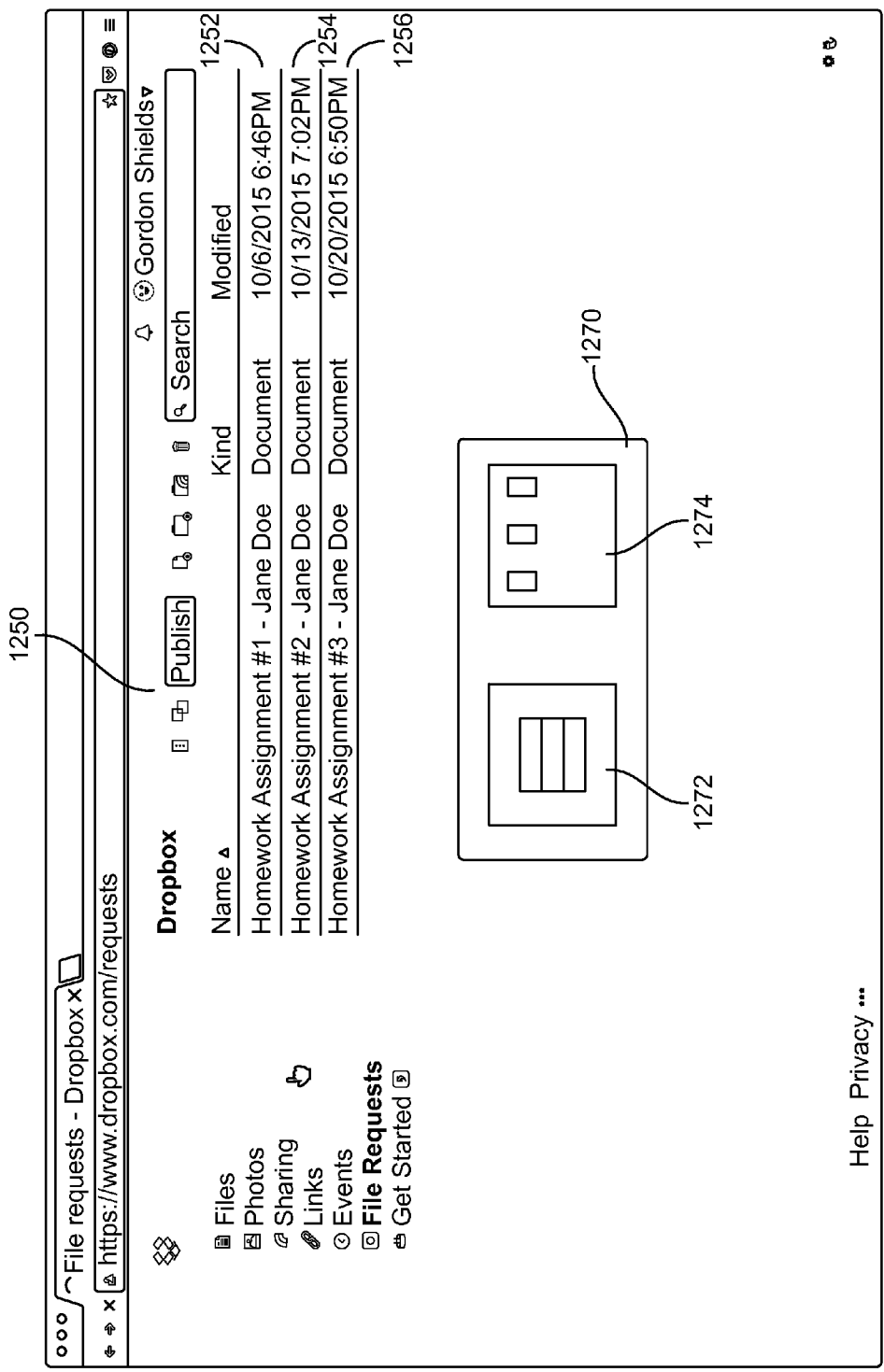
FIG. 17C is a UI rendering layout menu options in accordance with an exemplary embodiment.

At 1704, receive a format menu option and format the content. For example, UI module 122 and/or content item management module 128 receives a selection of formatting icon 1752, 1754 to format the contents of collection folder 1750 as shown in FIG. 17B. By selecting ordering formatting icon 1752, the contents of the collection folder can be organized by submitters, modification date, alphabetically, etc., as known in the art. By selecting template layout icon 1754, the collector can organize the contents based on a template layout. For example, UI module 122 and/or content item management module 128 collector can cause a rendering of layout menu 1270 on the collector's client device 102$_i$ allowing the collector select a template layout from one of the displayed template layouts shown in FIG. 17C. As shown, in this example, the collector can choose between list template layout 1272 and spread template layout 1274 displayed in option menu 1270. The template layouts can be based on the file types of the files in the collection folder. For example, for image files, the collector can choose from different album template layouts. After formatting the contents, method 1700 can proceed to block 1706.

Figure 17D:
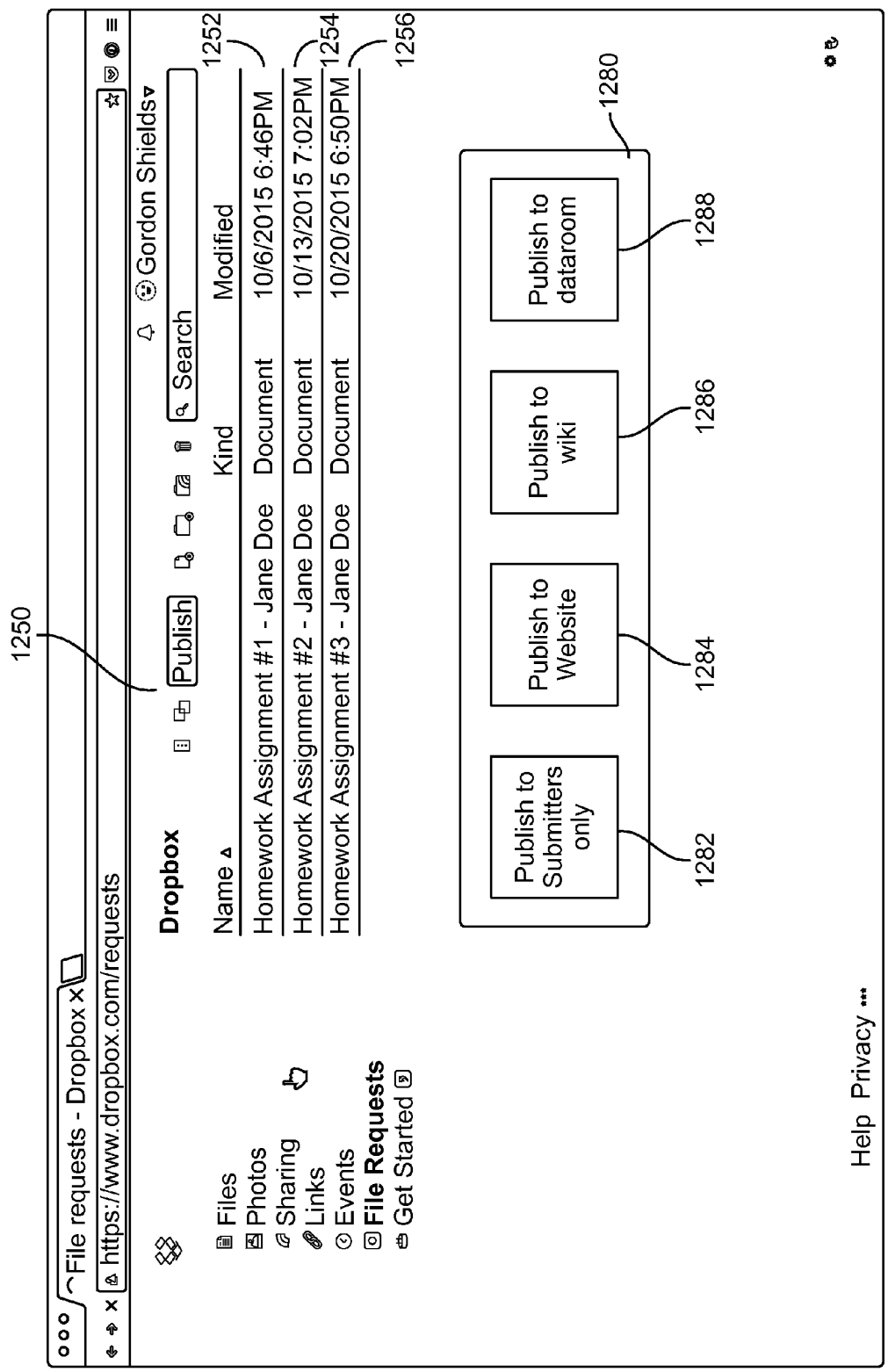
FIG. 17D is a UI rendering publishing menu options in accordance with an exemplary embodiment.

At block 1706, receive a publish menu option. For example, UI module 122 and/or content item management module 128 receives a selection of publishing icon 1756 and causes the rendering of publishing menu 1280 on the collector's client device 102$_i$ allowing the collector to select a publishing option from the publishing options shown in FIG. 17D. The publish to submitters only menu option 1282 allows all of the submitters access to all of the submitted files in the collection folder. The publish to website menu option 1284 allows the collector to enter a website to which to publish the collection folder. The publish to wiki menu option 1286 allows the collector to enter a wiki to which to publish the collection folder. The publish to dataroom menu option 1288 allows the collector to publish the collection folder and only allow users who have access rights and/or a password to access the collection folder. After receiving a publishing menu option, method 1700 can proceed to block 1708.

At block 1708, publish the collection folder in accordance with the selected menu option. For example, UI module 122 and/or content item management module 128 changes the access rights to the folder in accordance with the selected publishing menu option. After publishing the collection folder, method 1700 can proceed to block 1710.

At block 1710, send an email message to the submitters. For example, UI module 122 and/or email module 140 sends an email message to the submitters notifying them of the publication of the collection folder.

Public File Request

In one or more embodiments, a collector can make a file request a public file request. In one or more embodiments, the file request link can be discoverable via a publically discoverable share link, such as a vanity link, e.g., www/dropbox.com/filerequest/public/gideon. In one or more embodiments, a file request link can be made publically discoverable by changing the destination of the file request. For example, by selecting change destination box 706 in FIG. 7A, the collector can make the destination address public by changing the destination address from "/Requests/Final papers" to "/Requests/public/Final papers".

In one or more embodiments, the social media network can include a file request widget on a user interface to facilitate the submission of one or more files to a collection folder. The file request widget may be used to facilitate the submission of one or more particular files that are associated with the widget directly to a collection folder in content management system 106, such as a synchronized or non-synchronized cloud-based content management system. As a result, the collector is able to use the widget to have a file request link generated and inserted into a user interface of a website, such as a social networking website. For example, by clicking on a file request widget icon, the social network can communicate with content management system 106 to obtain a file request link, which can be inserted into the user interface, such as a Facebook posting or a Twitter tweet. The file request link can be inserted as hypertext and provide access to a collection folder which is created for the user and associated with an account associated with the user who elected to create the collection folder. When a user/submitter selects the file request link or hypertext, the user/submitter is able to upload a file into the associated collection folder with the submitters being unable to access files uploaded by other submitters. For example, a company, such as Dropbox, can a post a contest on their home page or post a message via social networking that recites, "Win one free month of storage on Dropbox by submitting the funniest picture showing the Dropbox logo. Click here to submit your picture. Contest ends Nov. 21, 2015." The "here" can be a hypertext to a collection folder. In various embodiments, the file request widget may include a user interface element (e.g., a button, dialog box, or menu bar) that allows a user to select and/or initiate the request for content download of one or more content items by using the file request widget. The file download widget may be implemented, for example, by pasting a small piece of HTML code into the HTML code of a particular website. The code may be provided by, content management system 106. More specifically, link management module 208 can be used to create the collection folder and direct content items to be downloaded to the collection folder.

Figure 18A:
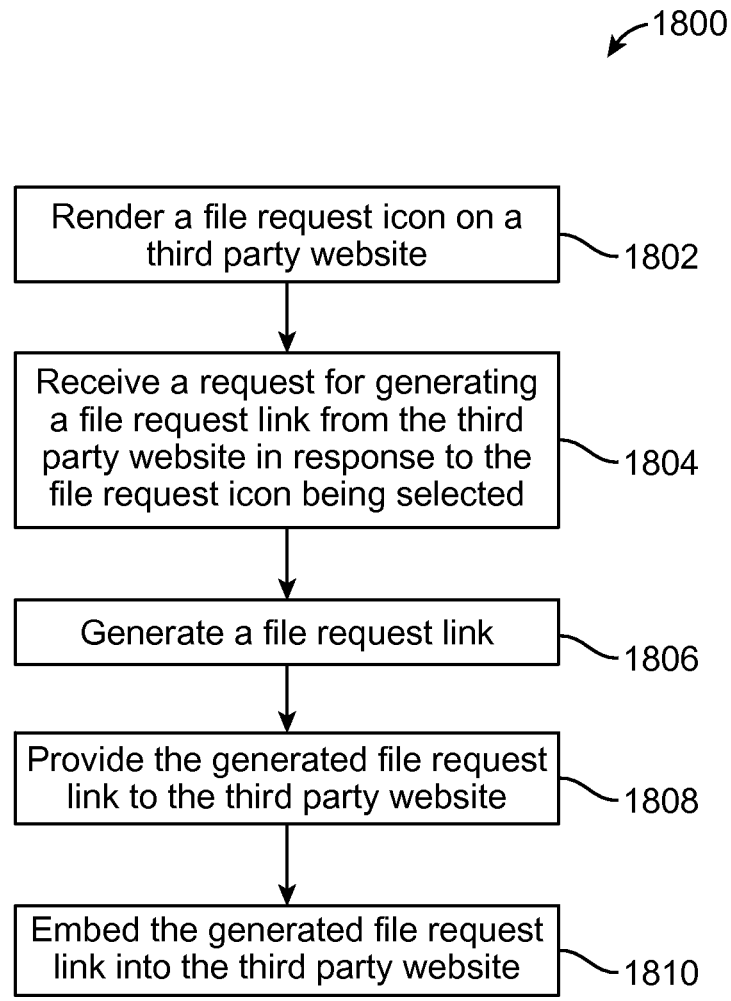
FIG. 18A is a flowchart for a method for managing collection folders in accordance with an exemplary embodiment.

Referring to FIG. 18A, a flowchart for a method for managing collection folders in accordance with an exemplary embodiment is illustrated. Exemplary method 1000 is provided by way of example, as there are a variety of ways to carry out the method. Method 1800 described below can be carried out using the configurations illustrated in FIGS. 1 and 2A by way of example, and various elements of these figures are referenced in explaining exemplary method 1800. Each block shown in FIG. 18A represents one or more processes, methods or subroutines, carried out in exemplary method 1800. Exemplary method 1800 can begin at block 1802.

Figure 18B:
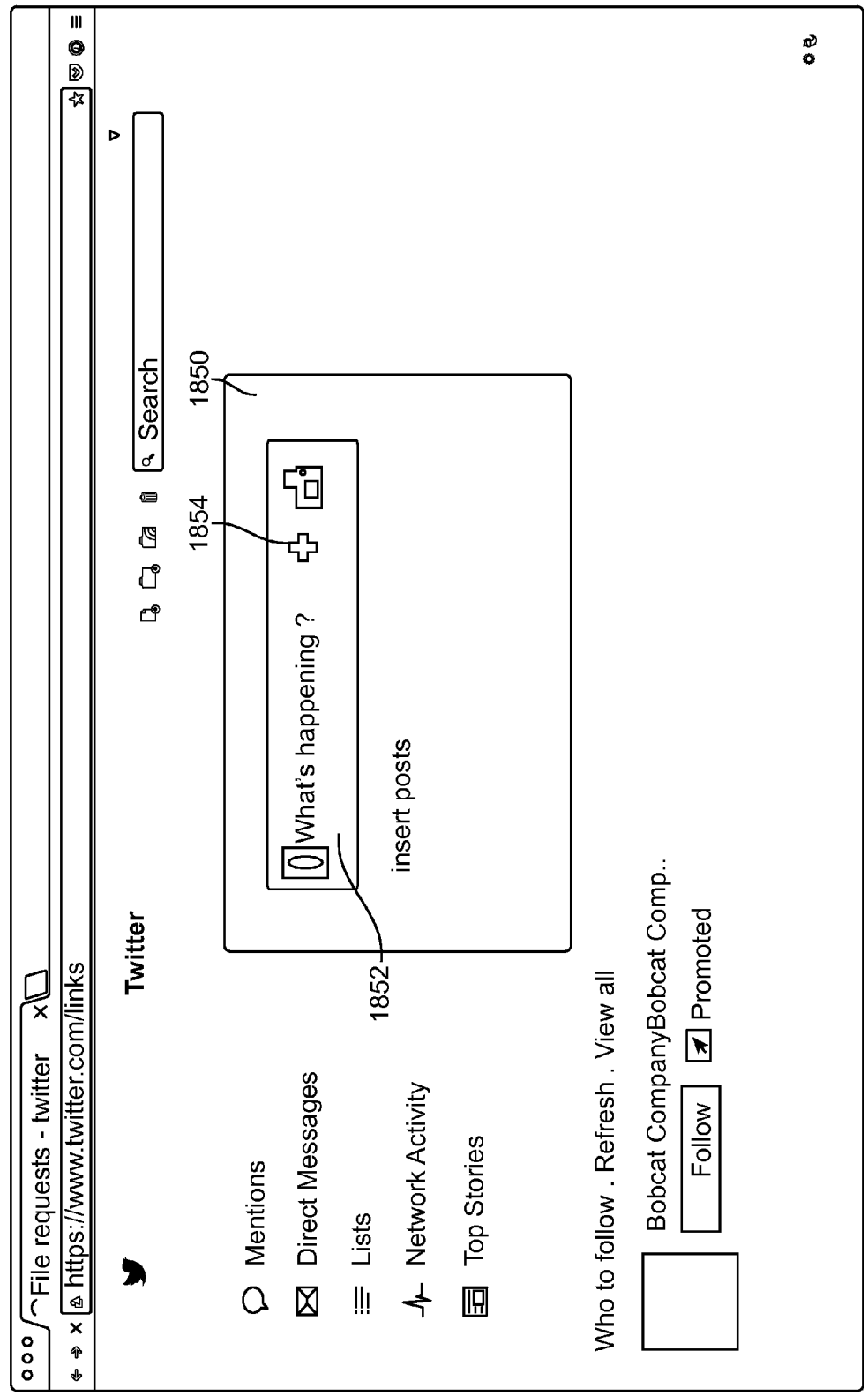
FIG. 18B is a third party website rendering a file request icon in accordance with an exemplary embodiment.

At block 1802, render a file request icon on a third party website. For example, widget software from content management system 106 is provided to a third party website where the widget software displays the file request icon on the third party website. The third party website is a website that is not operated by content management system 106, such as a social networking website. FIG. 18B shows an exemplary third party website 1850, e.g., Twitter®, with file request icon 1854 displayed in text box 1852. After rendering the file request icon on a third party website, method 1800 can proceed to block 1804.

At block 1804, receive a request for generating a file request link from the third party website in response to the file request icon being selected. For example, link generation module 205 receives a request for generating a file request link from the third party website. The request can be generated by a user of the third party website selecting displayed file request icon 1854. After receiving the request, method 1800 can proceed to block 1806.

At block 1806, generate a file request link. For example, link generation module 202 generates a file request link. After generating a file request link, method 1800 can proceed to block 1808.

At block 1808, provide the generated file request link to the third party website. For example, link distribution module 206 provides the generated file request link to the third party website. After providing the generated file request to the third party website, method 1800 can proceed to block 1810.

At block 1810, embed the generated file request link into the third party website. For example, the widget software embeds the generated file request into the third party website. The generated file request can be displayed and/or displayed as hypertext, such as "Click here to submit a file" with "here" being the embedded generated file request link as hypertext. After embedding the generated file request link into the third party website, method 1800 can proceed to block 318 in FIG. 3.

Managing Collection Folders

Figure 19A:
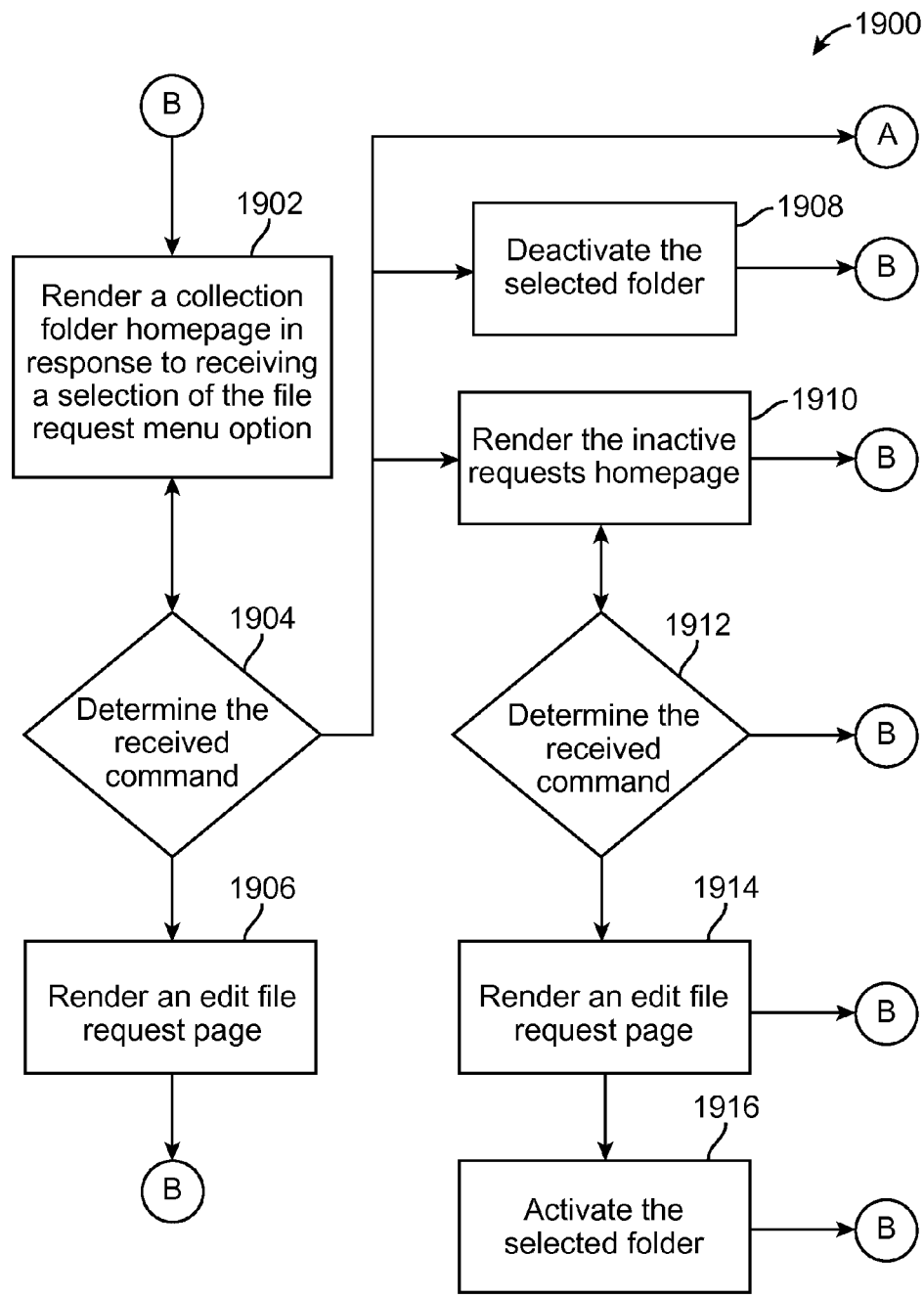
FIG. 19A is a flowchart for a method for managing collection folders in accordance with an exemplary embodiment.

Referring to FIG. 19A, a flowchart for a method for managing collection folders in accordance with an exemplary embodiment is illustrated. Exemplary method 1900 is provided by way of example, as there are a variety of ways to carry out the method. Method 1900 described below can be carried out using the configurations illustrated in FIGS. 1 and 2A by way of example, and various elements of these figures are referenced in explaining exemplary method 1900. Each block shown in FIG. 19A represents one or more processes, methods or subroutines, carried out in exemplary method 1900. Exemplary method 1900 can begin at block 1902.

Figure 19B:
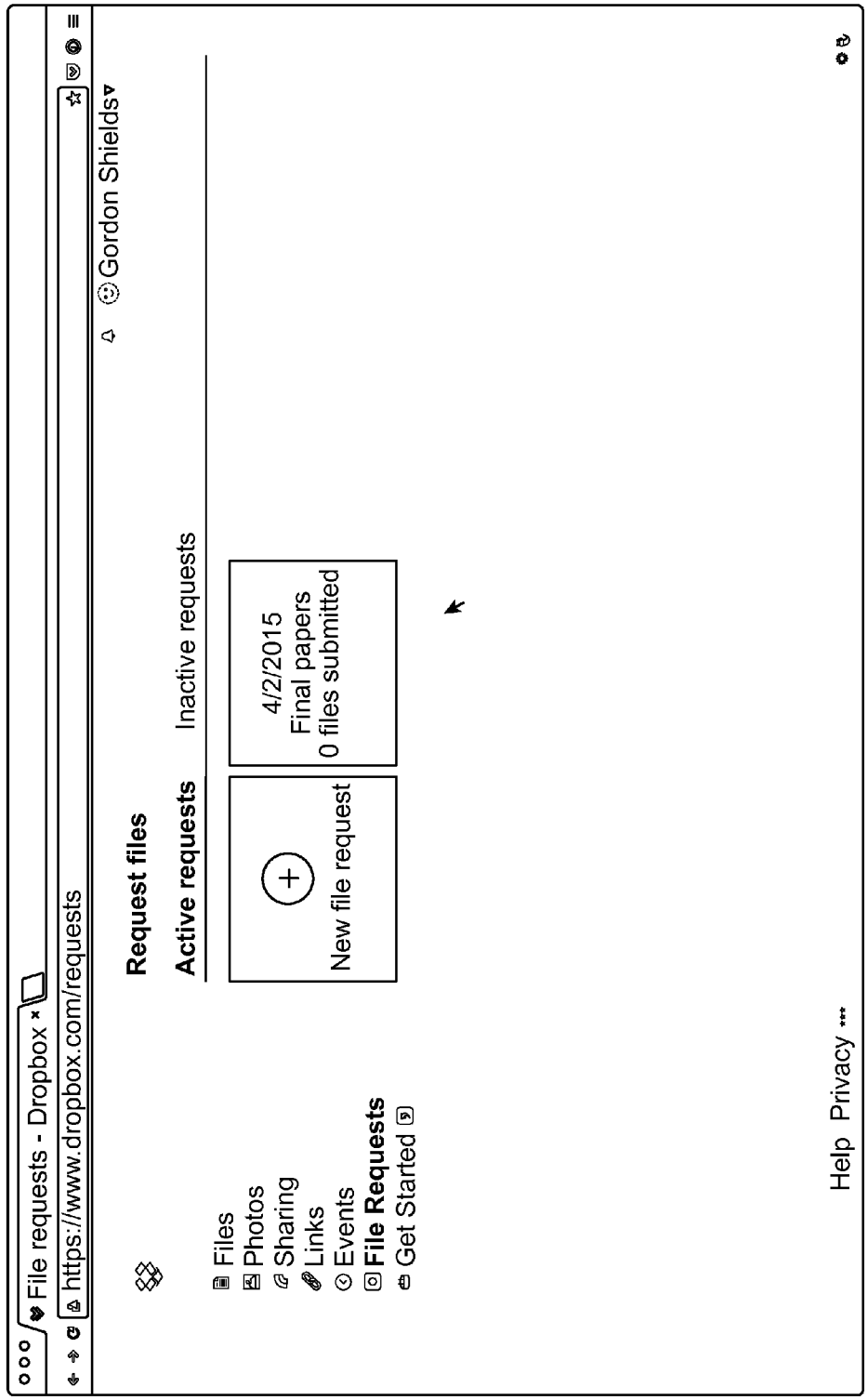
FIG. 19B is a collection folder homepage in accordance with an exemplary embodiment.

At block 1902, render a collection folder homepage in response to receiving a selection of the file request menu option. For example, UI module 122 receives a selection of the file requests menu option shown in FIG. 4B and causes the collection folder homepage to be rendered on the collector's client device 102$_i$. FIG. 19B shows an exemplary collection folder homepage. As shown, the collection folder homepage shows the collection folders in the active requests and a button for creating a new file request. In this example, the active collector has one collection folder: the Final papers collection folder having a date of Apr. 2, 2015 with "0" files submitted. After rendering the collection folder homepage, method 1900 can proceed to block 1904.

Figure 19C:
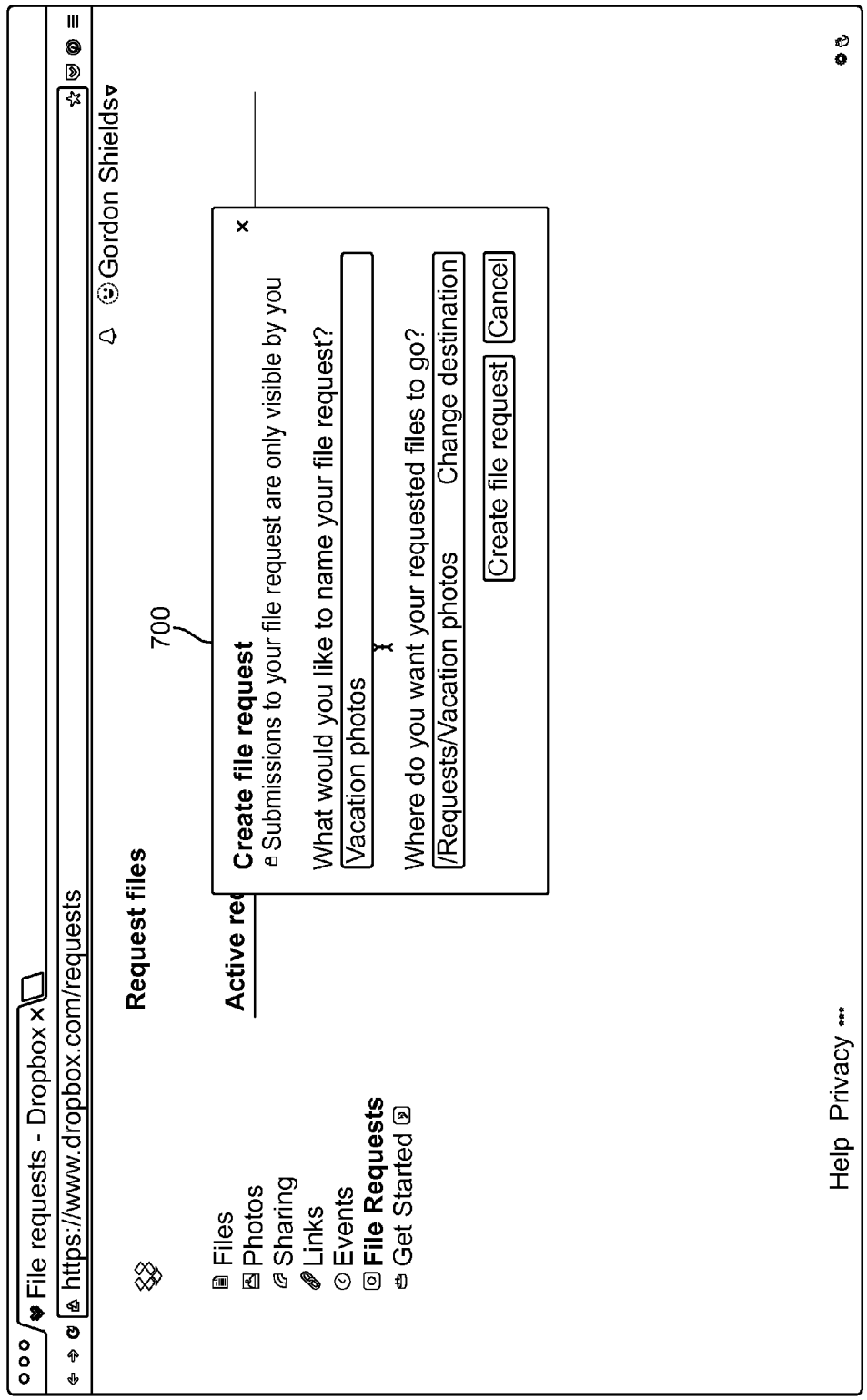
FIG. 19C is a first submission page for generating a vacation photos collection folder in accordance with an exemplary embodiment.
Figure 19D:
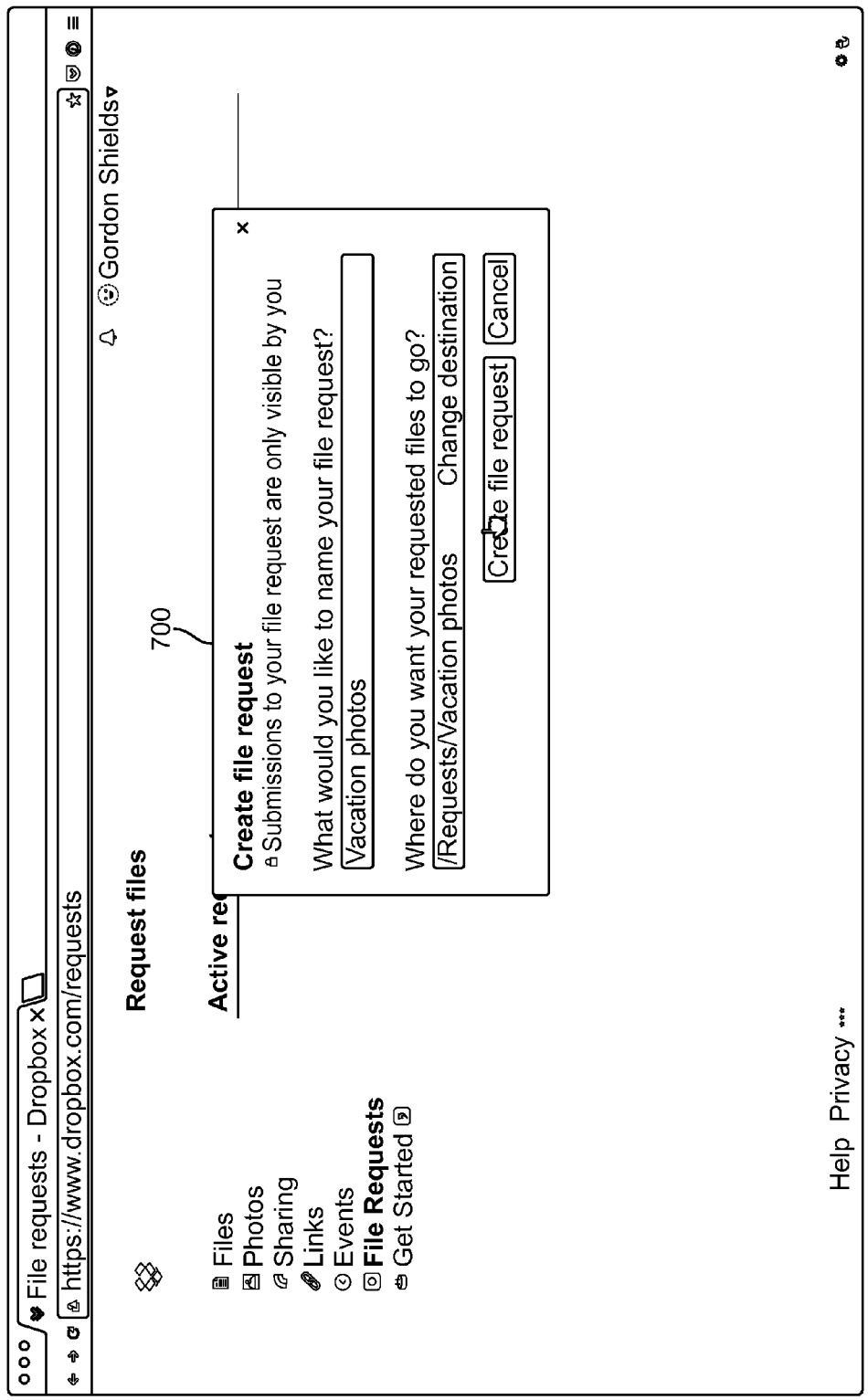
FIG. 19D is a second submission pages for generating a vacation photos collection folder in accordance with an exemplary embodiment.
Figure 19E:
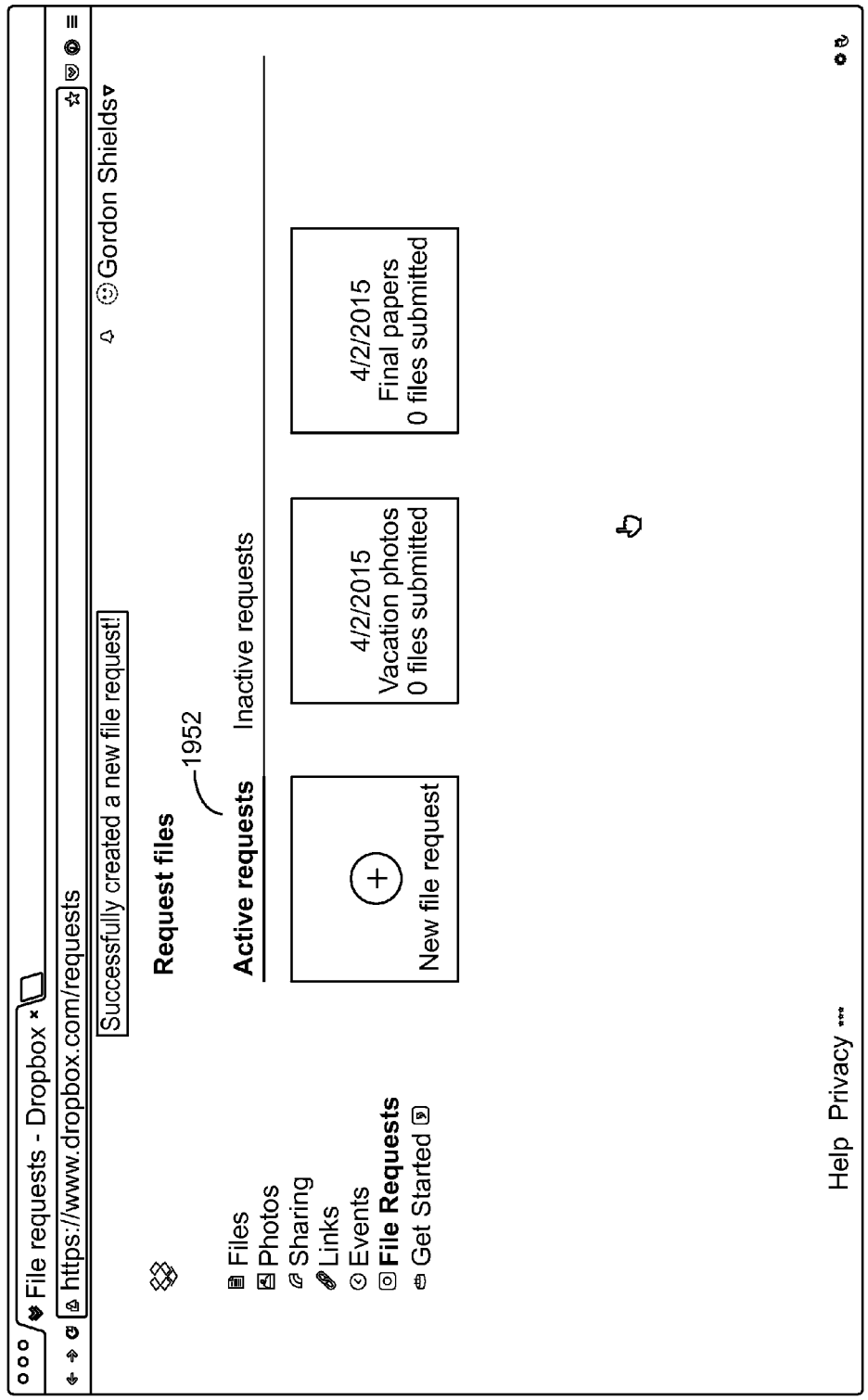
FIG. 19E is a collection folder homepage after the vacation photos collection folder is created in accordance with an exemplary embodiment.
Figure 19F:
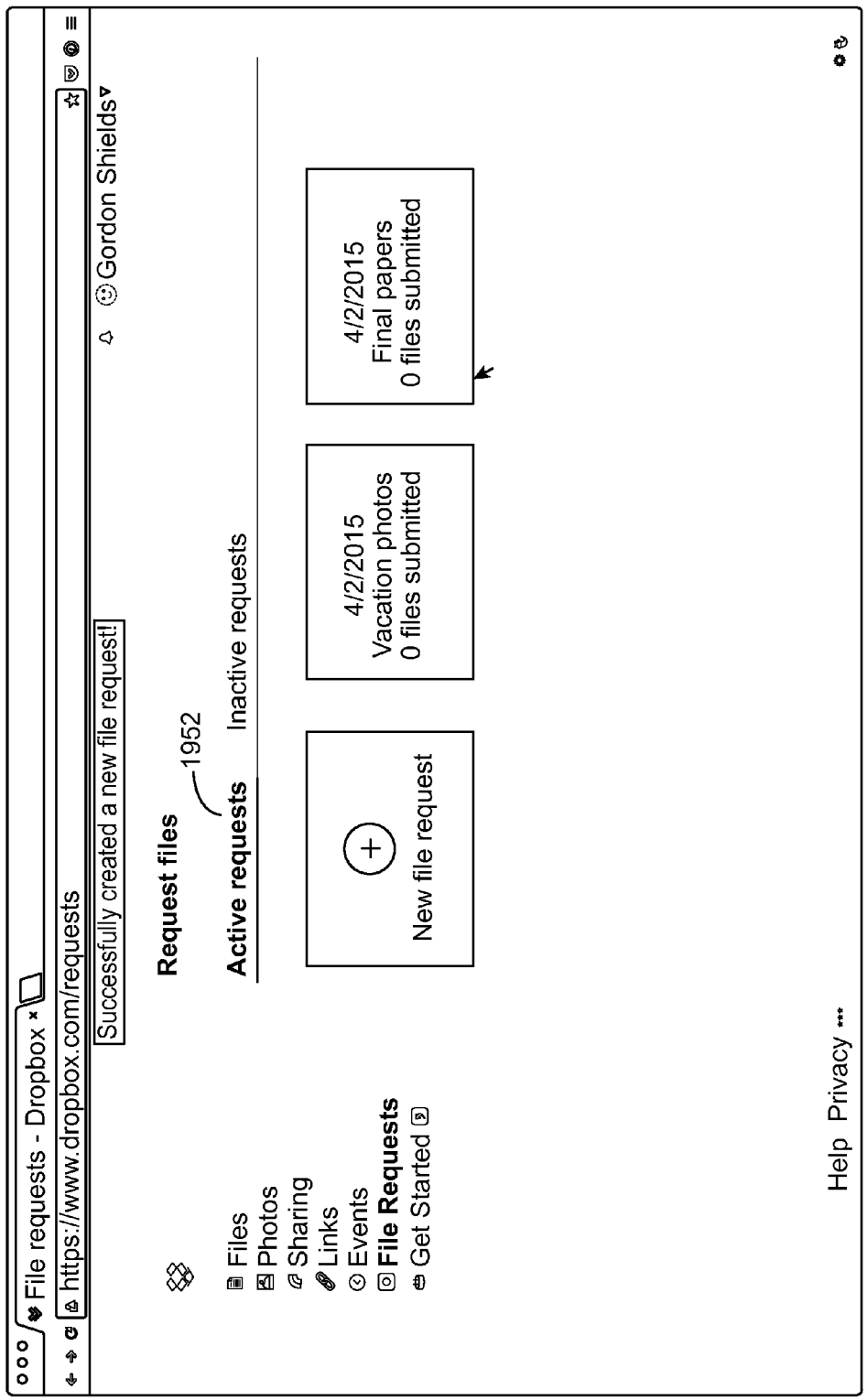
FIG. 19F is a Final papers collection folder being selected in accordance with an exemplary embodiment.

At block 1904, determine a received command. For example, UI module 122 receives a command in response to the new file request, active requests, inactive requests, a collection folder or a side menu option being selected. In response to the command being for a new file request, the method can proceed to block 306 of method 300 where the collector can generate a new collection folder. FIG. 19C is an initial UI 700 of a first submission page for generating a vacation photos collection folder. In FIG. 19C, the prompts are "What would like to name your file Request?" and "Where do you want your requested files to go?" The exemplary answers are "vacation photos" and "/Requests/Vacation photos," respectively. FIG. 19D is an initial UI 700 of a first submission page with the "create file request" button being selection. After creating a new collection folder, method 1900 returns to block 1902. FIG. 19E shows file listing UI 1952 of the collection folder homepage after the vacation photos collection folder is created. The folders are "Vacation photos" and "Final papers." In response to the command being for the active requests, method 1900 can proceed to block 1902 where the collection folder homepage is again rendered on the collector's client device 102$_i$. In response to the command being the selection of a collection folder, method 1900 can proceed to block 1906. FIG. 19F shows the file listing UI 1952 of the Final papers collection folder being selected. In response to the command being for the inactive requests, method 1900 can proceed to block 1910. In response to the inactive file being selected, a side menu is rendered and a menu option from the side menu being selected, method 1900 proceeds to execute the selected menu option.

Figure 19G:
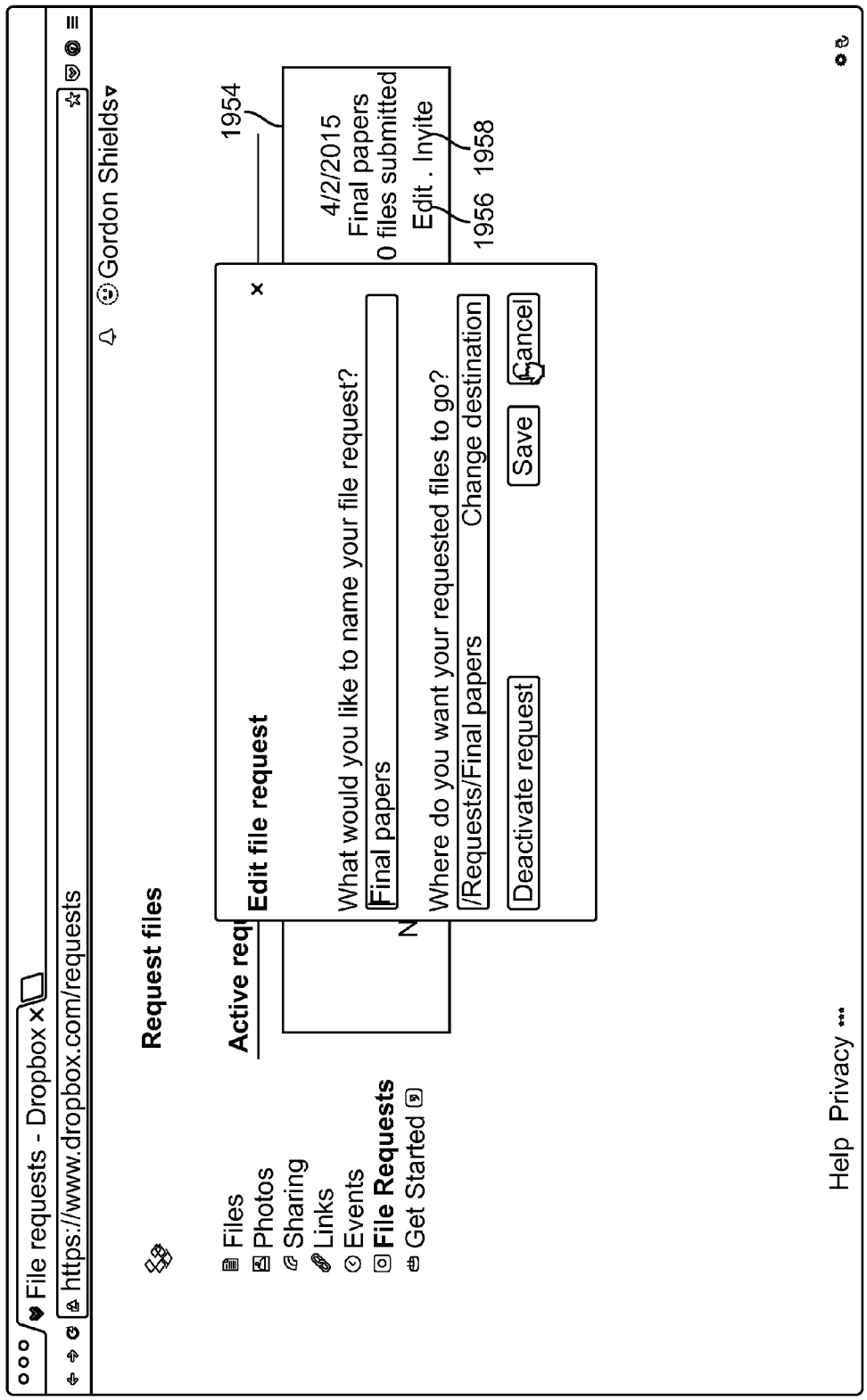
FIG. 19G is an edit file request page that allows a collector to deactivate a collection folder in accordance with an exemplary embodiment.

At block 1906, an edit file request page is rendered. For example, UI module 122 causes the edit file request page to be rendered on the collector's client device 102$_i$. As shown in FIG. 19G, the edit file request page allows the collector to change the name of the collection folder, change the location for the collection folder and to deactivate the collection folder. If the name of the file request is changed or the location where the files go changes, the collector can select the save button and the changes are saved and method 1900 can proceed to block 1902. If the collector selects the cancel button, the command is canceled and method 1900 can proceed to block 1902. If the collector selects the deactivate request button, the method 1900 can proceed to block 1908.

Figure 19H:
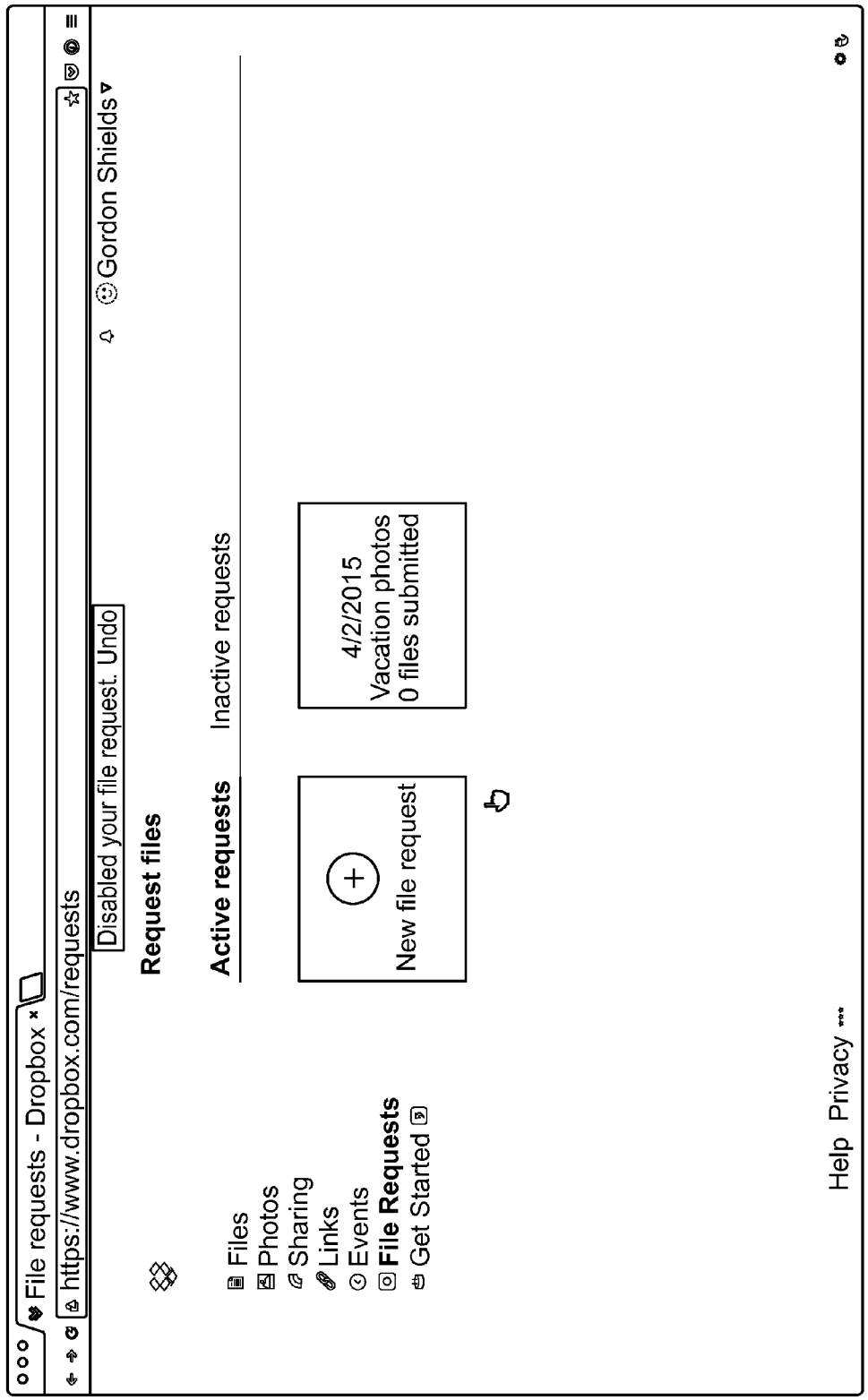
FIG. 19H is a collection folder homepage after a Final papers collection folder is deactivated in accordance with an exemplary embodiment.

At block 1908, the selected folder is deactivated. For example, file access module 204 deactivates the selected folder. A deactivated collection folder prohibits a submitter from uploading files to the deactivated collection folder. After deactivating the folder, method 1900 can proceed to block 1902. FIG. 19H shows a collection folder homepage UI after the Final papers collection folder is deactivated with only the Vacation photos collection folder being in the active request collection folder.

Figure 19I:
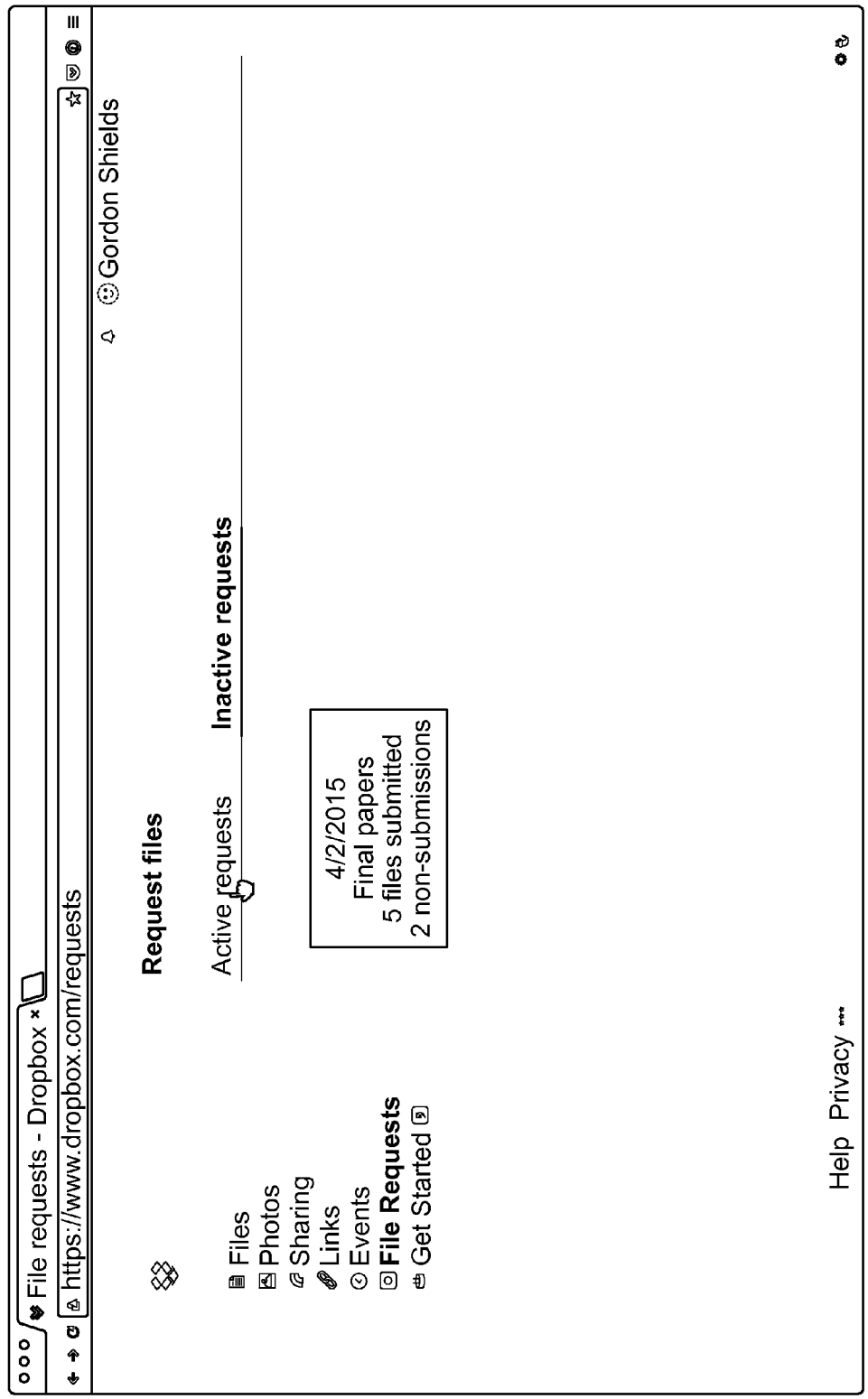
FIG. 19I is an inactive requests home page in accordance with an exemplary embodiment.

At block 1910, render the inactive requests home page. For example, UI module 122 causes the rendering of the inactive requests home page on the collector's client device 102$_i$. FIG. 19I shows an inactive requests home page UI with the Final papers collection folder being displayed. After rendering the inactive requests home page, method 1900 can proceed to block 1912.

At block 1912, determine the received command. For example, the UI module 122 receives a command in response to the active requests, inactive requests, a collection folder or a side menu option being selected. In response to the command being for the active requests, method 1900 can proceed to block 1902 where the collection folder home page is rendered. In response to the command being the selection of a collection folder, method 1900 can proceed to block 1914. In response to the command being for the inactive requests, method 1900 can proceed to block 1910. In response to a menu option from the side menu is selected, method 1900 proceeds to execute the selected menu option.

Figure 19J:
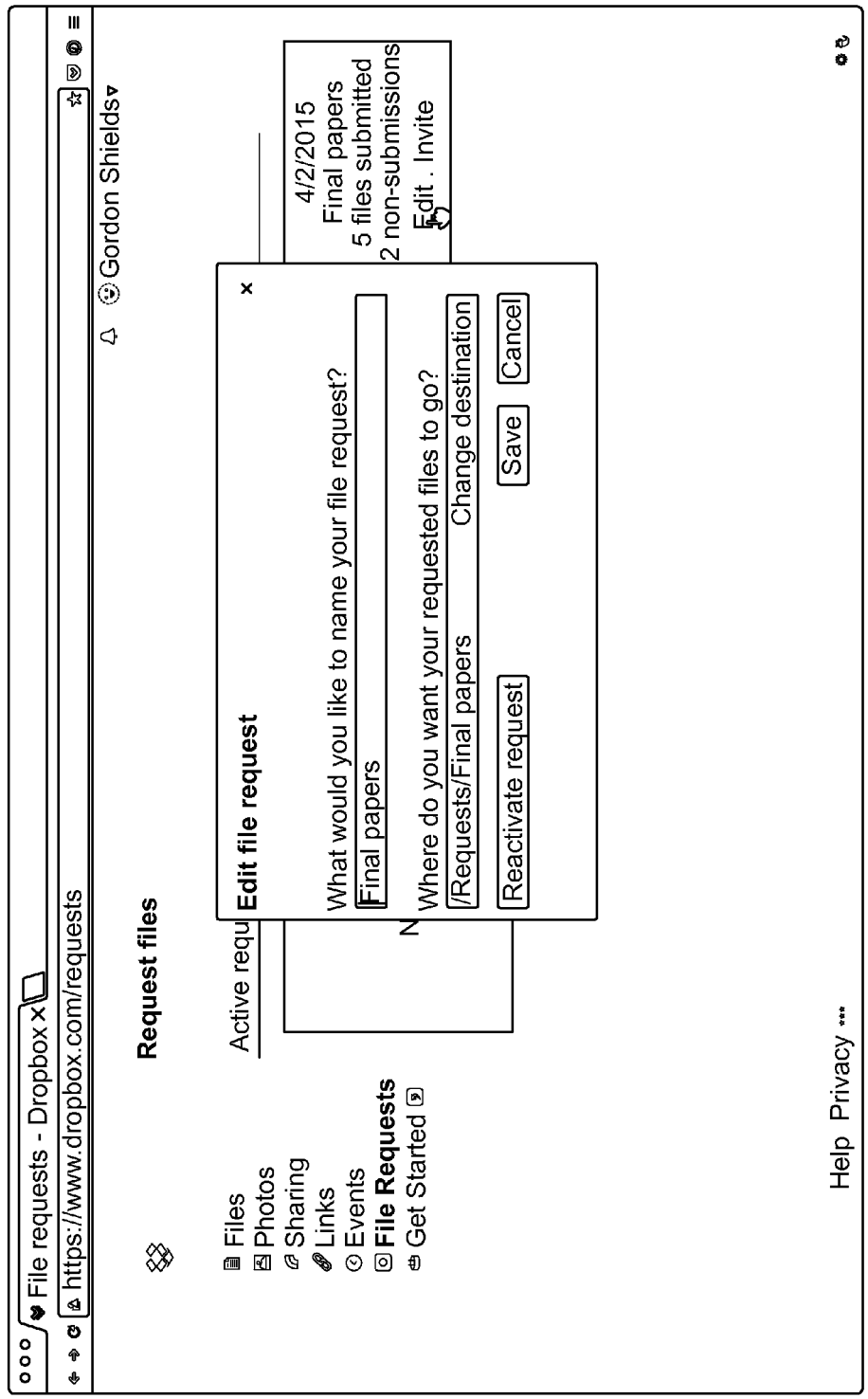
FIG. 19J is an edit file request page that allows a collector to activate a collection folder in accordance with an exemplary embodiment.

At block 1914, render an edit file request page. For example, UI module 122 causes the edit file request page to be rendered on the collector's client device 102$_i$. As shown in FIG. 19J, the edit file request page allows the collector to change the name of the collection folder, change the location for the collection folder and to activate the collection folder. If the name of the file request is changed or the location where the files go changes, the collector can select the save button and the changes are saved and method 1900 can proceed to block 1902. If the collector selects the cancel button, the command is canceled and method 1900 can proceed to block 1902. If the collector selects reactivate request button, method 1900 can proceed to block 1916.

At block 1916, activate the selected folder. For example, file access module 204 reactivates the selected folder. A reactivated collection folder allows a submitter to upload files to the activated collection folder. After reactivating the folder, method 1900 can proceed to block 1002. FIG. 19E shows a collection folder homepage UI after the Final papers collection folder is reactivated.

Administrative Controls and Dashboards

In one or more embodiments, administrative controls can be employed. For a company using the content management system on an enterprise level, e.g., Dropbox Business, the company can have administrative controls. The administrative controls can include, but are not limited to, reviewing an activity log, view collection folders, be notified when a submission is made to a collection folder, be notified when a collection folder is published, control who creates collection folders/file requests, control who can review collection folders and control whether submitters need to be members of the enterprise. An administrator can access an activity log, which can record the number of file requests, the number of collection folders, who created the file requests, who has submitted a content item to a collection folder and create reports. Referring to FIG. 20B, a UI rendering an activity log in accordance with an exemplary embodiment is illustrated. The administrator can review collection folders. For example, an administrator can select a rendered collection folder displayed in the activity log to view the contents of a collection folder. The administrator can receive a notification, such as an email message, in response to a submitter submitting a content item to a collection folder. The administrator can view a list of people who have access to the enterprise and control each users rights, e.g., the ability to create a file request/collection folder, the ability to control who can receive a file request, who can customize a file request and/or any other privilege that the users in the enterprise can do with respect to the collection folders. The administrator can control whether a submitter has to be a member of the enterprise to submit a content item.

Figure 20A:
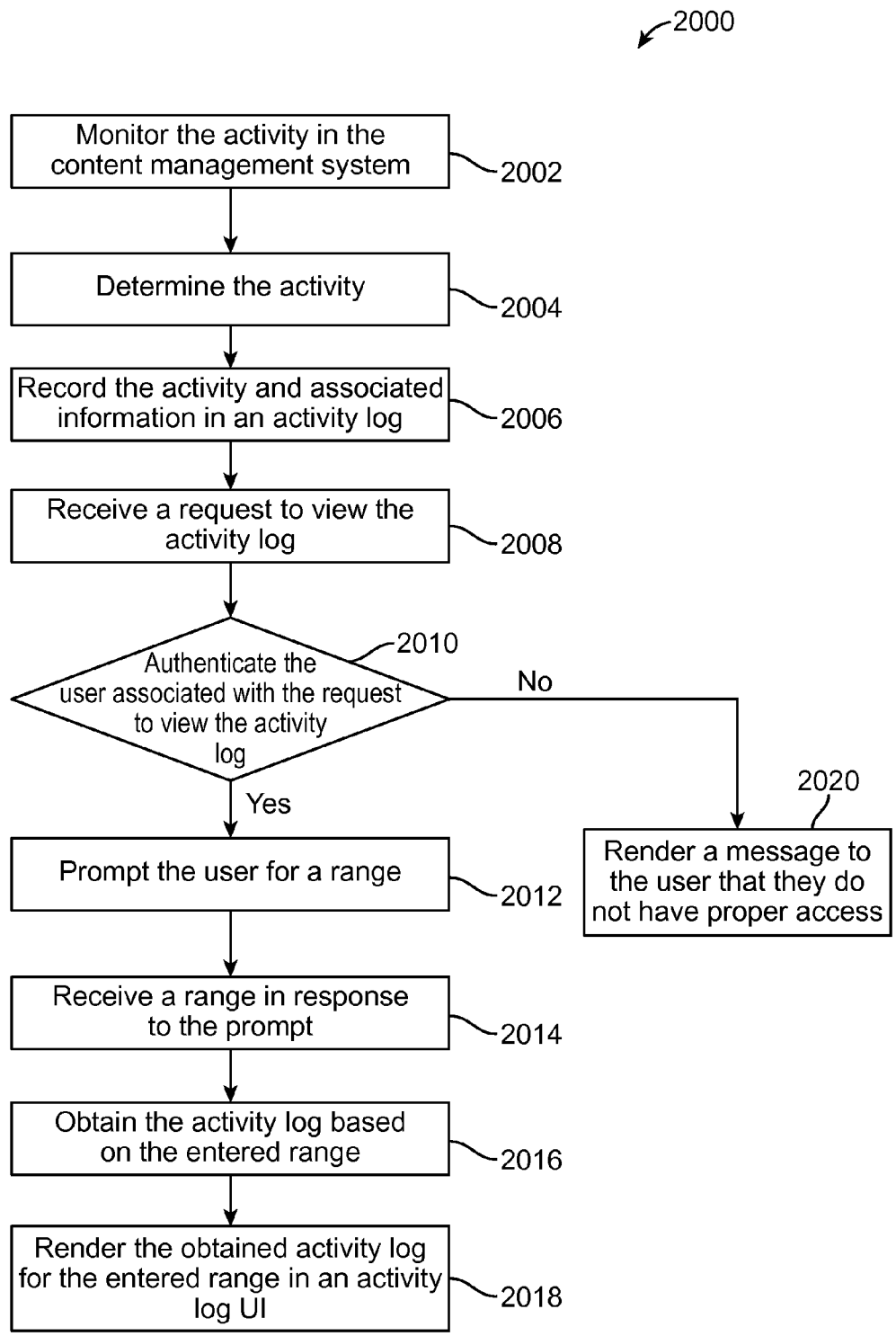
FIG. 20A is a flowchart for a method for generating an activity log in accordance with an exemplary embodiment.

Referring to FIG. 20A, a flowchart for a method for generating an activity log in accordance with an exemplary embodiment is illustrated. Exemplary method 2000 is provided by way of example, as there are a variety of ways to carry out the method. Method 2000 described below can be carried out using the configurations illustrated in FIGS. 1 and 2A by way of example, and various elements of these figures are referenced in explaining exemplary method 2000. Each block shown in FIG. 20A represents one or more processes, methods or subroutines, carried out in exemplary method 2000. Exemplary method 2000 can begin at block 2002.

At block 2002, monitor the activity in the content management system for activity. For example, analytics module 134 monitors activity associated with an enterprise account within the content management system 106f. In response to detecting an activity, the method 2000 can proceed to block 2004.

At block 2004, determine the activity. For example, analytics module 134 determines the activity associated with the enterprise account. For example, the activity can be accessing a folder, generating a collection folder, reactivating an inactive file request, deactivating an active file request, receiving a submission to a collection folder, receiving an overwrite in a collection folder, reaching a deadline in a collection folder, publishing a collection folder, detecting an improper submission (e.g., a user is not authenticated), receiving a submission with malicious code, detecting plagiarism, etc. After determining the activity method 2000 can proceed to block 2006.

At block 2006, record the activity and associated information in an activity log. For example, analytics module 134 records the activity and associated information in an activity log. The associated information can include the activity, a timestamp for the activity, a user associated with the activity, user's role, etc. After recording the activity, method 2000 can proceed to block 2008.

At block 2008, receive a request to view the activity log. For example, analytics module 134 receives a request to view the activity log. After receiving the request, method 2000 can proceed to block 2010.

At block 2010, authenticate the user associated with the request to view the activity log. For example, authenticator module 126 authenticates the user associated with the request. The authentication can require the user to log into the requester's user account or can be based on a cookie stored on the requester's client device 102$_i$. If the user is authenticated, method 2000 can proceed to block 2012. If the user is not authenticated, method 2000 can proceed to block 2020.

At block 2012, prompt the user for a range. For example, the analytics module 134 prompts the user to enter a range, which can be for a time period or a set number of entries. This can be done via a rendered menu. After rendering the prompt, method 2000 can proceed to block 2014.

At block 2014, receive a range in response to the prompt. For example, analytics module 134 receives a time frame or a set number of entries in response to the prompt. After receiving the range, method 2000 can proceed to block 2016.

At block 2016, obtain the activity log based on the entered range. For example, analytics module 134 obtains the activity log entries based on a set number of entries. After obtaining the activity log for the entered range, method 2000 can proceed to block 2018.

At block 2018, render the obtained activity log for the entered range in an activity log UI. For example, UI module 122 renders the obtained activity log on the requester's client device 102$_i$ in activity log UI 2050 as shown in FIG. 20B. As shown, the activity log UI 2050 shows the last ten entries along with the associated information. The associated information includes location, the user associated with the activity, the activity and a timestamp.

At block 2020, render a message to the user that they do not have proper access. For example, UI module 122 can cause the rendering of a message UI informing the user that the user did not enter proper credentials.

Figure 21A:
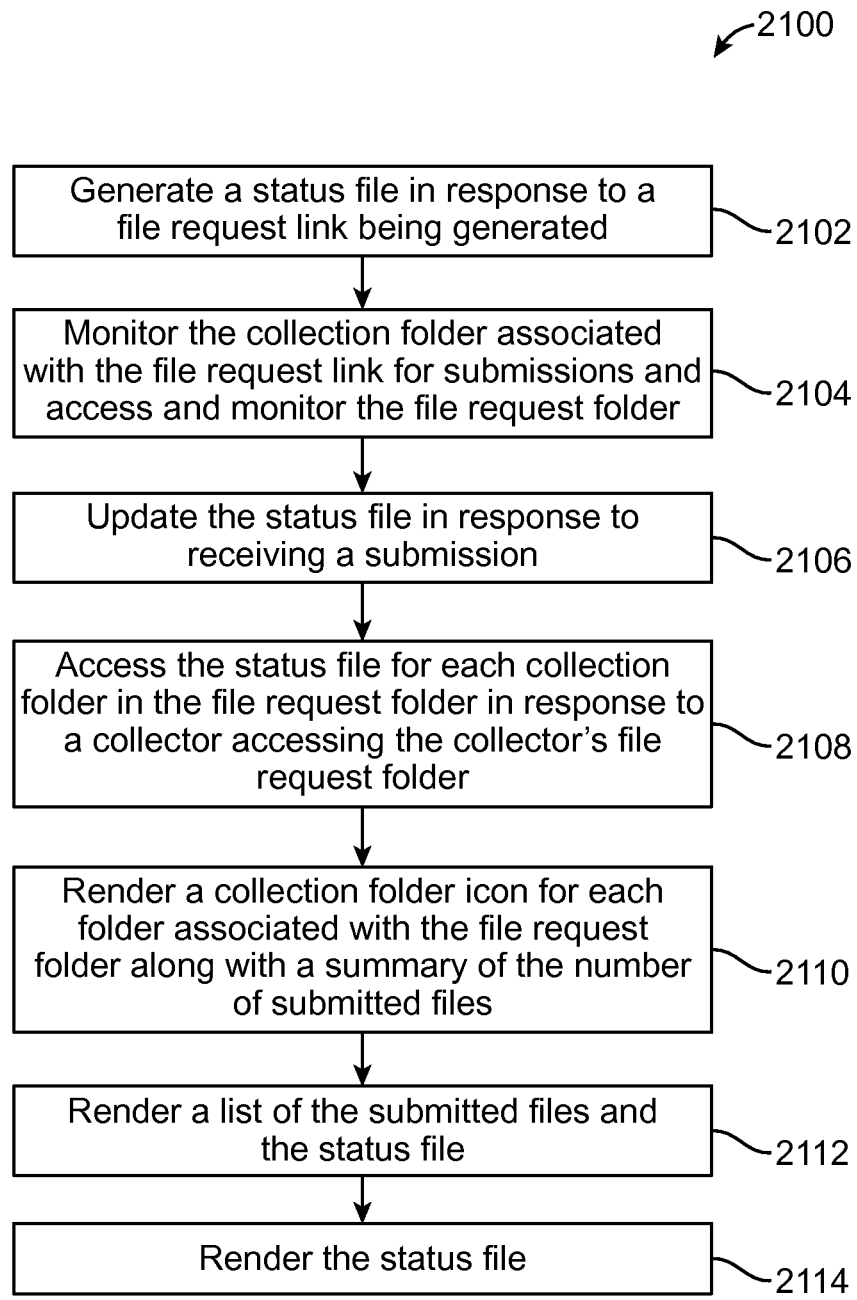
FIG. 21A is a flowchart for a method for generating an activity log in accordance with an exemplary embodiment.

In one or more embodiments, a collector can determine the status of a collection folder by accessing a status file associated with the collection folder. Referring to FIG. 21A, a flowchart for a method for generating an activity log in accordance with an exemplary embodiment is illustrated. Exemplary method 2100 is provided by way of example, as there are a variety of ways to carry out the method. Method 2100 described below can be carried out using the configurations illustrated in FIGS. 1 and 2A by way of example, and various elements of these figures are referenced in explaining exemplary method 2100. Each block shown in FIG. 21A represents one or more processes, methods or subroutines, carried out in exemplary method 2100. Exemplary method 2100 can begin at block 2102.

At block 2102, generate a status file in response to a file request link being generated. For example, analytics module 134 generates a status file in response to a file request link being generated at block 308 of FIG. 3. The status file can include a list of submitters associated with the file request and a timestamp for when the file request link was generated. The status file can be stored in the collection folder or can be associated with the collection folder. After generating the status file, method 2100 can proceed to block 2104.

At block 2104, monitor the collection folder associated with the file request link for submissions and access and monitor the file request folder. For example, analytics module 134 monitors the collection folder for submissions from one or more submitters and monitors the file request folder. In response to a submission, method 2100 can proceed to block 2106.

At block 2106, update the status file in response to receiving a submission. For example, analytics module 134 updates the status file in response to the collection folder receiving a submission. The update can include an indication of the submitter and a timestamp indicating when the submission was received. After updating the status file, method 2100 can proceed to block 2108.

At block 2108, access the status file for each collection folder in the file request folder in response to a collector accessing the collector's file request folder. For example, analytics module 134 accesses the status file for each collection folder in the file request folder in response to a collector accessing the collector's file request folder. After accessing the status file for each collection folder, method 2100 can proceed to block 2110.

At block 2110, render a collection folder icon for each folder associated with the file request folder along with a summary of the number of submitted files. For example, UI module 122 and/or analytics module 134 causes the rendering of a file icon for each collection folder in the file request folder and render the number of submitted files obtained from the status folder corresponding to the collection folder. FIG. 19I shows one active collection folder, e.g., Final papers collection folder, for Gordon Shield's user account. As shown, the status of the Final papers file request includes five submissions and two non-submissions. A non-submission refers to a submitter who has not provided a submission to the collection folder. In response to the collector selecting a rendered file icon, method 2100 can proceed to block 2112.

Figure 21B:
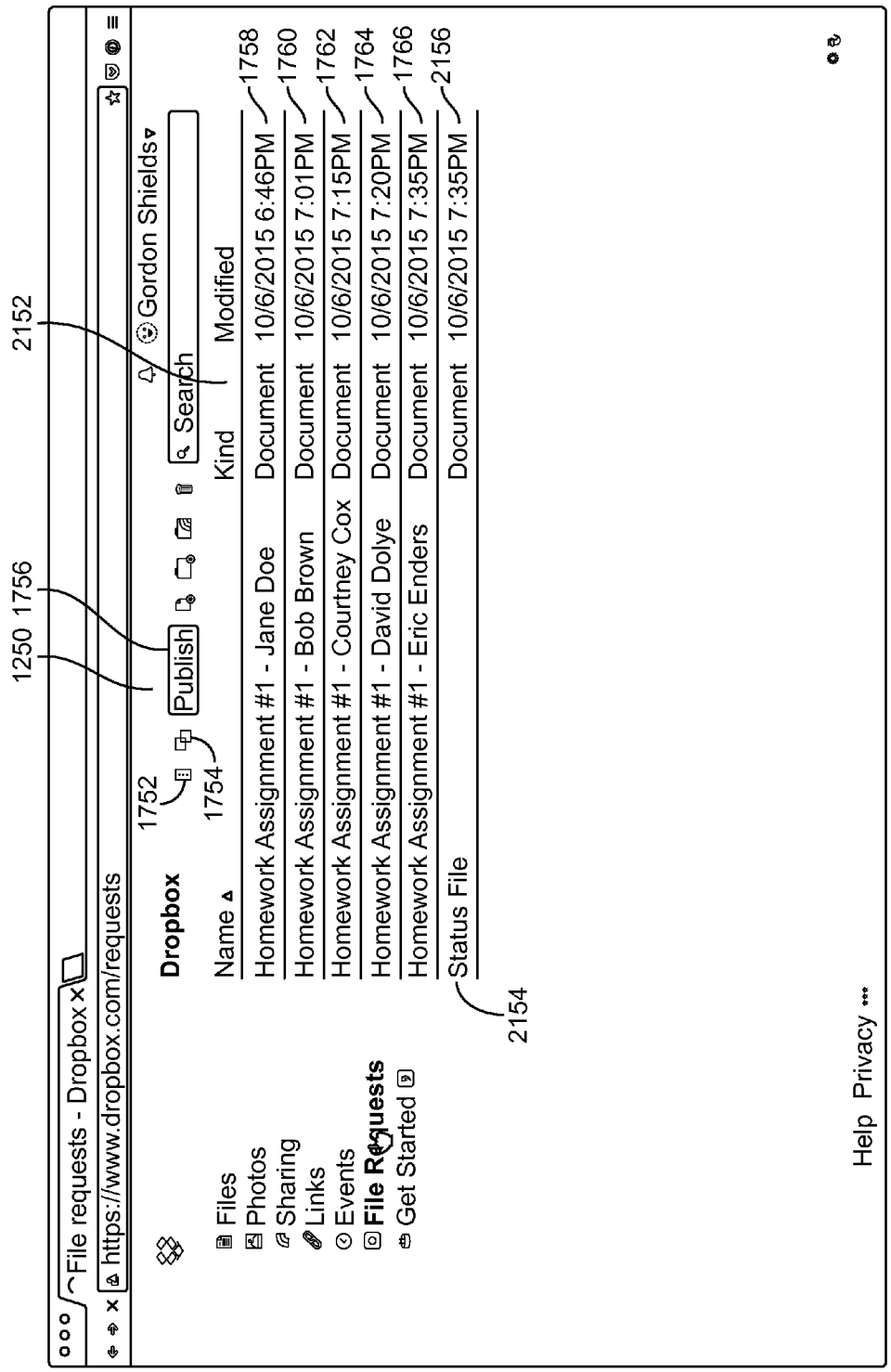
FIG. 21B is a file listing UI rendering a list of files in a folder along with a status file in accordance with an exemplary embodiment.

At block 2112, render a list of the submitted files and the status file. For example, UI module 122 and/or analytics module 134 causes the rendering of a list of files in the selected folder in a file listing UI. FIG. 21B shows file listing UI 2152 listing the files in the folder along with status file 2154. After rendering the list of submitted files and the status file, method 2100 can proceed to block 2114 in response to the collector selecting the status file.

At block 2114, render the status file. For example, UI module 122 and/or analytics module 134 causes the rendering of status file UI 2162 as shown in FIG. 21C. As shown, the status file indicates that two submitters, e.g., Frank Fava 2158 and George Geiger 2160, have not submitted files. The status file can list the submitters on top and the non-submitters below. In one or more embodiments, the submitters can be rendered in a first color and the non-submitters can be rendered in a second color. In one or more embodiments, the analytics module 134 can access an activity log and can indicate if a submitter overrode a previous submission. For example, the submitter who overrode a previous submission can be in a third color.

Exemplary System

FIGS. 22A and 22B show exemplary possible system embodiments. The more appropriate embodiment will be apparent to those of ordinary skill in the art when practicing the present technology. Persons of ordinary skill in the art will also readily appreciate that other system embodiments are possible.

FIG. 22A illustrates a conventional system bus computing system architecture 2200 wherein the components of the system are in electrical communication with each other using a bus 2205. Exemplary system 2200 includes a processing unit (CPU or processor) 2210 and a system bus 2205 that couples various system components including the system memory 2215, such as read only memory (ROM) 2220 and random access memory (RAM) 2225, to the processor 2210. The system 2200 can include a cache of high-speed memory connected directly with, in close proximity to, or integrated as part of the processor 2210. The system 2200 can copy data from the memory 2215 and/or the storage device 2230 to the cache 2212 for quick access by the processor 2210. In this way, the cache can provide a performance boost that avoids processor 2210 delays while waiting for data. These and other modules can control or be configured to control the processor 2210 to perform various actions. Other system memory 2215 may be available for use as well. The memory 2215 can include multiple different types of memory with different performance characteristics. The processor 2210 can include any general purpose processor and a hardware module or software module, such as module 1 2232, module 2 2234, and module 3 2236 stored in storage device 2230, configured to control the processor 2210 as well as a special-purpose processor where software instructions are incorporated into the actual processor design. The processor 2210 may essentially be a completely self-contained computing system, containing multiple cores or processors, a bus, memory controller, cache, etc. A multi-core processor may be symmetric or asymmetric.

To enable user interaction with the computing device 2200, an input device 2245 can represent any number of input mechanisms, such as a microphone for speech, a touch-sensitive screen for gesture or graphical input, keyboard, mouse, motion input, speech and so forth. An output device 2235 can also be one or more of a number of output mechanisms known to those of skill in the art. In some instances, multimodal systems can enable a user to provide multiple types of input to communicate with the computing device 2200. The communications interface 2240 can generally govern and manage the user input and system output. There is no restriction on operating on any particular hardware arrangement and therefore the basic features here may easily be substituted for improved hardware or firmware arrangements as they are developed.

Storage device 2230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2225, read only memory (ROM) 2220, and hybrids thereof.

The storage device 2230 can include software modules 2232, 2234, 2236 for controlling the processor 2210. Other hardware or software modules are contemplated. The storage device 2230 can be connected to the system bus 2205. In one aspect, a hardware module that performs a particular function can include the software component stored in a computer-readable medium in connection with the necessary hardware components, such as the processor 2210, bus 2205, display 2235, and so forth, to carry out the function.

FIG. 22B illustrates a computer system 2250 having a chipset architecture that can be used in executing the described method and generating and displaying a graphical user interface (GUI). Computer system 2250 is an example of computer hardware, software, and firmware that can be used to implement the disclosed technology. System 2250 can include a processor 2255, representative of any number of physically and/or logically distinct resources capable of executing software, firmware, and hardware configured to perform identified computations. Processor 2255 can communicate with a chipset 2260 that can control input to and output from processor 2255. In this example, chipset 2260 outputs information to output 2265, such as a display, and can read and write information to storage device 2270, which can include magnetic media, and solid state media, for example. Chipset 2260 can also read data from and write data to RAM 2275. A bridge 2280 for interfacing with a variety of user interface components 2285 can be provided for interfacing with chipset 2260. Such user interface components 2285 can include a keyboard, a microphone, touch detection and processing circuitry, a pointing device, such as a mouse, and so on. In general, inputs to system 2250 can come from any of a variety of sources, machine generated and/or human generated.

Chipset 2260 can also interface with one or more communication interfaces 2290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 2255 analyzing data stored in storage 2270 or 2275. Further, the machine can receive inputs from a user via user interface components 2285 and execute appropriate functions, such as browsing functions by interpreting these inputs using processor 2255.

It can be appreciated that exemplary systems 2200 and 2250 can have more than one processor 2210 or be part of a group or cluster of computing devices networked together to provide greater processing capability.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

CONCLUSION

For clarity of explanation, in some instances the present technology may be presented as including individual functional blocks including functional blocks comprising devices, device components, steps or routines in a method embodied in software, or combinations of hardware and software.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer implemented method comprising:
receiving from a collector, by a content management system, a request to generate a link for use in collecting one or more files from one or more submitters;
in response to receiving the request, providing, by the content management system, one or more prompts requesting information from the collector with the one or more prompts requesting customization information for customizing the request and provides one or more restrictions on how the one or more submitters uploads one or more files;

receiving, by the content management system, information responding to the prompts;

generating, by the content management system, a link to a designated collection folder using at least some of the received information;

distributing, by the content management system, the generated link to one or more submitters based on at least some of the received information, wherein each of the one or more submitters has limited rights to the designated collection folder which comprises uploading rights for uploading one or more files to the designated collection folder and prohibits each of the one or more submitters from viewing files uploaded by other submitters of the one or more submitters associated with the designated collection folder.

2. The method of claim 1 wherein the one or more prompts are rendered in one or more user interfaces.

3. The method of claim 1 wherein the received information comprises:
a name for a file request;
a designated collection folder to store one or more files received from the one or more submitters; and
at least one email address for the one or more submitters.

4. The method of claim 3 wherein the received information further includes a message from the collector to the one or more submitters and distributing, by the content management system, the message along with the generated link to the one or more submitters.

5. The method of claim 1 wherein the one or more prompts requesting customization information for customizing the request further comprise prompts for at least one of:
a number of submissions permitted by each submitter;
a type of files permitted by each submitter;
an expiration of the request;
permission to replace a previous submission;
a white labeling file;
a template file;
use of a previous request; and
a viewing role.

6. The method of claim 5 wherein in response to receiving a selection of the expiration of the request further comprises:
rendering, by the content management system, a user interface displaying a calendar;
receiving, by the content management system, a deadline date; and
associating, by the content management system, the received deadline date with the request.

7. The method of claim 6 wherein in response to receiving a selection of the expiration of the request further comprises:
rendering, by the content management system, a user interface displaying a prompt for a deadline time;
receiving, by the content management system, a deadline time; and
associating, by the content management system, the received deadline time with the request.

8. The method of claim 7 further comprising:
sending, by the content management system, a message notifying the submitter that a submission from a submitter is rejected when the submission occurs after a deadline based on the associated deadline date and deadline time.

9. The method of claim 5 wherein in response to receiving a selection of the white labeling file further comprises:
rendering, by the content management system, a user interface displaying a list of files;
receiving, by the content management system, a selection of a white labeling file; and
associating, by the content management system, the received white labeling file with the request.

10. The method of claim 9 further comprising:
rendering, by the content management system, a file request user interface in response to the generated link being selected with the file request rendering a white label associated with the white labeling file.

11. A system comprising:
a processor; and
a non-transitory computer-readable storage medium having processor-executable instructions store therein for causing a processor to:
receiving a request to generate a link for use in collecting one or more files from one or more submitters;
in response to receiving the request, providing one or more prompts to the collector, wherein the one or more prompts request information from the collector with the one or more prompts requesting customization information for customizing the request and provides one or more restrictions on how the one or more submitters uploads one or more files;
receiving information responding to the prompts;
generating a link to a designated collection folder in a content management system using at least some of the received information;
distributing the generated link to one or more submitters based on at least some of the received information,
wherein each of the one or more submitters has limited rights to the designated collection folder which comprises uploading rights for uploading one or more files to the designated collection folder and prohibits each of the one or more submitters from viewing files uploaded by other submitters of the one or more submitters associated with the designated collection folder.

12. The system of claim 11 wherein the one or more prompts are rendered in one or more user interfaces.

13. The system of claim 11 wherein the received information comprises:
a name for a file request;
a designated collection folder to store one or more files received from the one or more submitters; and
at least one email address for the one or more submitters.

14. The system of claim 13 wherein the received information further includes a message from the collector to the one or more submitters and distributing the message along with the generated link to the one or more submitters.

15. The system of claim 13 wherein the one or more prompts requesting customization information for customizing the request further comprise prompts for at least one of:
a number of submissions permitted by each submitter;
a type of files permitted by each submitter;
an expiration of the request;
permission to replace a previous submission;
a white labeling file;
a template file;
use of a previous request; and
a viewing role.

16. The system of claim 15 wherein in response to receiving a selection of the expiration of the request further comprises:
rendering a user interface displaying a calendar;
receiving a deadline date; and
associating the received deadline date with the request.

17. The system of claim 16 wherein in response to receiving a selection of the expiration of the request further comprises:
- rendering a user interface displaying a prompt for a deadline time;
- receiving a deadline time; and
- associating the received deadline time with the request.

18. The system of claim 17 further comprising:
- sending a message notifying the submitter that a submission from a submitter is rejected when the submission occurs after a deadline based on the associated deadline date and deadline time.

19. The system of claim 15 wherein in response to receiving a selection of the white labeling file further comprises:
- rendering a user interface displaying a list of files;
- receiving a selection of a white labeling file; and
- associating the received white labeling file with the request.

20. The system of claim 19 further comprising:
- rendering a file request user interface in response to the generated link being selected with the file request rendering a white label associated with the white labeling file.

21. The system of claim 19 further comprising:
- notifying the collector that the collection folder request is established.

* * * * *